(12) United States Patent
Kuboshima et al.

(10) Patent No.: US 12,599,054 B2
(45) Date of Patent: Apr. 14, 2026

(54) AGRICULTURAL WORK ASSISTANCE SYSTEM, AGRICULTURAL MACHINE, AND AGRICULTURAL WORK ASSISTANCE DEVICE

(71) Applicant: Kubota Corporation, Osaka (JP)

(72) Inventors: Ryo Kuboshima, Sakai (JP); Takanori Morimoto, Sakai (JP); Ken Sakuta, Sakai (JP); Kanta Nakaguchi, Sakai (JP); Binyi Wu, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 40 days.

(21) Appl. No.: 18/743,192

(22) Filed: Jun. 14, 2024

(65) Prior Publication Data

US 2024/0334861 A1     Oct. 10, 2024

Related U.S. Application Data

(63) Continuation of application No. PCT/JP2022/040136, filed on Oct. 27, 2022.

(30) Foreign Application Priority Data

Dec. 28, 2021     (JP) ................................. 2021-214362

(51) Int. Cl.
*A01B 69/00* (2006.01)
*A01B 69/04* (2006.01)
(Continued)

(52) U.S. Cl.
CPC ............ *A01B 69/008* (2013.01); *B60K 35/22* (2024.01); *B60Q 9/00* (2013.01); *G05D 1/648* (2024.01);
(Continued)

(58) Field of Classification Search
CPC ...... A01B 69/008; A01B 69/00; B60K 35/22; B60K 2360/166; B60Q 9/00; G05D 1/648;
(Continued)

(56) References Cited

U.S. PATENT DOCUMENTS

2017/0168501 A1     6/2017 Ogura et al.
2019/0101931 A1     4/2019 Ogura et al.
(Continued)

FOREIGN PATENT DOCUMENTS

JP     2019-040635     3/2019
JP     2019-088209     6/2019
(Continued)

OTHER PUBLICATIONS

Official Communication issued in International Patent Application No. PCT/JP2022/040136, mailed on Dec. 27, 2022.
(Continued)

*Primary Examiner* — Rodney A Butler
(74) *Attorney, Agent, or Firm* — Keating & Bennett, LLP

(57)     ABSTRACT

An agricultural work assistance system includes an input to input dimension information of a working device coupled to an agricultural machine and a work condition for performing agricultural work on an agricultural field by the agricultural machine and the working device, a route creator to create a traveling route of the agricultural machine on a map indicative of the agricultural field on the basis of the dimension information of the working device and the work condition, an output to output the traveling route, and a dimension determiner to receive the dimension information of the working device input by the input, determine whether the dimension information satisfies a predetermined restriction condition according to a kind of agricultural work performed by the working device, and refuse to receive the dimension (Continued)

information in a case where it is determined that the dimension information does not satisfy the restriction condition.

7 Claims, 37 Drawing Sheets

(51) Int. Cl.
| | |
|---|---|
| B60K 35/22 | (2024.01) |
| B60Q 9/00 | (2006.01) |
| G05D 1/648 | (2024.01) |
| G05D 105/15 | (2024.01) |
| G05D 107/20 | (2024.01) |

(52) U.S. Cl.
CPC .... *B60K 2360/166* (2024.01); *G05D 2105/15* (2024.01); *G05D 2107/21* (2024.01)

(58) Field of Classification Search
CPC .......... G05D 2105/15; G05D 2107/21; G05D 1/2246; G05D 1/646; G05D 1/6484; G05D 1/6987; G05D 2109/10
See application file for complete search history.

(56) References Cited

U.S. PATENT DOCUMENTS

| | | | |
|---|---|---|---|
| 2020/0348690 A1 | 11/2020 | Ogura et al. | |
| 2022/0022361 A1 | 1/2022 | Ogura et al. | |
| 2022/0279698 A1 | 9/2022 | Yoshimura et al. | |
| 2023/0363302 A1* | 11/2023 | Kaufmann ........... | B60W 40/02 |

FOREIGN PATENT DOCUMENTS

| | | |
|---|---|---|
| JP | 2019-096363 | 6/2019 |
| JP | 2020-022375 | 2/2020 |
| JP | 2020-092621 | 6/2020 |
| JP | 2021093982 A | 6/2021 |

OTHER PUBLICATIONS

Official Communication issued in corresponding European Patent Application No. 22915499.2, mailed on Dec. 15, 2025, 9 pages.

* cited by examiner

<Dimension restriction processing>

Fig.9

Restriction condition table  T1

| Kind of agricultural work | Working device restriction condition Entire width A, work width B |
|---|---|
| Cultivation | B ≤ A |
| Puddling | B ≤ A |
| Stubble cultivation | B ≤ A |
| Scattering | |

Fig.10

Agricultural field selection

52

D5

N

Previous work 2021/10/25    Area 3000m²

B41

MP2

B9    Next

B8    Return

Figure 12B:
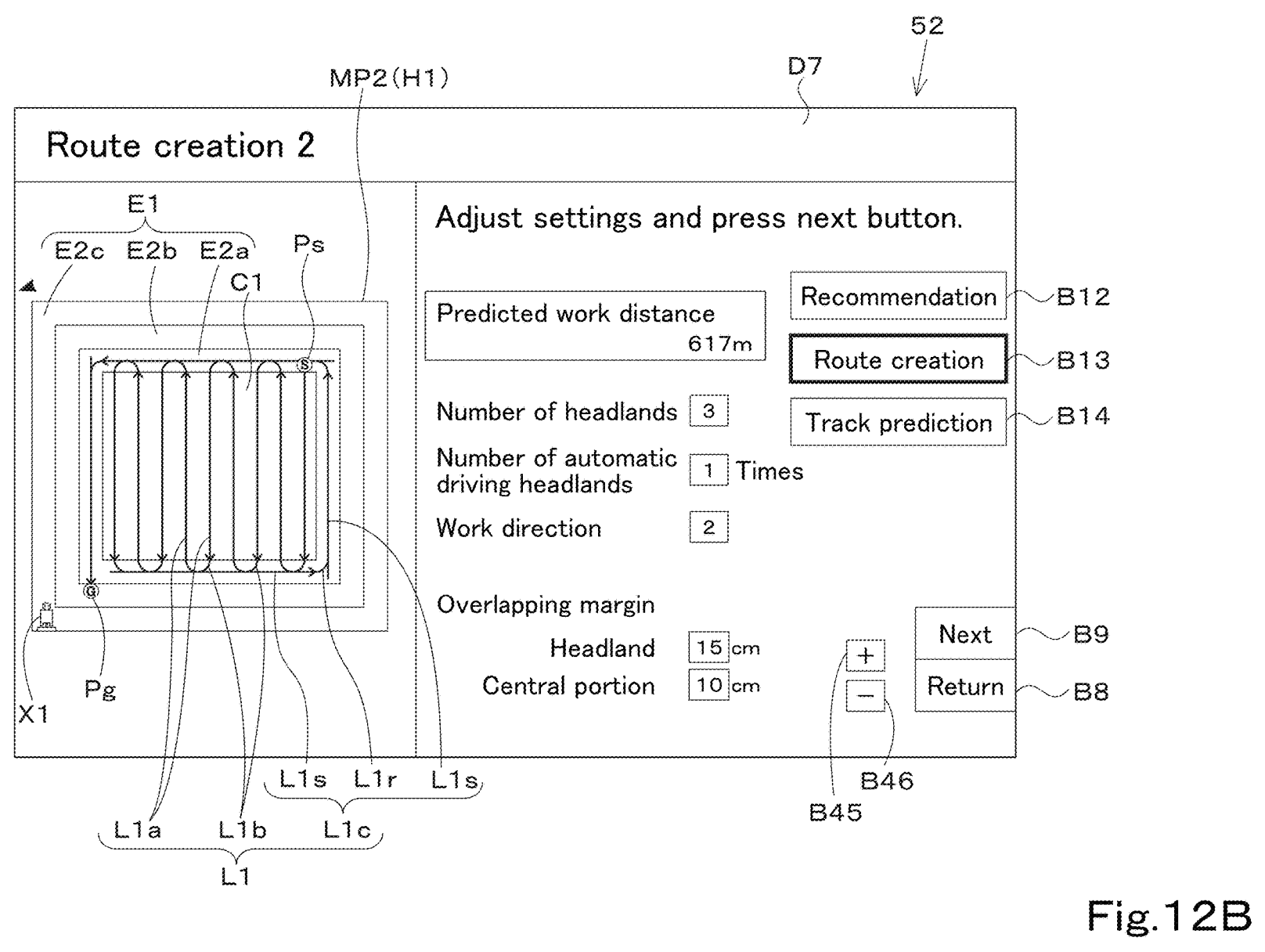

Route creation 2

Adjust settings and press next button.

Recommendation — B12

Route creation — B13

Track prediction — B14

Predicted work distance

617m

Number of headlands      3

Number of automatic
driving headlands        1    Times

Work direction           2

Overlapping margin

Headland        15 cm

Central portion 10 cm

Next — B9

Return — B8

Restriction condition table  T2

| Kind of agricultural work | Working device restriction condition Entire length C, work position D |
|---|---|
| Cultivation | $D \leq C$ |
| Puddling | $D \leq C$ |
| Stubble cultivation | $D \leq C$ |
| Scattering | |

Fig.19

Restriction condition table  T3

| Kind of agricultural work | Working device restriction condition Entire length C, work position D, work front end position F, work rear end position E | | | | |
|---|---|---|---|---|---|
| Cultivation | F < C | E < C | F < D | E > D | F < E |
| Puddling | F < C | E < C | F < D | E > D | F < E |
| Stubble cultivation | F < C | E < C | F < D | E > D | F < E |
| Scattering | F < C | | | E > D | F < E |

Fig.21

Restriction condition table T4

| Kind of agricultural work | Working device restriction condition Entire length C, work start position Ds, work end position De | | |
|---|---|---|---|
| Cultivation | Ds ≤ De | Ds ≤ C | De ≤ C |
| Puddling | Ds ≤ De | Ds ≤ C | De ≤ C |
| Stubble cultivation | Ds ≤ De | Ds ≤ C | De ≤ C |
| Scattering | | | |

AGRICULTURAL WORK ASSISTANCE SYSTEM, AGRICULTURAL MACHINE, AND AGRICULTURAL WORK ASSISTANCE DEVICE

CROSS REFERENCE TO RELATED APPLICATIONS

This application is a continuation application of International Application No. PCT/JP2022/040136, filed on Oct. 27, 2022, which claims the benefit of priority to Japanese Patent Application No. 2021-214362, filed on Dec. 28, 2021. The entire contents of each of these applications are hereby incorporated herein by reference.

BACKGROUND OF THE INVENTION

1. Field of the Invention

The present invention relates to agricultural work assistance systems and devices that each assist an agricultural machine in performing agricultural work while traveling in an agricultural field, and agricultural machines including the agricultural work assistance systems and devices.

2. Description of the Related Art

Japanese Unexamined Patent Application Publication No. 2020-92621 discloses a technique of assisting an agricultural machine in performing agricultural work by a working device coupled to the agricultural machine while automatically traveling in an agricultural field. In the system disclosed in Japanese Unexamined Patent Application Publication No. 2020-92621, a contour of the agricultural field is displayed on a display provide on the agricultural machine. Then, a traveling path creator creates a traveling path (a linear path and a turning path) along which the agricultural machine travels in a work region located in a central portion within the contour of the agricultural field and a headland region located around the work region. The traveling path creator creates the traveling path on the basis of an entire width, a work width, and a work width overlap amount of the working device (working machine) attached to the agricultural machine. Then, a traveling controller and a working machine controller control the agricultural machine to perform agricultural work on the agricultural field by the working device while automatically traveling on the basis of the traveling path and a position of the agricultural machine.

SUMMARY OF THE INVENTION

An actual dimension of a working device sometimes changes, for example, due to replacement, adjustment, or maintenance of the working device. A conventional system cannot cope with such a change in dimension of the working device and is therefore inconvenient. As one way to cope with the change, an operator may update dimensional information of the working device set in the system by inputting dimensional information of the working device in the system again. However, in a case where the input value of the dimension is not appropriate, there is a possibility that a traveling path of an agricultural machine is not appropriately created. In a case where the agricultural machine travels on the basis of the inappropriate traveling path, the agricultural machine or the working device may undesirably collide with a ridge or the like around an agricultural field.

Example embodiments of the present invention improve convenience and obtain an appropriate traveling route by coping with a change in dimension of a working device.

Example embodiments of the present invention may include the following features.

An agricultural work assistance system according to an example embodiment of the present invention includes an input to input dimension information of a working device coupled to an agricultural machine and a work condition for performing agricultural work on an agricultural field by the agricultural machine and the working device, a controller configured or programmed to include a route creator to create a traveling route of the agricultural machine on a map indicative of the agricultural field on the basis of the dimension information of the working device and the work condition and a dimension determiner to determine whether or not the dimension information of the working device input by the input satisfies a predetermined restriction condition according to a kind of agricultural work performed by the working device and refuse to receive the dimension information in a case where it is determined that the dimension information does not satisfy the restriction condition, and an output to output the traveling route.

The dimension determiner may be configured or programmed to prevent creation of the traveling route based on the dimension information by the route creator and the output of the traveling route by the output by refusing to receive the dimension information of the working device input by the input.

In a case where the dimension determiner determines that the dimension information of the working device satisfies the restriction condition, the route creator may be configured or programmed to create the traveling route on the basis of the dimension information, and the output may be operable to output the traveling route created by the route creator.

The controller may be configured or programmed to further include a notifier to, in a case where the dimension determiner determines that the dimension information of the working device does not satisfy the restriction condition, provide a notification about a result of the determination.

In a case where the dimension determiner determines that the dimension information of the working device does not satisfy the restriction condition, the notifier may be configured or programmed to provide a notification prompting change of the dimension information.

The dimension determiner may be configured or programmed to extract the restriction condition according to the kind of agricultural work input by the input from a storage in which a predetermined restriction condition is stored according to a kind of the agricultural work.

The agricultural work assistance system may further include a position detector to detect a position of the agricultural machine, the controller may be configured or programmed to include a boundary-crossing determiner to determine whether or not the working device or the agricultural machine has crossed a boundary out of the agricultural field on the basis of a position of the agricultural machine, the map, the dimension information of the working device, and dimension information of the agricultural machine, and the dimension determiner may be configured or programmed to prevent the determination as to the boundary crossing based on the dimension information from being performed by the boundary-crossing determiner by refusing to receive the dimension information of the working device input by the input.

The controller may be configured or programmed to read out dimension information corresponding to identification information of the working device input by the input from a storage in which the dimension information of the working device and the identification information are stored in association with each other, and in a case where a changed value of the dimension information of the working device is input by the input after the additional controller reads out the dimension information of the working device, the dimension determiner may be configured or programmed to determine whether or not the changed value satisfies the restriction condition.

The agricultural work assistance system may further include an automatic controller configured or programmed to drive the working device to perform agricultural work on the agricultural field while automatically performing traveling or steering of the agricultural machine on the basis of the traveling route output by the output and a position of the agricultural machine detected by a position detector, and the output may include a display to display the traveling route or a communicator to transmit the traveling route to the automatic controller.

The dimension information of the working device may include an entire width, which is a length of an external shape of the working device in a left-right direction perpendicular to a traveling direction and a height direction of the agricultural machine, and a work width, which is a width where ground work is performed by the working device, the kind of agricultural work may include first agricultural work performed in contact with an object present on the agricultural field and second agricultural work performed apart from an object present on the agricultural field, the working device may include a first working device to perform the first agricultural work and a second working device to perform the second agricultural work, and the dimension determiner may be configured or programmed to use, as the restriction condition, a restriction condition that the work width is equal to or less than the entire width in a case where the first agricultural work is performed by the first working device, and not use the restriction condition that the work width is equal to or less than the entire width in a case where the second agricultural work is performed by the second working device.

In a case where the work width of the first working device input by the operator by using the input exceeds the entire width, the dimension determiner may be configured or programmed to determine that the dimension information of the first working device does not satisfy the restriction condition and refuse to receive the dimension information of the first working device input by the input, and the notifier may be configured or programmed to provide a notification indicating that the work width exceeds the entire width and prompting change of the work width or the entire width.

The dimension information of the working device may include an entire length, which is a length of an external shape of the working device from a coupling position of the working device in a front-rear direction parallel to a traveling direction of the agricultural machine, and a length to a work position of the working device, and the work position includes a work start position at which the working device starts ground work from the coupling position and a work end position at which the working device ends the ground work from the coupling position, the kind of agricultural work may include first agricultural work performed in contact with an object present on the agricultural field and second agricultural work performed apart from an object present on the agricultural field, the working device may include a first working device to perform the first agricultural work and a second working device to perform the second agricultural work, and the dimension determiner may be configured or programmed to use, as the restriction condition, a restriction condition that the length to the work position is equal to or less than the entire length in a case where the first agricultural work is performed by the first working device, and not use the restriction condition that the length to the work position is equal to or less than the entire length in a case where the second agricultural work is performed by the second working device.

In a case where the length to the work position that is the dimension information of the first working device input by the operator by using the input exceeds the entire length or in a case where the length to the work start position exceeds the length to the work end position, the dimension determiner may be configured or programmed to determine that the dimension information of the first working device does not satisfy the restriction condition and refuse to receive the dimension information of the first working device input by the input, and the notifier may be configured or programmed to provide a notification indicating a result of the determination of the dimension determiner and prompting change of the dimension information that does not satisfy the restriction condition.

An agricultural machine according to an example embodiment of the present invention includes a traveling body that is capable of traveling, a coupler that is capable of coupling a working device to the traveling body, an input to input dimension information of the working device coupled to the traveling body and a work condition for performing agricultural work on an agricultural field by the agricultural machine and the working device, a controller configured or programmed to include a route creator to create a traveling route of the traveling body on a map indicative of the agricultural field on a basis of the dimension information of the working device and the work condition and a dimension determiner to determine whether or not the dimension information of the working device input by the input satisfies a predetermined restriction condition according to a kind of agricultural work performed by the working device and refuse to receive the dimension information in a case where it is determined that the dimension information does not satisfy the restriction condition, and an output to output the traveling route.

An agricultural work assistance device according to an example embodiment of the present invention includes an input to input dimension information of a working device coupled to an agricultural machine and a work condition for performing agricultural work on an agricultural field by the agricultural machine and the working device, a controller configured or programmed to include a route creator to create a traveling route of the agricultural machine on a map indicative of the agricultural field on a basis of the dimension information of the working device and the work condition and a dimension determiner to determine whether or not the dimension information of the working device input by the input satisfies a predetermined restriction condition according to a kind of agricultural work performed by the working device and refuse to receive the dimension information in a case where it is determined that the dimension information does not satisfy the restriction condition, and an output to output the traveling route.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 9 illustrates an example of a restriction condition table.

FIG. 10 illustrates an example of an agricultural field selection screen.

FIG. 12B illustrates an example of the route creation 2 screen.

FIG. 16 illustrates another example of a restriction condition table.

FIG. 19 illustrates another example of the restriction condition table.

FIG. 21 illustrates another example of the restriction condition table.

DETAILED DESCRIPTION OF THE EXAMPLE EMBODIMENTS

Figure 1:
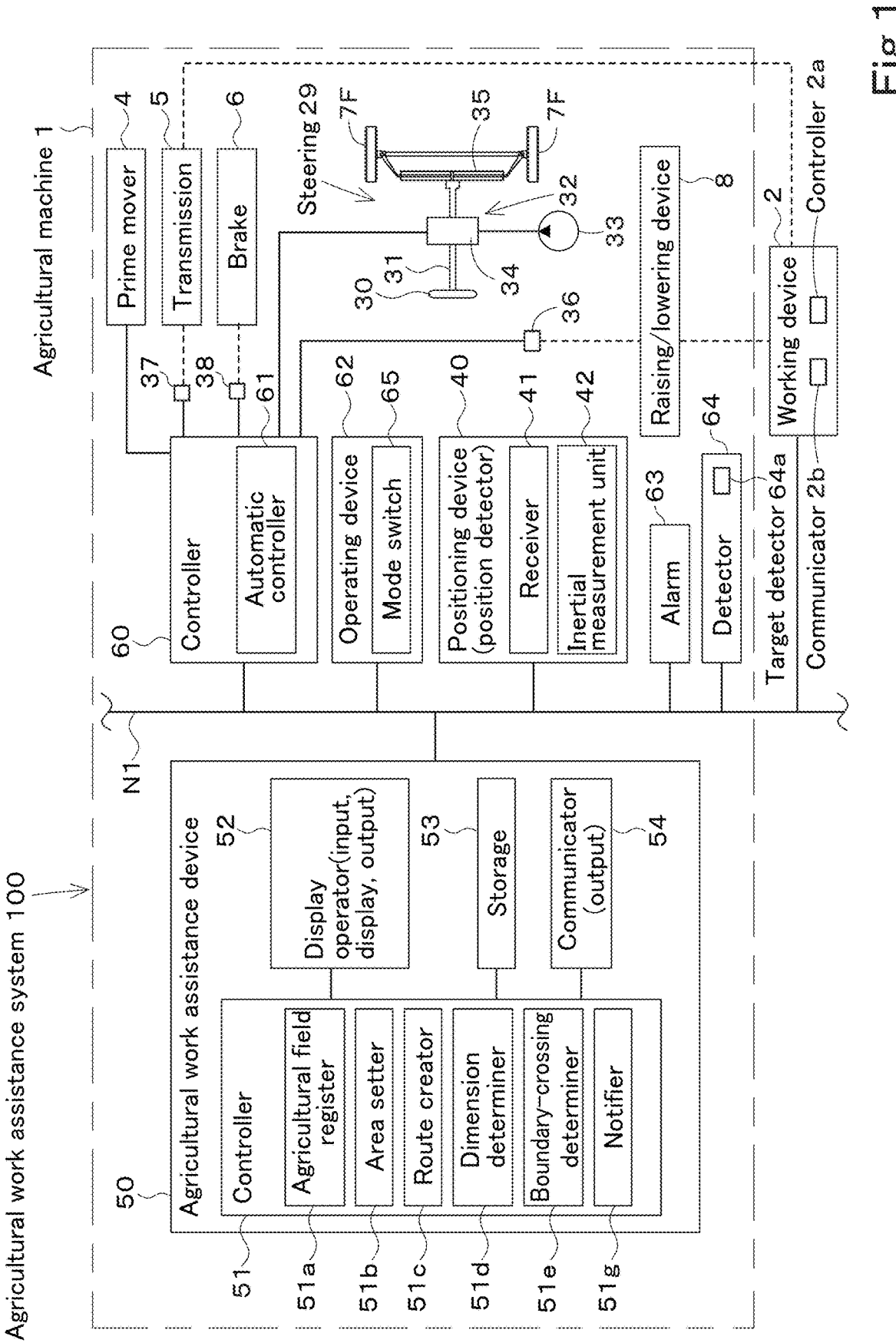
FIG. 1 is a configuration diagram of an agricultural work assistance system.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention are described below with reference to the drawings.

Figure 22:
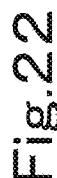
FIG. 22 is a side view of the agricultural machine.

First, an agricultural machine 1 of the present example embodiment is described. FIG. 22 is a side view of the agricultural machine 1. The agricultural machine 1 is a tractor. Note that the agricultural machine 1 is not limited to a tractor and may be another agricultural machine such as a rice planter or a combine or may be a working vehicle other than a tractor that performs agricultural work.

The agricultural machine 1 includes a traveling body 3, a prime mover 4, a transmission 5, and a traveling device 7. The traveling device 7 includes a front wheel 7F and a rear wheel 7R. The front wheel 7F may be a tire type or may be a crawler type. Similarly, the rear wheel 7R may be a tire type or may be a crawler type. The prime mover 4 is a diesel engine, an electric motor, or the like. In the present example embodiment, the prime mover 4 is a diesel engine. The transmission 5 can switch propulsion force of the traveling device 7 by changing speed stages and can switch forward traveling and rearward traveling of the traveling device 7. Driving force of the prime mover 4 is transmitted to the traveling device 7 by the transmission 5 and drives the traveling device 7, and thereby the traveling body 3 travels forward or rearward. Note that the leftward direction of FIG. 22 is a forward direction for the traveling body 3, and the rightward direction of FIG. 22 is a rearward direction for the traveling body 3.

The traveling body 3 is provided with a cabin 9. An operator's seat 10 is provided in the cabin 9. A raising/lowering device 8 that is a three-point linkage or the like is provided on a rear portion of the traveling body 3. The raising/lowering device 8 is provided with couplers 8g and 8h that can couple a working device 2 for performing agricultural work. By coupling the working device 2 to the couplers 8g and 8h, the working device 2 and the traveling body 3 (the agricultural machine 1) are coupled, and thereby the working device 2 can be towed by the traveling body 3.

The working device 2 performs ground work on an agricultural field. Examples of the working device 2 include a cultivator (rotary cultivator) that performs cultivating work on the agricultural field, a stubble cultivator that performs stubble cultivation, a puddling device (drive harrow) that performs puddling, a spreader that spreads a fertilizer, an agricultural chemical, or the like, a seeding device that sows seeds, a transplanter that transplants seedlings, and a harvester for harvesting.

Next, an agricultural work assistance system 100 according to the present example embodiment is described. FIG. 1 is a configuration diagram of the agricultural work assistance system 100. The agricultural work assistance system 100 includes an agricultural work assistance device 50. The agricultural work assistance system 100 and the agricultural work assistance device 50 assist the agricultural machine 1 in performing agricultural work by the working device 2 while traveling in an agricultural field.

The agricultural machine 1 includes a controller 60, an operating device 62, the prime mover 4, the transmission 5, a brake 6, a steering 29, the raising/lowering device 8, a positioning device 40, an alarm 63, and a detector 64. An in-vehicle network N1 such as a LAN or a CAN is constructed in the agricultural machine 1. The controller 60, the operating device 62, the positioning device 40, the alarm 63, and the detector 64 are connected to the in-vehicle network N1. Each of these units of the agricultural machine 1 is included in the agricultural work assistance system 100.

The controller 60 includes an electric circuit including a CPU (or a microcomputer) and a memory. The memory of the controller 60 includes a volatile memory and a nonvolatile memory. The controller 60 is configured or programmed to control operation of each unit of the agricultural machine 1. The controller 60 is configured or programmed to include an automatic controller 61 to control traveling of the agricultural machine 1 and operation of the working device 2. The operating device 62 includes a switch, a lever, a pedal, and other keys that can be operated by an operator (user) such as a driver sitting on the operator's seat 10 or a worker present close to the agricultural machine 1. The operating device 62 includes a mode switch 65. The mode switch 65 is operated to switch a mode of the agricultural machine 1.

Driving, stoppage, and a rotational speed of the prime mover 4 (engine) are controlled by the controller 60. The transmission 5 is connected to a control valve 37. The control valve 37 is a solenoid valve that operates on the basis of a control signal transmitted from the controller 60. A hydraulic fluid delivered from a hydraulic pump 33 is supplied to the control valve 37. Although the control valve 37 is illustrated as a single block in FIG. 1, an appropriate number of control valves 37 are provided corresponding to the number of hydraulic devices such as a hydraulic clutch or a hydraulic cylinder provided in the transmission 5.

The automatic controller 61 controls driving of the transmission 5 by electrically controlling a switching position and an opening of the control valve 37. The transmission 5 transmits a driving force of the prime mover 4 to the traveling device 7, and thereby the traveling device 7 operates. As a result, the traveling body 3 travels forward or rearward. For example, in a case where the working device 2 is a ground working device, the transmission 5 transmits the driving force of the prime mover 4 to the working device 2. This increases an operating force of the working device 2.

The automatic controller 61 communicates with the working device 2 over the in-vehicle network N1. Specifically, the working device 2 includes a controller 2a and a communicator 2b. The automatic controller 61 transmits a work command to the working device 2 over the in-vehicle network N1. Upon receipt of the work command by the communicator 2b, the controller 2a of the working device 2 is configured or programmed to control operation of each unit of the working device 2 on the basis of the work command to perform agricultural work (ground work). Furthermore, the controller 2a causes the communicator 2b to transmit information or data indicative of a work state or the like to the controller 60 over the in-vehicle network N1. The automatic controller 61 detects the work state or the like of the working device 2 on the basis of the information or data received from the working device 2 over the in-vehicle network N1.

The brake 6 is connected to a control valve 38. The control valve 38 is a solenoid valve that operates on the basis of a control signal transmitted from the controller 60. A hydraulic fluid delivered from the hydraulic pump 33 is supplied to the control valve 38. The automatic controller 61 causes the brake 6 to operate by electrically controlling a switching position and an opening of the control valve 38 and thereby brakes the traveling body 3.

The steering 29 includes a steering wheel 30, a steering shaft (rotary shaft) 31, and an assist mechanism (power steering mechanism) 32. The steering wheel 30 is provided in the cabin 9. The steering shaft 31 rotates in accordance with rotation of the steering wheel 30. The assist mechanism 32 assists steering using the steering wheel 30.

The assist mechanism 32 includes a control valve 34 and a steering cylinder 35. The control valve 34 is a solenoid valve that operates on the basis of a control signal transmitted from the controller 60. Specifically, the control valve 34 is a three-position switching valve that can be switched by movement of a spool or the like. To the control valve 34, a hydraulic fluid delivered from the hydraulic pump 33 is supplied. The controller 60 adjusts a hydraulic pressure supplied to the steering cylinder 35 by electrically controlling a switching position and an opening of the control valve 34 and thereby extends and contracts the steering cylinder 35. The steering cylinder 35 is connected to knuckle arms (not illustrated) that change a direction of the front wheel 7F.

The control valve 34 can also be switched by steering of the steering shaft 31. Specifically, by operating the steering wheel 30, the steering shaft 31 rotates in accordance with a state of the operation, and thus the switching position and the opening of the control valve 34 are switched. The steering cylinder 35 extends or contracts leftward or rightward of the traveling body 3 in accordance with the switching position and the opening of the control valve 34. By this extending or contracting action of the steering cylinder 35, a steering direction of the front wheel 7F is changed. Note that the steering 29 described above is an example and is not limited to the above configuration.

The traveling body 3 of the agricultural machine 1 can be steered manually by manual operation of the steering wheel 30 and can be steered automatically by the automatic controller 61. The transmission 5 or the brake 6 is driven in accordance with manual operation of an accelerator or a brake (both of which are not illustrated) included in the operating device 62, and thereby the traveling body 3 can travel and stop. Furthermore, the traveling body 3 can automatically travel and stop in accordance with control of the transmission 5 and the brake 6 by the automatic controller 61.

Figure 2:
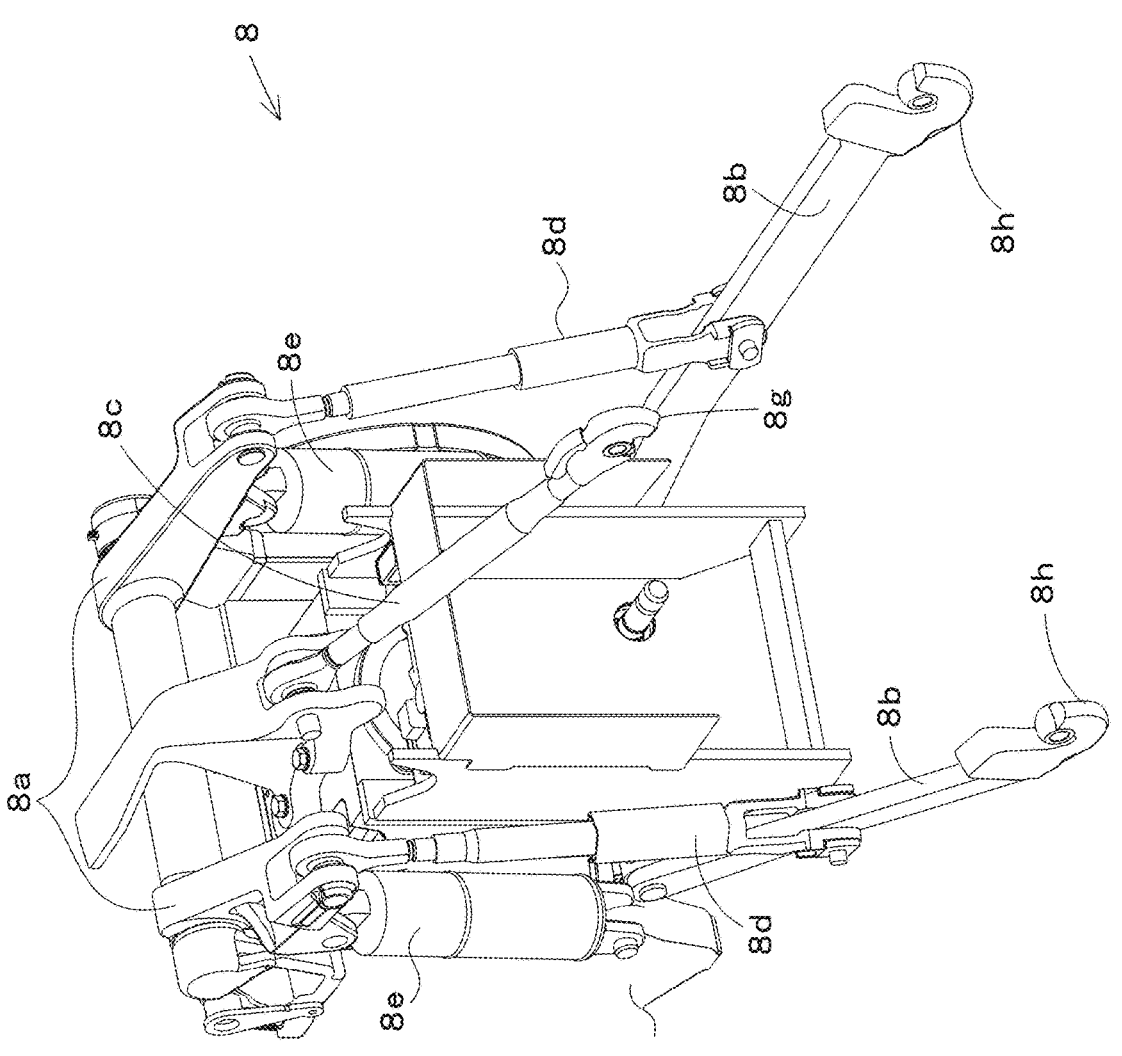
FIG. 2 is a perspective view of a raising/lowering device.

FIG. 2 is a perspective view of the raising/lowering device 8. The raising/lowering device 8 includes a lift arm 8a, a lower link 8b, a top link 8c, a lift rod 8d, and a lift cylinder 8e. A front end portion of the lift arm 8a is supported on an upper rear portion of a case (transmission case) in which the transmission 5 is swingable up or down. The lift arm 8a is swung (raised and lowered) by driving of the lift cylinder 8e. The lift cylinder 8e is a hydraulic cylinder. The lift cylinder 8e is connected to a control valve 36 (FIG. 1). The control valve 36 is a solenoid valve that operates on the basis of a control signal transmitted from the controller 60. A hydraulic fluid delivered from the hydraulic pump 33 is supplied to the control valve 36.

A front end portion of the lower link 8*b* illustrated in FIG. 2 is supported on a lower rear portion of the transmission 5 (FIGS. 1 and 22) so as to be swingable up or down. A front end portion of the top link 8*c* is supported on a rear portion of the transmission 5 above the lower link 8*b* so as to be swingable up or down. The lift rod 8*d* couples the lift arm 8*a* and the lower link 8*b*. The couplers 8*g* and 8*h* that can couple the working device 2 are provided at rear end portions of the lower link 8*b* and the top link 8*c*.

The automatic controller 61 illustrated in FIG. 1 adjusts a hydraulic pressure supplied to the lift cylinder 8*e* illustrated in FIG. 2 by electrically controlling a switching position and an opening of the control valve 36 and thereby extends or contracts the lift cylinder 8*e*. When the lift cylinder 8*e* extends or contracts, the lift arm 8*a* rises or lowers, and the lower link 8*b* coupled to the lift arm 8*a* with the lift rod 8*d* interposed therebetween rises or lowers. As a result, the working device 2 swings up or down (rises or lowers) about a front portion (opposite to the couplers 8*g* and 8*h*) of the lower link 8*b*.

The positioning device 40 illustrated in FIG. 1 includes a receiver 41 and an inertial measurement unit (IMU) 42. The receiver 41 receives a satellite signal (a position of a positioning satellite, a transmission time, correction information, and the like) transmitted from a satellite positioning system (positioning satellite) such as D-GPS, GPS, GLONASS, BeiDou, Galileo, or Michibiki. The positioning device 40 detects a current position (e.g., latitude and longitude) on the basis of the satellite signal received by the receiver 41. That is, the positioning device 40 is a position detector that detects a position of the traveling body 3 of the agricultural machine 1. The inertial measurement unit 42 includes an acceleration sensor, a gyroscope sensor, and the like. The inertial measurement unit 42 detects a roll angle, a pitch angle, a yaw angle, and the like of the traveling body 3.

The alarm 63 includes a buzzer, a speaker, a warning light, or the like provided in the traveling body 3. The alarm 63 issues an alarm to surroundings of the traveling body 3 by sound or light. The detector 64 includes a sensor and the like (which may include a camera) installed at portions of the agricultural machine 1 and the working device 2. The detector 64 detects operating states (driving and stoppage states, an operation position, and the like) of the units such as the transmission 5, the brake 6, the traveling device 7, the raising/lowering device 8, the steering 29, and the operating device 62 of the agricultural machine 1 on the basis of an output signal from the sensor or the like. Furthermore, the detector 64 detects an operating state of the working device 2 on the basis of an output signal from the sensor or the like. Furthermore, the detector 64 includes a target detector 64*a*, a laser sensor such as LiDAR, an ultrasonic sensor, and the like. The laser sensor, the ultrasonic sensor, and the like are installed on a front portion, a rear portion, and left and right side portions of the traveling body 3. The target detector 64*a* detects presence or absence of a target around the agricultural machine 1, a distance to the target, and the like on the basis of an output signal from the laser sensor or the ultrasonic sensor.

The agricultural work assistance device 50 is, for example, a mobile tablet terminal device. The agricultural work assistance device 50 is, for example, mounted inside the cabin 9 of the agricultural machine 1 and is attachable and detachable to and from the agricultural machine 1. That is, the agricultural machine 1 includes the agricultural work assistance device 50.

The agricultural work assistance device 50 includes a controller 51, a display operator 52, a storage 53, and a communicator 54. The controller 51 includes a CPU (or a microcomputer), a volatile memory, and a nonvolatile memory. The controller 51 is configured or programmed to control each unit of the agricultural work assistance device 50. The controller 51 is configured or programmed to include an agricultural field register 51*a*, an area setter 51*b*, a route creator 51*c*, a dimension determiner 51*d*, a boundary-crossing determiner 51*e*, and a notifier 51*g*. Although each of these units is a software program in this example, each of these units may be hardware such as a semiconductor element such as an ASIC or an electric circuit in another example.

The display operator 52 is a touch panel and outputs various kinds of information by displaying the information on a screen. Furthermore, by performing a predetermined operation on a display screen of the display operator 52, various inputs can be performed. The display operator 52 is a display, an output, and an input. Instead of the display operator 52, an independent display, an output, or an input (operator) may be provided in the agricultural work assistance device 50.

The storage 53 is a nonvolatile memory or the like. In the storage 53, information or data for assisting traveling and work of the agricultural machine 1 are stored in a readable and writable manner. The communicator 54 is an interface for connection with the in-vehicle network N1. The controller 51 communicates with the controller 60, the operating device 62, the positioning device 40, the alarm 63, the detector 64, and the working device 2 over the in-vehicle network N1 by using the communicator 54. The communicator 54 is an output that outputs information and data to the controller 60 of the agricultural machine 1 by transmitting the information and the data.

The agricultural field register 51*a* registers information concerning an agricultural field where agricultural work is performed by the agricultural machine 1 and the working device 2. The area setter 51*b* sets a predetermined area in the agricultural field registered by the agricultural field register 51*a*. The route creator 51*c* creates a traveling route along which the agricultural machine 1 travels on the agricultural field registered by the agricultural field register 51*a*.

The dimension determiner 51*d* receives dimension information of the working device 2 input by the display operator (input) 52 and determines whether or not the dimension information satisfies a predetermined restriction condition according to a kind of agricultural work performed by the working device 2. In a case where the dimension determiner 51*d* determines that the input dimension information of the working device 2 satisfies the restriction condition, the dimension determiner 51*d* receives the dimension information and makes the dimension information effective. In a case where the dimension determiner 51*d* determines that the input dimension information of the working device 2 does not satisfy the restriction condition, the dimension determiner 51*d* refuses to receive the dimension information and makes the dimension information ineffective.

The boundary-crossing determiner 51*e* determines whether or not at least one of the working device 2 and the agricultural machine 1 has crossed a boundary out of the agricultural field on the basis of a position of the agricultural machine 1 detected by the positioning device 40, a map indicative of the agricultural field, the dimension information of the working device 2, and the dimension information of the agricultural machine 1. The notifier 51*g* displays, for notification, contents of predetermined information and data on the display operator 52. Furthermore, the notifier 51g may output, for notification, sound indicative of the contents of the predetermined information and data from a speaker of the alarm 63.

Next, operation of each unit of the agricultural work assistance system 100 is described. When the agricultural work assistance device 50 is activated, the controller 51 causes a home screen D1 illustrated in FIG. 3 to be displayed on the display operator 52. Data of the home screen D1 and data of screens that will be described later are stored in the storage 53. The controller 51 reads out screen from the storage 53 as needed and causes a screen based on the screen data to be displayed on the display operator 52.

On the home screen D1, an agricultural machine mark X1, an agricultural field key B1, an automatic driving key B2a, an automatic steering key B2b, a history key B3, and a setting key B0 are displayed. The setting key B0 is a key for various settings. Selection (tapping) of the setting key B0 enables setting and registration of a predetermined item. Examples of the predetermined item include matters concerning the agricultural machine 1 on which the agricultural work assistance device 50 is mounted, the working device 2 coupled to the agricultural machine 1, agricultural work performed by the agricultural machine 1 and the working device 2, an agricultural field where the agricultural work is performed, and the display operator 52.

The history key B3 is a key for displaying a work history of the agricultural machine 1. The agricultural field key B1 is a key for registering an agricultural field where agricultural work is performed by the agricultural machine 1. The automatic driving key B2a is a key for setting or prediction concerning an automatic traveling work mode of the agricultural machine 1. The automatic steering key B2b is a key for setting or prediction concerning an automatic steering work mode of the agricultural machine 1.

The automatic traveling work mode is a mode in which the agricultural machine 1 performs agricultural work (ground work) by the working device 2 while causing the traveling body 3 to automatically travel. The automatic driving of the agricultural machine 1 is to automatically change a traveling speed of the traveling body 3 and automatically steer the traveling body 3. The automatic steering work mode is a mode in which agricultural work (ground work) is performed by the working device 2 while automatically steering the traveling body 3. In a case where the agricultural machine 1 is in the automatic steering work mode, the traveling speed of the traveling body 3 is changed in response to driver's operation of the accelerator and the brake included in the operating device 62 (FIG. 1). That is, in the automatic steering work mode, the traveling speed of the traveling body 3 is changed on the basis of manual operation.

The agricultural machine 1 can also travel on the basis of manual driving, and ground work can be performed by the working device 2 during the traveling. The manual driving of the agricultural machine 1 means that the driver changes the traveling speed of the traveling body 3 by operating the accelerator or the brake of the operating device 62 and steers the traveling body 3 by operating the steering wheel 30 (FIG. 1).

Figure 3:
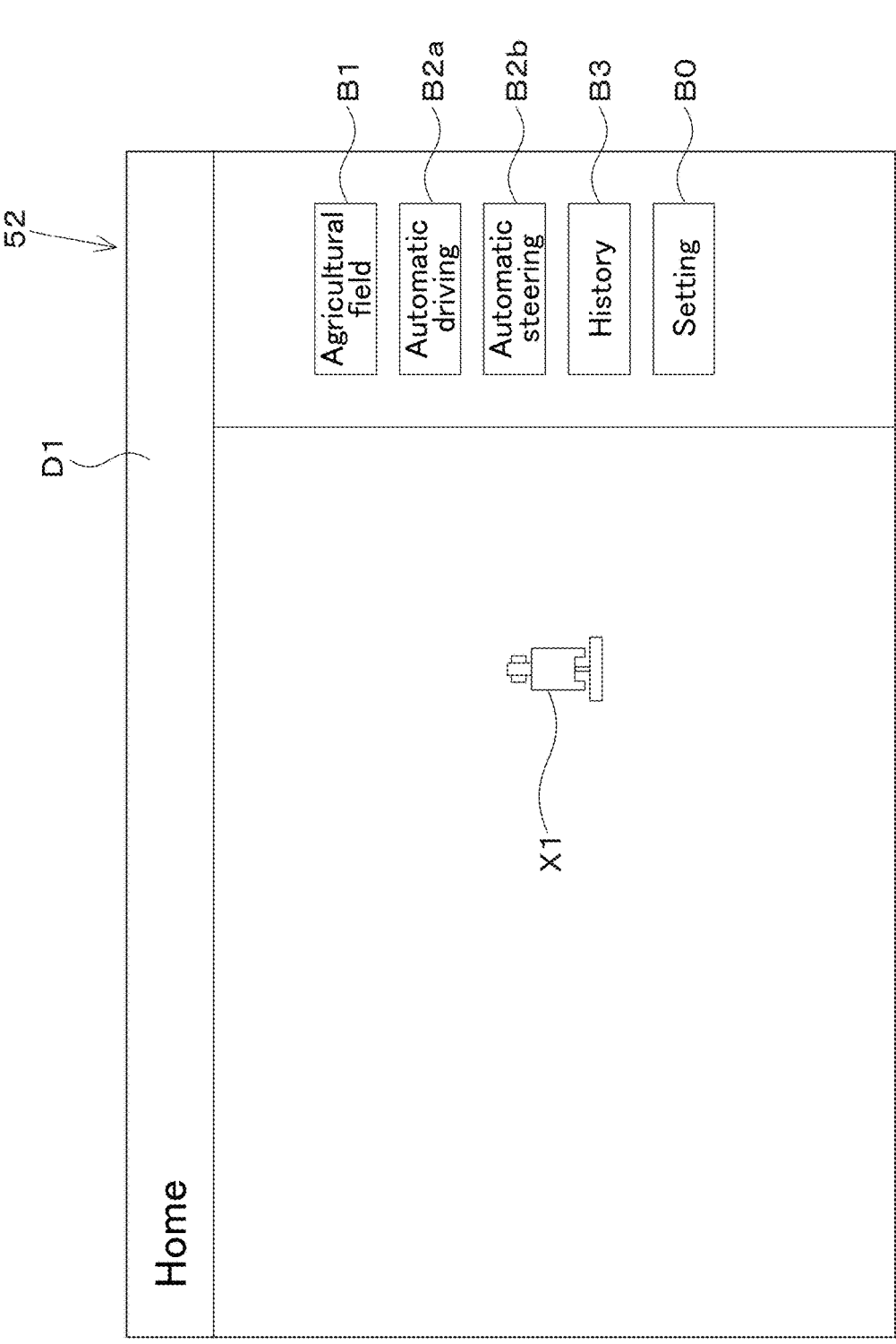
FIG. 3 illustrates an example of a home screen.
Figure 4:
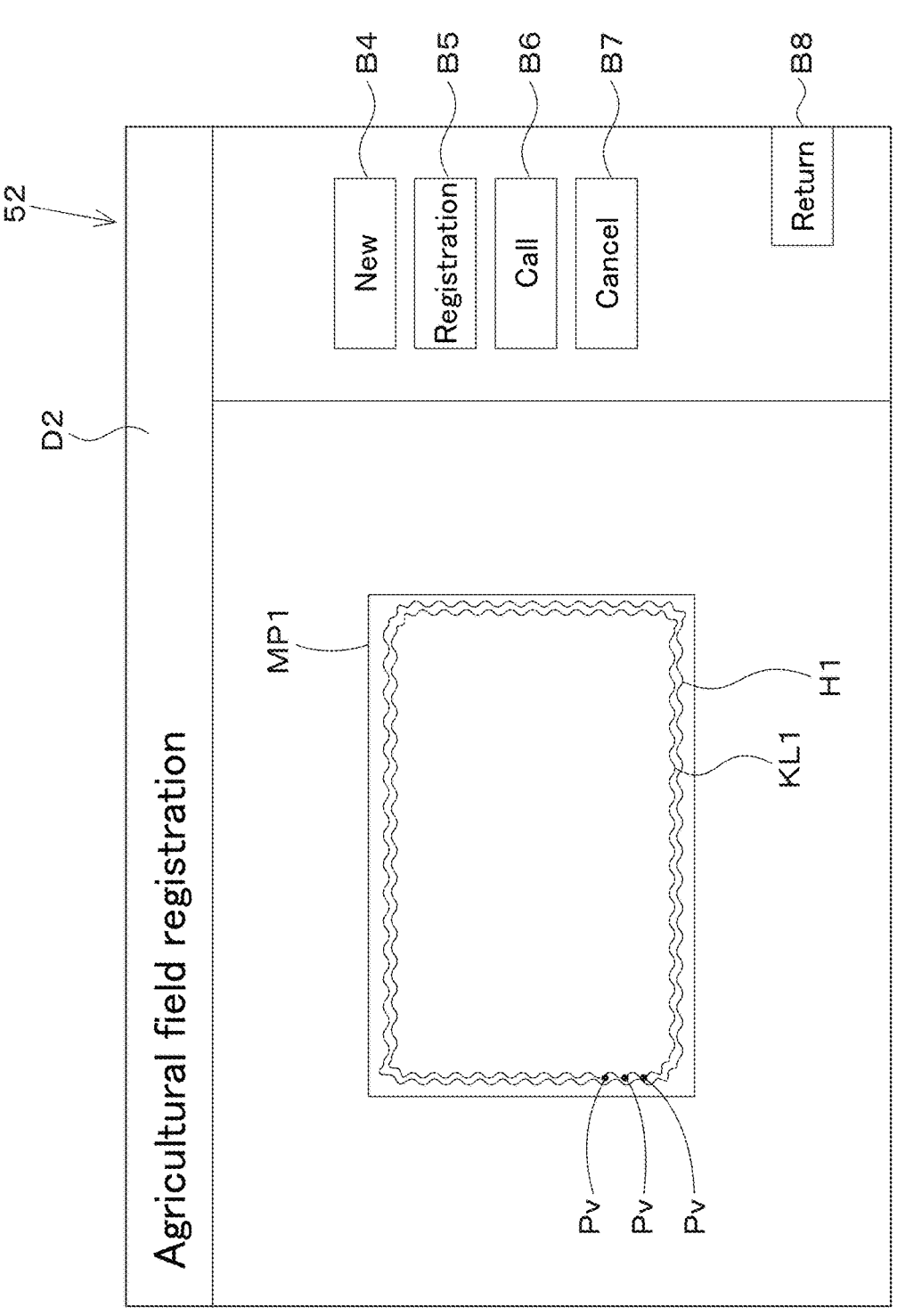
FIG. 4 illustrates an example of an agricultural field registration screen.

When an operator (e.g., the driver of the agricultural machine 1) selects the agricultural field key B1 on the home screen D1 of FIG. 3, the controller 51 causes an agricultural field registration screen D2 illustrated in FIG. 4 to be displayed on the display operator 52. On the agricultural field registration screen D2, a map MP1, a position Pv of the traveling body 3 of the agricultural machine 1, a new key B4, a registration key B5, a call key B6, a cancel key B7, and a return key B8 are displayed. In the map MP1, an image showing a map around a position where the agricultural machine 1 is present is displayed. Data of the map is acquired by the controller 51 by using the positioning device 40 or stored in advance in the storage 53. Furthermore, in the map MP1, an agricultural field where the agricultural machine 1 performs agricultural work is displayed, and positional information such as latitude and longitude is associated with the agricultural field. When the operator performs predetermined operation on the map MP1, a map displayed in the map MP1 is zoomed in or out or a displayed portion of the map is moved.

Figure 5A:
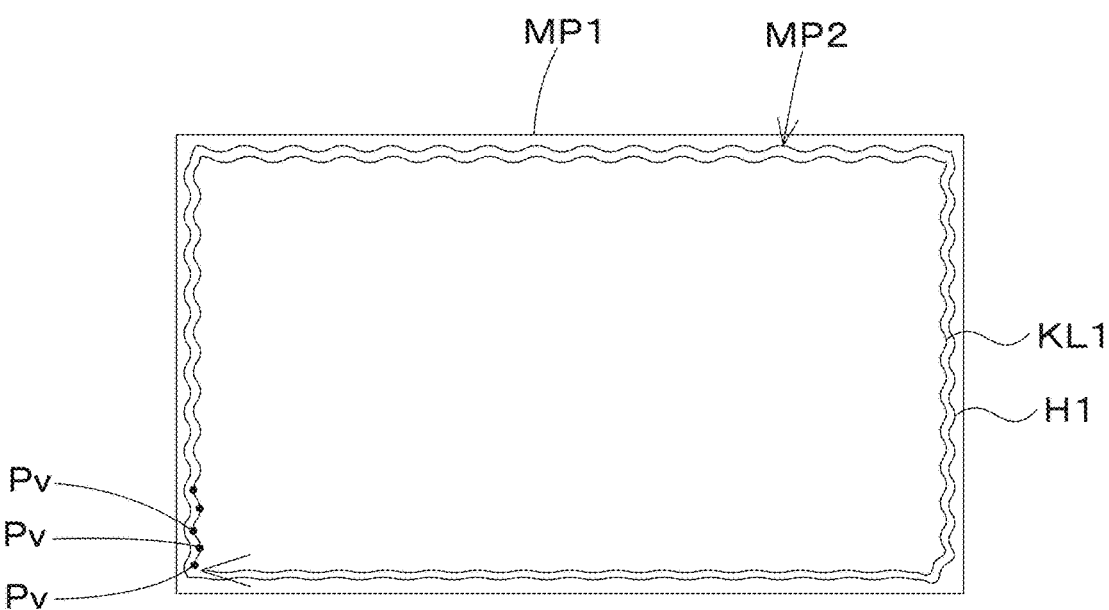
FIG. 5A is a view for explaining a method for registering an agricultural field.

FIG. 5A is a view for explaining a method for registering an agricultural field. For example, the operator selects the new key B4 on the agricultural field registration screen D2 illustrated in FIG. 4, and manually drives the agricultural machine 1 to circle along a ridge or the like surrounding the agricultural field within the agricultural field. In this process, no agricultural work may be performed on the agricultural field by the working device 2 by causing the raising/lowering device 8 to raise the working device 2 or agricultural work may be performed on the agricultural field by the working device 2 by causing the raising/lowering device 8 to lower the working device 2. The controller 51 of the agricultural work assistance device 50 (FIG. 1) acquires the position Pv detected by the positioning device 40 on a predetermined cycle by using the communicator 54, records the detected position Pv in an internal memory as needed, and displays the detected position Pv on the map MP1 as needed (only some positions Pv are displayed for convenience of illustration in FIGS. 4 and 5A).

When the circling of the agricultural machine 1 within the agricultural field is finished, the operator selects the registration key B5. As a result, the agricultural field register 51a calculates a traveling track KL1 of the traveling body 3 on the basis of a plurality of detected positions Pv that have been recorded. As illustrated in FIG. 5A, the controller 51 causes the traveling track KL1 to be displayed on the map MP1. In the example of FIG. 5A, a line KL1 passing the plurality of detected positions Pv in an order of detection (order of acquisition) and returning to an initially detected position Pv is regarded as a traveling track of the traveling body 3.

The detected position Pv is a position of a GPS included in the positioning device 40. The GPS is installed at a predetermined position (e.g., a substantially central portion of the traveling body 3 when the agricultural machine 1 is viewed in plan view) of the traveling body 3. The traveling track KL1 is a track of movement of the GPS position. Accordingly, the agricultural field register 51a forms a line H1 between the traveling track KL1 and an external line of the map MP1 by offsetting the traveling track KL1 outward by a predetermined amount equivalent to an interval in the width direction from the GPS position of the agricultural machine 1 to an outer end of the circling working device 2 (in FIG. 5A, a left end of the working device 2 since the agricultural machine 1 circles in the agricultural field in a clockwise direction). In this process, the agricultural field register 51a refers to an entire width of the working device 2 included in the dimension information of the working device 2 registered (stored) in advance in the internal memory of the controller 51 or the storage 53.

Since the GPS position of the positioning device 40 is at a center of the traveling body 3 and the center of the traveling body 3 in the width direction and a center of the working device 2 in the width direction match in this example, the offset amount is set identical to a half of an entire width (a length of an external shape in the width direction) of the working device 2 or a half of a work width (a length in the width direction) of the working device 2 where ground work can be performed. In another example, the line H1 may be formed between the traveling track KL1 and the external line of the map MP1 while setting, as the offset amount, a value that is smaller by a predetermined degree or larger by a predetermined degree than the interval in the width direction from the GPS position of the agricultural machine 1 to the outer end of the circling working device 2. Alternatively, the operator may enter any offset amount by selecting the setting key B0 of the home screen D1 and performing predetermined input operation.

The agricultural field register 51a regards the line H1 thus formed as a contour (external shape) of the agricultural field and registers (stores) the agricultural field map MP2 (data indicative of the contour of the agricultural field) expressed by the contour H1 in the storage 53. When registering the agricultural field map MP2, the agricultural field register 51a registers, in the storage 53, a name and identification information of the agricultural field and in association with the agricultural field map MP2. Note that, for example, the identification information of the agricultural field may be allocated by the agricultural field register 51a, may be input by the operator by operating the display operator 52, or may be stored in advance in the storage 53. A plurality of sets of agricultural field information, examples of which include the agricultural field map MP2, a name of an agricultural field, and identification information of the agricultural field, can be registered in the storage 53. When the agricultural field register 51a registers agricultural field information, the controller 51 causes the agricultural field map MP2 (the contour H1 of the agricultural field) included in the agricultural field information to be displayed on the map MP1.

Figure 5B:
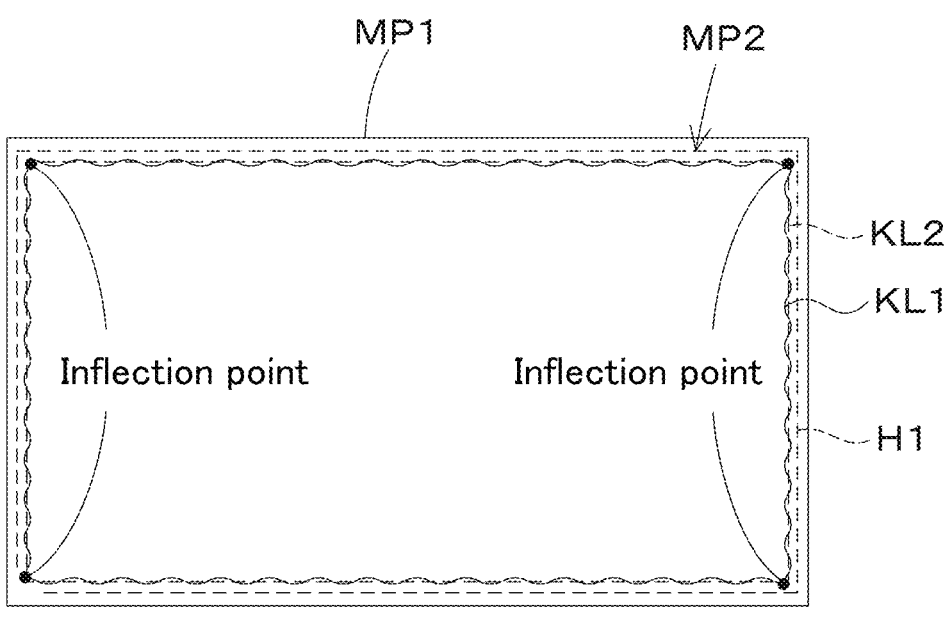
FIG. 5B is a view for explaining another method for registering an agricultural field.

The above method for registering the agricultural field is an example, and a method for registering the agricultural field is not limited to this. In another example, the agricultural field register 51a calculates inflection points from the traveling track KL1 of the traveling body 3 and form a line KL2 passing the inflection points, as illustrated in FIG. 5B. The agricultural field register 51a may form a line H1 between the traveling track KL1 and the external line of the map MP1 by offsetting the line KL2 outward by the offset amount, regard the line H1 as a contour H1 of the agricultural field and the agricultural field map MP2, and register the agricultural field map MP2 in the storage 53.

Figure 5C:
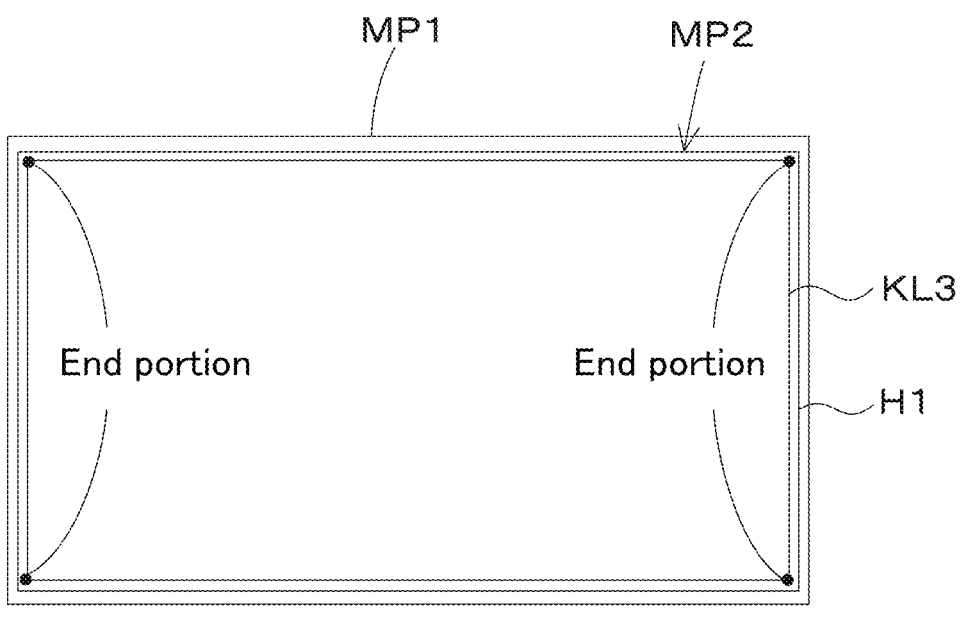
FIG. 5C is a view for explaining another method for registering an agricultural field.

Alternatively, the operator may designate end portions of the agricultural field by operating a predetermined switch or the like provided in the operating device 62 while the agricultural machine 1 is circling, as illustrated in FIG. 5C. In this case, the agricultural field register 51a forms a line KL3 passing the end portions of the agricultural field in an order of designation and returning to an initially designated end portion. The agricultural field register 51a may form a line H1 between the traveling track KL3 and the external line of the map MP1 by offsetting the line KL3 outward by the above offset amount, regard the line H1 as the contour H1 of the agricultural field and the agricultural field map MP2, and register the agricultural field map MP2 in the storage 53. Furthermore, the contour H1 of the agricultural field and the agricultural field map MP2 may be, for example, data expressed by a position (latitude and longitude), data expressed by a coordinate (an X-axis and a Y-axis) system, or data expressed in another way.

When the operator selects the call key B6 on the agricultural field registration screen D2 illustrated in FIG. 4, the controller 51 reads out data of any agricultural field map MP2 registered in the storage 53 and causes the agricultural field map MP2 to be displayed on the agricultural field registration screen D2 on the basis of the data. When the operator selects the cancel key B7, the agricultural field register 51a deletes the position Pv of the traveling body 3 and the agricultural field map MP2 (the contour H1 of the agricultural field) displayed on the map MP1 at this time and deletes data thereof from the storage 53. That is, registration of the contour H1 of the agricultural field and the agricultural field map MP2 is canceled.

When the operator selects the return key B8 after registration of the agricultural field is finished, the controller 51 causes the home screen D1 of FIG. 3 to be displayed on the display operator 52. That is, the return key B8 is a key for returning a display screen of the display operator 52 to a previous screen. When the operator selects the automatic driving key B2a on the home screen D1, the controller 51 causes a work selection screen D3 illustrated in FIG. 6 to be displayed on the display operator 52.

On the work selection screen D3, a message indicative of an input operation procedure is displayed. Furthermore, on the work selection screen D3, a plurality of work keys B31 to B35, an up arrow key B41, a down arrow key B42, a next key B9, and a return key B8 are displayed. The work keys B31 to B35 are keys indicative of agricultural work that can be performed by the agricultural machine 1 and the working device 2 coupled to the agricultural machine 1. Although the five work keys B31, B32, B33, B34, and B35 are displayed in FIG. 6, the controller 51 causes a work key indicative of another work to be displayed on the work selection screen D3 in response to operator's selection of the up arrow key B41 or the down arrow key B42 in a case where there are six or more kinds of agricultural work that can be performed by the agricultural machine 1 and the working device 2.

Figure 6:
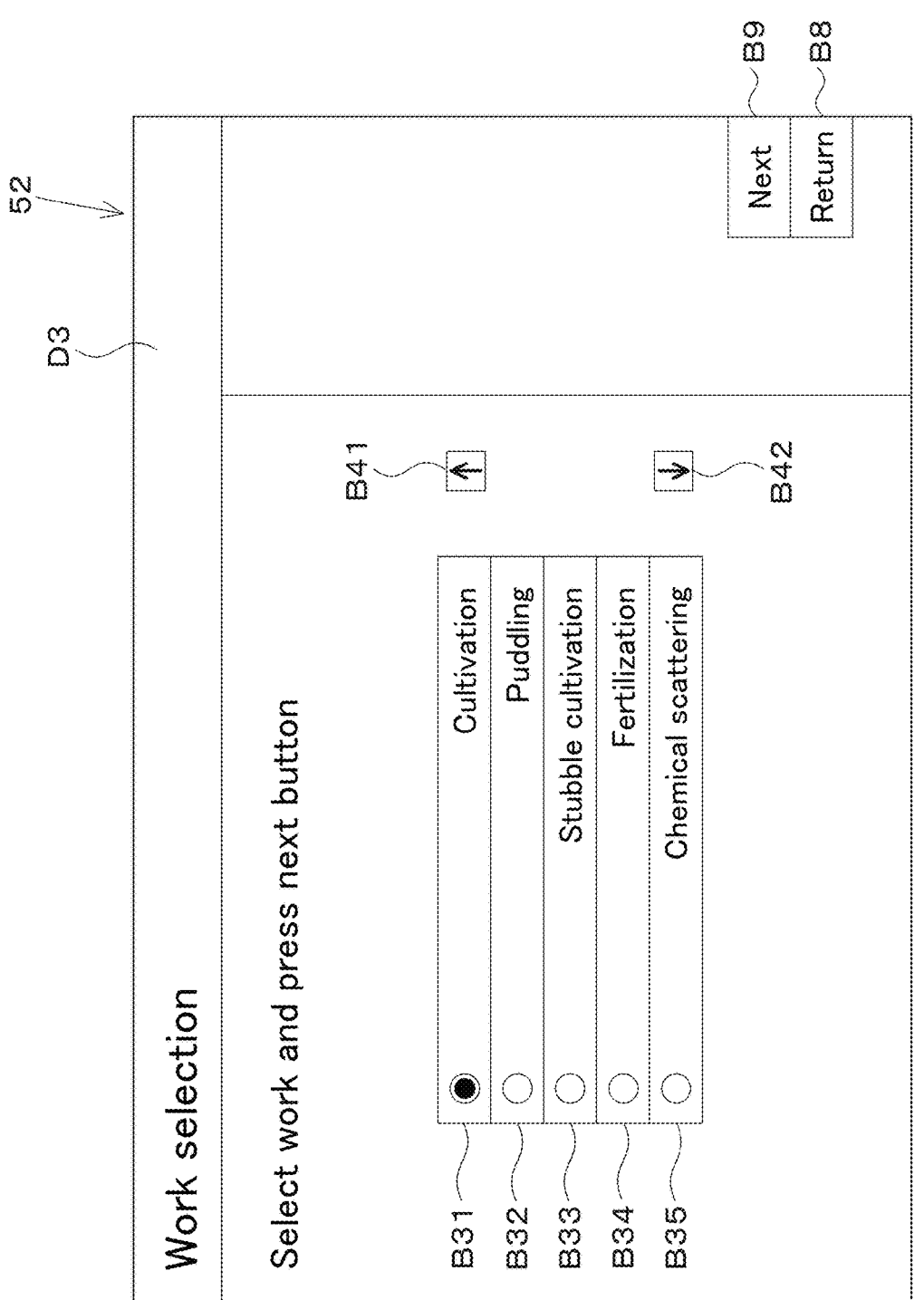
FIG. 6 illustrates an example of a work selection screen.

When the operator selects any of the work keys B31 to B35, the controller 51 causes the selected work key to be displayed on the work selection screen D3 in a display form different from other work keys. In the example of FIG. 6, only the selected cultivation work key B31 is given a black circle mark. When the operator selects the next key B9 in a state where any of the work keys B31, B32, B33, B34, and B35 is being selected, the controller 51 causes a kind of agricultural work corresponding to the selected work key to be stored in the internal memory. The kind of agricultural work is thus input. Furthermore, the controller 51 causes a vehicle confirmation screen D4a illustrated in FIG. 7A to be displayed on the display operator 52. That is, the next key B9 is a key for switching a display screen of the display operator 52 to a next screen.

Figure 7A:
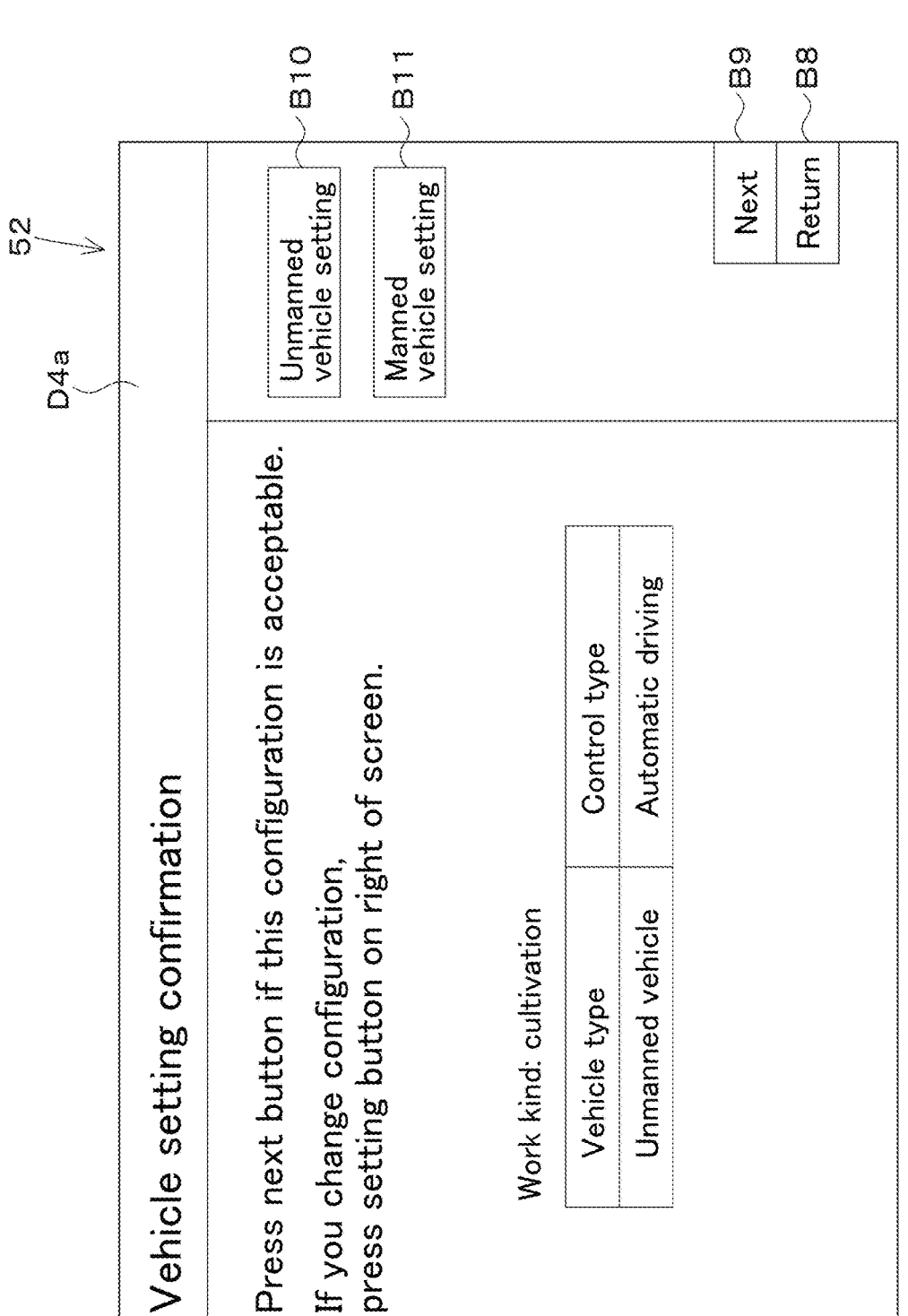
FIG. 7A illustrates an example of a vehicle confirmation screen.

On the vehicle confirmation screen D4a illustrated in FIG. 7A, a message indicative of an input operation procedure, a kind of agricultural work, a type of the agricultural machine 1, an unmanned vehicle setting key B10, a manned vehicle setting key B11, a next key B9, and a return key B8 are displayed. In the kind of agricultural work, the agricultural work selected on the work selection screen D3 is shown. The type of the agricultural machine 1 includes a vehicle type and a control type. In FIG. 7A, a type of the agricultural machine 1 registered (set) in advance is displayed on the vehicle confirmation screen D4a.

Note that the operator can input the type of the agricultural machine 1, for example, by selecting the setting key B0 of the home screen D1 (FIG. 3) and performing predetermined input operation on the display operator 52. In this case, the operator can input specifications such as a name and a dimension of the agricultural machine 1 by performing predetermined input operation. Furthermore, when the operator performs predetermined input operation, the controller 51 causes the input type and specifications of the agricultural machine 1 to be stored in a predetermined region of the storage 53, and thereby registers the type and specifications. Information on the agricultural machine 1 and information on the working device 2 that will be described later can also be registered (stored) in the storage 53 by inputting the information on the home screen D1 by a similar procedure.

The operator can change the type of the agricultural machine 1 by selecting the unmanned vehicle setting key B10 or the manned vehicle setting key B11 on the vehicle confirmation screen D4a and performing predetermined input operation. When the operator selects the next key B8 of the vehicle confirmation screen D4a, the controller 51 causes setting information (the kind of agricultural work and the type of the agricultural machine 1) displayed on the vehicle confirmation screen D4a to be stored in the internal memory and causes a device selection screen D4b illustrated in FIG. 7B to be displayed on the display operator 52.

On the device selection screen D4b, a message indicative of an input operation procedure, working device keys B36a to B36d, an up arrow key B41, a down arrow key B42, a next key B9, and a return key B8 are displayed. In each of the working device keys B36a to B36d, representative device-specific information of the working device 2 is shown.

In the storage 53, device-specific information of a plurality of working devices 2 is registered (stored) in advance. The device-specific information of the working device 2 includes information such as identification information of the working device 2, a name, dimension information, and a type of the working device 2 associated with the identification information, a kind of agricultural work performed by the working device 2, and whether or not there is work previously performed by the working device 2. Among these pieces of information, the representative device-specific information of the working device 2 displayed on the device selection screen D4b includes a name of the working device 2, whether or not there is work previously performed by the working device 2, and a work width.

The controller 51 reads out, from the storage 53, representative device-specific information of all working devices 2 that can perform the agricultural work selected (input) on the work selection screen D3 (FIG. 6) among the working devices 2 registered in advance in the storage 53 and causes the representative device-specific information to be stored in the internal memory, and then causes the representative device-specific information to be displayed in the corresponding working device keys B36a to B36d of the device selection screen D4b by the display operator 52.

Figure 7B:
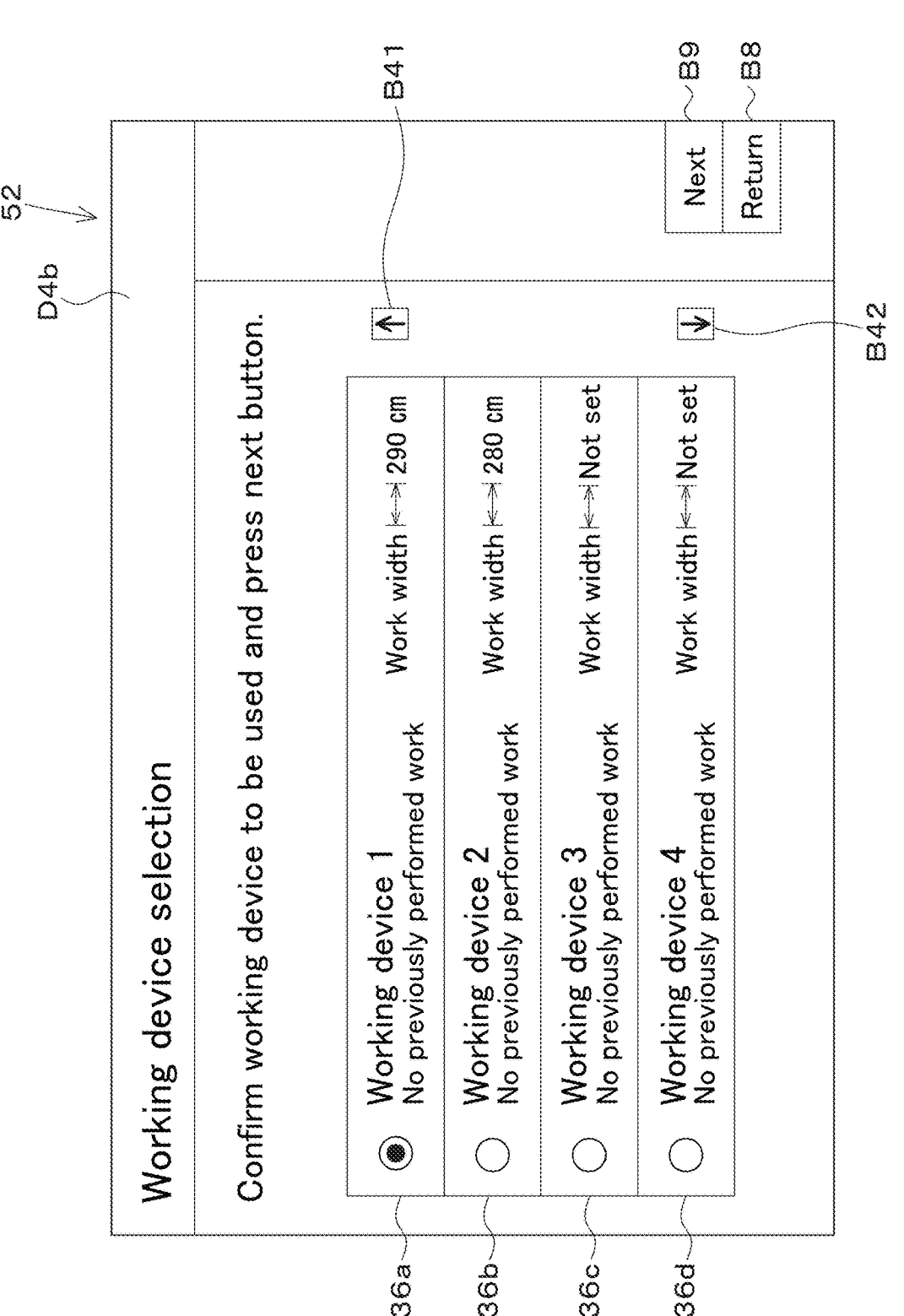
FIG. 7B illustrates an example of a device selection screen.

Although the four working device keys B36a to B36d are displayed in FIG. 7B, the operator selects the up arrow key B41 or the down arrow key B42 in a case where five or more working devices 2 that can perform the agricultural work selected on the work selection screen D3 (FIG. 6) are registered. As a result, the controller 51 causes the working device key indicative of another working device 2 that is not displayed on the device selection screen D4b to be displayed on the device selection screen D4b.

When the operator selects any of the working device keys B36a to B36d, the controller 51 causes the selected working device key to be displayed on the device selection screen D4b in a display form different from other working device keys. In the example of FIG. 7B, only the selected working device key B36a is given a black circle mark. When the operator selects the next key B9 in a state where any of the working device key B36a to B36d is being selected, the controller 51 causes a device confirmation screen D4c illustrated in FIG. 7C to be displayed on the display operator 52.

On the device confirmation screen D4c, a message indicative of an input operation procedure, device-specific information of the working device 2 selected on the device selection screen D4b (FIG. 7B), setting keys B37 to B39, a next key B9, and a return key B8 are displayed. The device-specific information of the working device 2 displayed on the device confirmation screen D4c includes a name of the working device 2, whether or not there is work previously performed by the working device 2, dimension information of the working device 2, and a type of the working device 2. That is, detailed specifications of the working device 2 selected on the device selection screen D4b are displayed on the device confirmation screen D4c.

When the operator operates the next key B9 in a state where any of the working device keys B36a to B36d is being selected on the device selection screen D4b (FIG. 7B), the working device 2 corresponding to the selected work key is decided. In this case, the controller 51 reads out, from the storage 53, all or specific device-specific information of the working device 2 stored in the storage 53 in association with identification information of the working device 2 thus decided and causes the device-specific information thus read out to be stored in the internal memory, and then causes the device-specific information to be displayed on the device confirmation screen D4c (FIG. 7C) by the display operator 52.

Figure 7C:
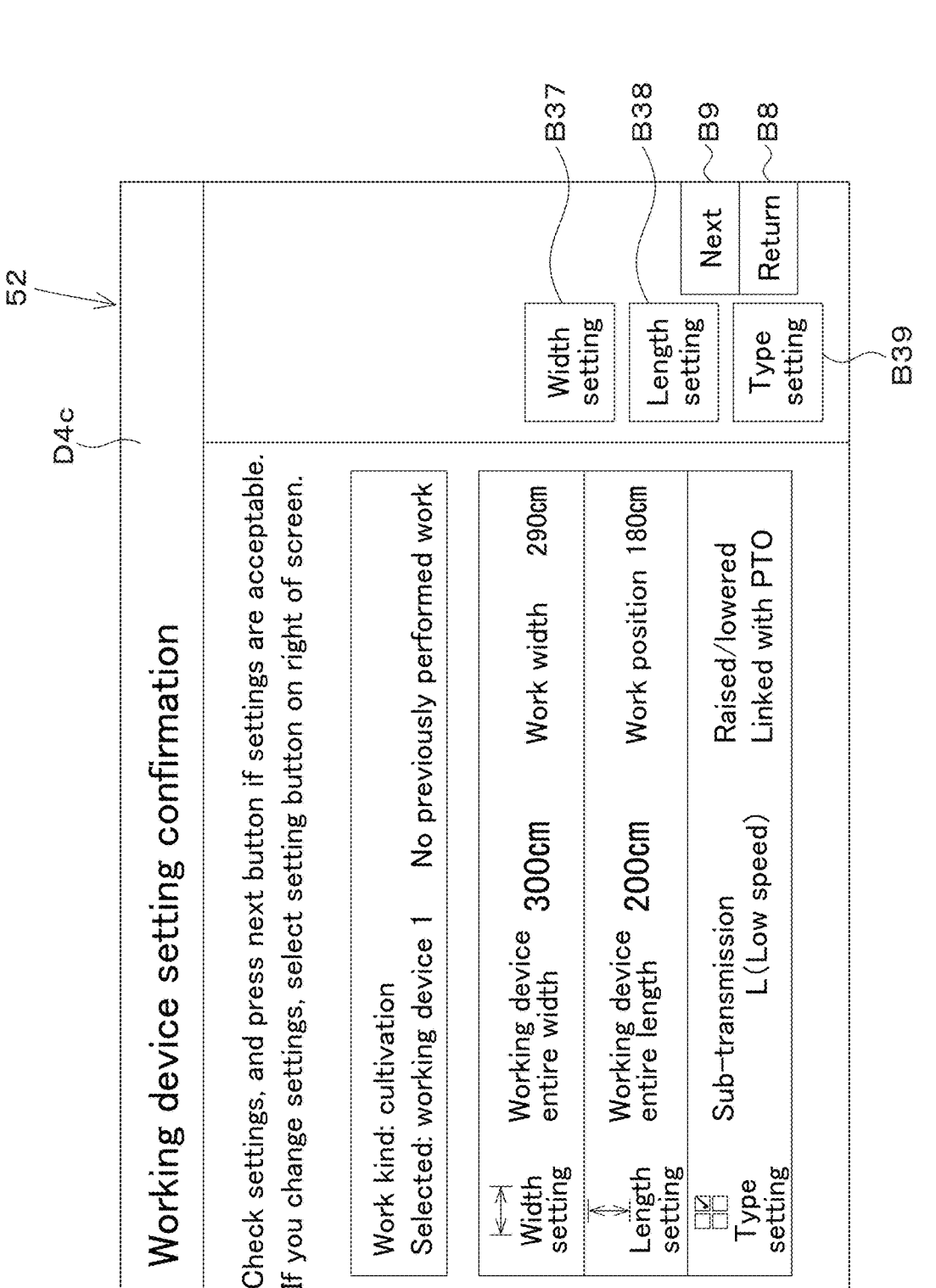
FIG. 7C illustrates an example of a device confirmation screen.

As illustrated in FIG. 7C, the dimension information, which is one kind of device-specific information of the working device 2, includes an entire width, a work width, an entire length, and a work position of the working device 2. The type of the working device 2 includes a speed stage of a sub-transmission (not illustrated) for driving the working device 2 that is a cultivator to rotate, whether or not the working device 2 is raised or lowered by the raising/lowering device 8, and whether or not the agricultural machine 1 is linked with PTO (Power take-off).

The setting keys B37 to B39 are keys for setting and changing the dimension information or type of the working device 2. Specifically, when the operator selects the width setting key B37, the controller 51 causes a width setting screen D4d illustrated in FIG. 7D to be displayed on the display operator 52. On the width setting screen D4d, a setting value of an entire width (a width A on the screen D4d) of the working device 2 and a setting value of a work width (a width B on the screen D4d) of the working device 2 can be changed. The entire width of the working device 2 refers to a length (width) of an external shape of the working device 2 in a left-right direction (the width direction) perpendicular to a traveling direction and a height direction of the agricultural machine 1. The work width of the working device 2 refers to a width (length) in the left-right direction where the working device 2 can perform ground work within a horizontal plane perpendicular to the traveling direction of the agricultural machine 1 and the working device 2. By selecting an input column K1 for the entire width or an input column K2 for the work width and then moving a cursor K12 on a scale K11 leftward or rightward by operating (tapping) a positive key B45 or a negative key B46, the operator can input a changed value of the entire width or the work width in the input column K1 or K2.

Figure 7D:
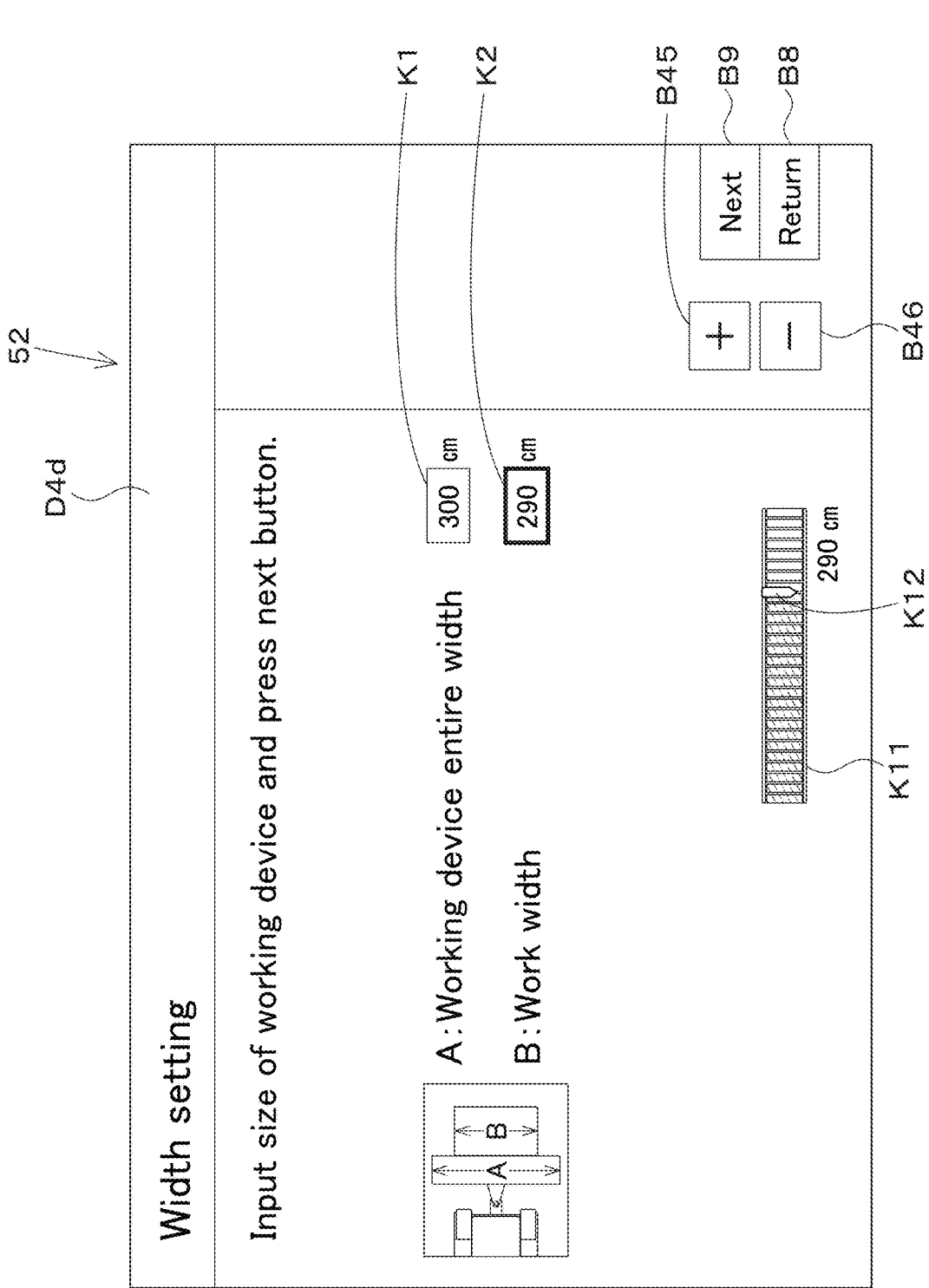
FIG. 7D illustrates an example of a width setting screen.

Although the work width (B) of the working device 2 is narrower than the entire width (A) in FIG. 7D, the work width (B) may be larger than the entire width (A) depending on the type of the working device 2. Specifically, for example, a first working device such as a cultivator, a stubble cultivator, or a puddling device performs first agricultural work such as cultivation work, stubble cultivation work, or puddling in a situation where the work width (B) is equal to or less than the entire width (A). The first agricultural work is agricultural work performed in contact with an object such as soil, water, or a crop present in the agricultural field. The first working device is a working device to perform the first agricultural work. On the other hand, a second working device such as a spreader performs second agricultural work such as fertilization, chemical scattering, or sprinkling of water in a situation where the work width (B) is equal to or less than the entire width (A) and a situation where the work width (B) exceeds the entire width (A) (the work width (B) is larger than the entire width (A)). The second agricultural work is agricultural work performed apart from an object present in the agricultural field, and examples thereof include spreading work. The second working device is a working device to perform the second agricultural work.

When the operator selects the next key B9 on the width setting screen D4*d*, the controller 51 causes dimension information (the work width (B) and the entire width (A)) of the working device 2 displayed on the width setting screen D4*d* to be stored in the internal memory as changed values. The changed values of the dimension information (the work width (B) and the entire width (A)) of the working device 2 are thus input. Then, the dimension determiner 51*d* performs dimension restriction processing.

Figure 8:
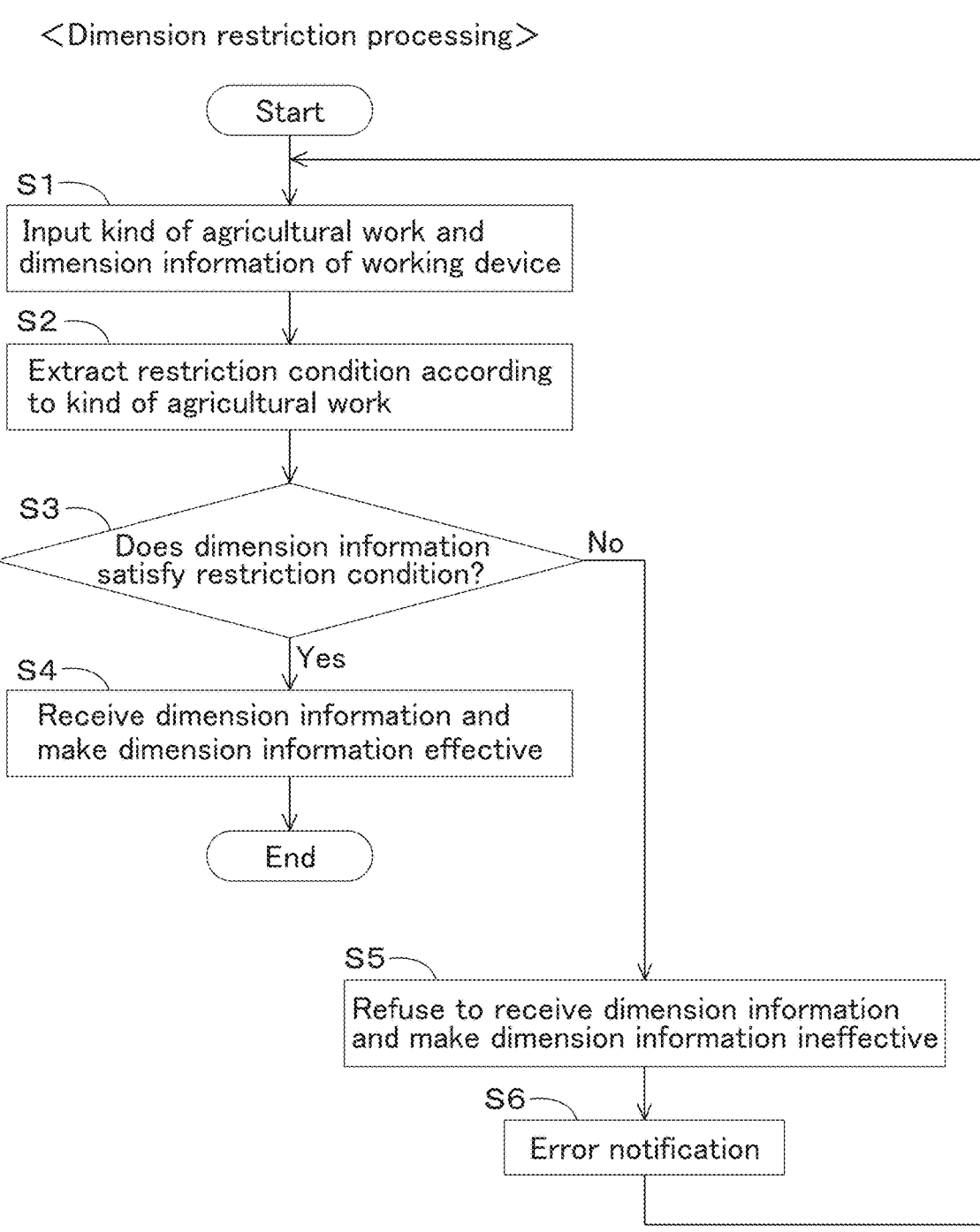
FIG. 8 is a flowchart illustrating dimension restriction processing.

FIG. 8 is a flowchart illustrating the dimension restriction processing. The dimension restriction processing is processing for determining whether or not the dimension information of the working device 2 input by the display operator 52 as described above satisfies a predetermined restriction condition and determining whether or not to receive the dimension information of the working device 2 in accordance with a result of the determination.

As described above, when the operator selects the next key B9 on the width setting screen D4*d*, the dimension information (the changed values of the work width (B) and the entire width (A)) of the working device 2 displayed on the width setting screen D4*d* is stored in the internal memory of the controller 51. The dimension information is thus input. The dimension determiner 1*d* checks that the kind of agricultural work has been input on the work selection screen D3 (FIG. 6) and the dimension information of the working device 2 has been input on the width setting screen D4*d* (S1 in FIG. 8), and reads out these pieces of input information from the internal memory of the controller 51. Then, the dimension determiner 1*d* extracts (reads out) a predetermined restriction condition according to the kind of agricultural work from the storage 53 (S2).

In a predetermined storage region of the storage 53, information indicative of contents of a restriction condition table T1 such as the one illustrated in FIG. 9 is stored in advance. In the restriction condition table T1, a restriction condition concerning the entire width (A) and the work width (B) of the working device 2 included in the dimension information of the working device 2 is associated with each kind of agricultural work. Specifically, in the restriction condition table T1, a restriction condition that the work width (B) is equal to or less than the entire width (A) (B≤A) is associated with the cultivation work, the puddling work, and the stubble cultivation work. On the other hand, a restriction condition concerning the work width (B) and the entire width (A) is not associated with the spreading work.

That is, a restriction condition concerning the work width (B) and the entire width (A) is not set for the spreading work.

In a case where any of the cultivation work, the puddling work, and the stubble cultivation work is input as the kind of agricultural work, the dimension determiner 1*d* extracts a restriction condition that the work width (B) is equal to or less than the entire width (A) (B≤A) by referring to the restriction condition table T1 stored in the storage 53 (S2 in FIG. 8). In a case where the spreading work is input as the kind of agricultural work, the dimension determiner 1*d* confirms that there is no restriction condition concerning the work width (B) and the entire width (A) by referring to the restriction condition table T1 (S2 in FIG. 8).

In another example, a restriction condition that the work width (B) is equal to or less than the entire width (A) (B≤A) or the work width (B) is larger than the entire width (A) (B>A) may be associated with the spreading work in the restriction condition table T1. In this case, in a case where the spreading work is input as the kind of agricultural work, the dimension determiner 1*d* extracts a restriction condition that the work width (B) is equal to or less than the entire width (A) (B≤A) or the work width (B) is larger than the entire width (A) (B>A) (S2 in FIG. 8).

Next, the dimension determiner 1*d* determines whether or not the input dimension information (the changed values of the work width (B) and the entire width (A)) of the working device 2 satisfies the extracted restriction condition. For example, in a case where the kind of agricultural work is any of the cultivation work, the puddling work, and the stubble cultivation work, the dimension determiner 1*d* determines that the dimension information of the working device 2 does not satisfy the restriction condition (B≤A) (S3: NO) in a case where the input work width (B) is larger than the entire width (A), and the dimension determiner 1*d* refuses to receive the dimension information and makes the dimension information ineffective (S5). The dimension information of the working device 2 whose receipt has been refused by the dimension determiner 51*d* is, for example, deleted from the internal memory by the controller 51. Accordingly, the inappropriate dimension information of the working device 2 that does not satisfy the restriction condition is not used thereafter by units such as the agricultural field register 51*a*, the area setter 51*b*, and the route creator 51*c*.

In a case where the dimension determiner 1*d* determines that the dimension information of the working device 2 does not satisfy the restriction condition (B≤A) (S3: NO), the dimension determiner 1*d* provides an error notification indicative of the determination result by using the notifier 51*g* (S6). In this case, for example, as illustrated in FIG. 7F, the notifier 51*g* displays, in a pop-up manner, an error notification U1 including a message M1 indicating that the work width of the working device 2 exceeds the entire width and a message M2 prompting change of the work width or the entire width on the width setting screen D4*d*. When a close key B80 is tapped, the error notification U1 is deleted from the width setting screen D4*d*. Then, when the operator inputs the dimension information (the changed values of the work width (B) and the entire width (A)) of the working device 2 again on the width setting screen D4*d*, the dimension determiner 1*d* performs step S1 and subsequent steps of FIG. 8 again.

In a case where the kind of agricultural work is any of the cultivation work, the puddling work, and the stubble cultivation work, the dimension determiner 1*d* determines that the dimension information of the working device 2 satisfies the restriction condition (B≤A) (S3: YES in FIG. 8) in a case where the input work width (B) is equal to or less than the entire width (A), receives the dimension information, and makes the dimension information effective (S4). In a case where the kind of agricultural work is the spreading work, the dimension determiner 1*d* determines that the dimension information of the working device 2 satisfies the restriction condition (S3: YES) both in a case where the input work width (B) is equal to or less than the entire width (A) and in a case where the work width (B) is larger than the entire width (A), receives the dimension information, and makes the dimension information effective (S4).

The dimension information of the working device 2 that has been received by the dimension determiner 51*d* as described above is, for example, stored as effective dimension information in the internal memory by the controller 51. The effective dimension information of the working device 2 stored in the internal memory is used hereinafter by units such as the agricultural field register 51*a*, the area setter 51*b*, the route creator 51*c*, and the boundary-crossing determiner 51*e*.

When the dimension determiner 1*d* receives the dimension information of the working device 2 (S4), the dimension restriction processing ends. In other words, the dimension restriction processing does not end until the dimension information (the changed values of the work width (B) and the entire width (A)) of the working device 2 that satisfies the restriction condition is input. When the dimension restriction processing ends, the controller 51 causes the device confirmation screen D4*c* (FIG. 7C) reflecting the effective dimension information of the working device 2 received by the dimension determiner 1*d* to be displayed on the display operator 52 again.

By thus refusing receipt of the dimension information of the working device 2 that does not satisfy the restriction condition (S5), the dimension determiner 1*d* prevents execution of processing using the dimension information of the working device 2 such as creation of a traveling route by the route creator 51*c*, which will be described later, display (output) of the traveling route L1 by the display operator 52, transmission (output) of the traveling route to the automatic controller 61 (FIG. 1) by the communicator 54, and determination as to whether or not a boundary has been crossed by the boundary-crossing determiner 51*e*.

Note that the dimension information of the working device 2 on the device confirmation screen D4*c* (FIG. 7C) displayed on the display operator 52 when the operator selects any of the working device keys B36*a* to B36*d* and operates the next key B9 on the device selection screen D4*b* (FIG. 7B) is dimension information of the working device 2 registered in advance in the storage 53 as described above and is set to a value that satisfies the restriction condition. Furthermore, dimension information of the working device 2 on the width setting screen D4*d* (FIG. 7D) displayed on the display operator 52 when the operator operates the width setting key B37 on the device confirmation screen D4*c* for the first time is also dimension information of the working device 2 registered in advance in the storage 53 as described above and is set to a value that satisfies the restriction condition.

Accordingly, in a case where the next key B9 is operated without input of changed values of the dimension information of the working device 2 on the width setting screen D4*d* (FIG. 7D), the dimension information of the working device 2 displayed on the width setting screen D4*d* is input, but this dimension information is substantially dimension information of the working device 2 registered in advance in the storage 53. In this case, the dimension information of the working device 2 received by the dimension determiner 51*d* in step S1 of FIG. 8 is also dimension information input by the display operator 52, but is substantially dimension information of the working device 2 registered in advance in the storage 53.

Figure 7E:
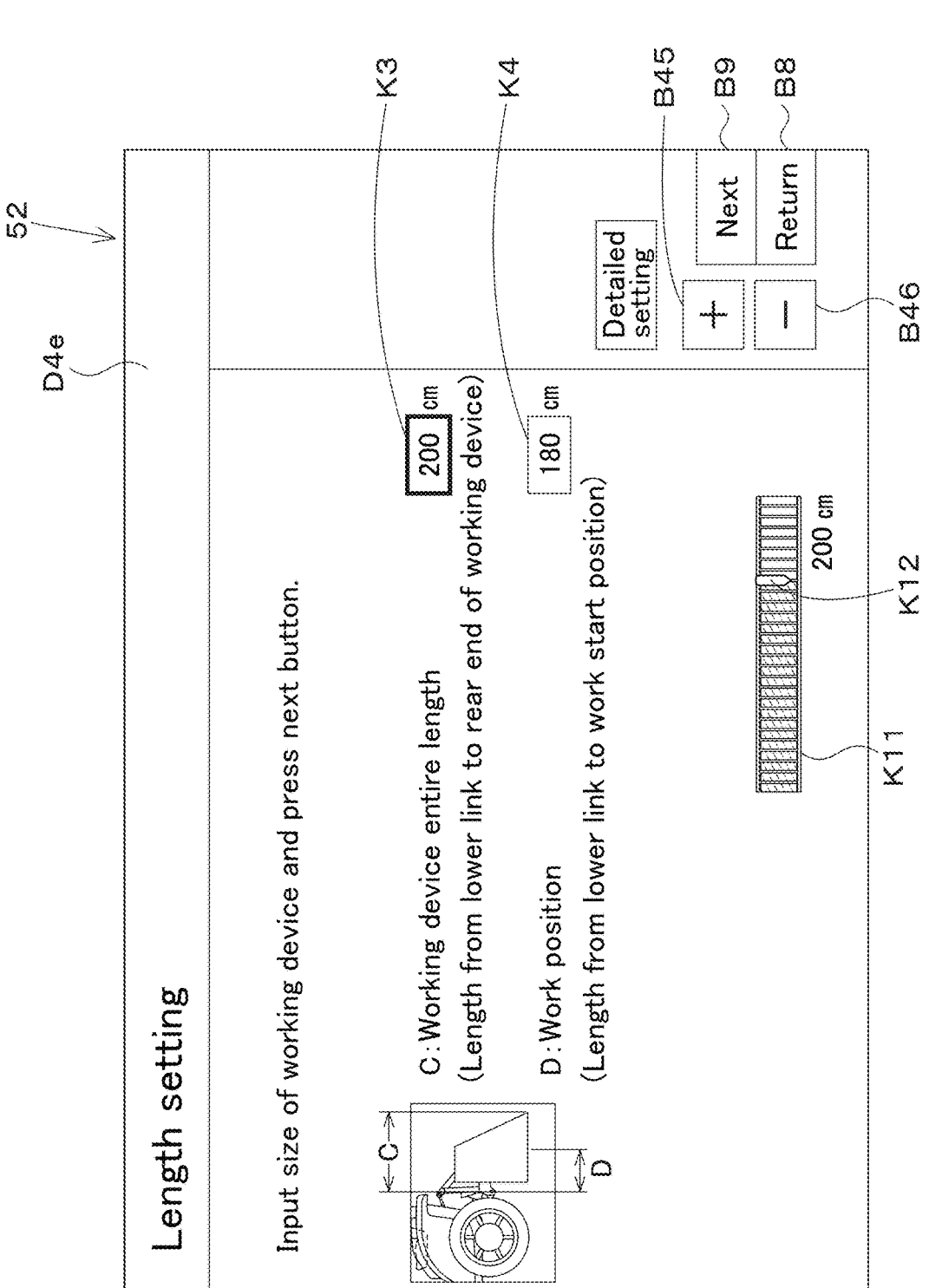
FIG. 7E illustrates an example of a length setting screen.
Figure 7F:
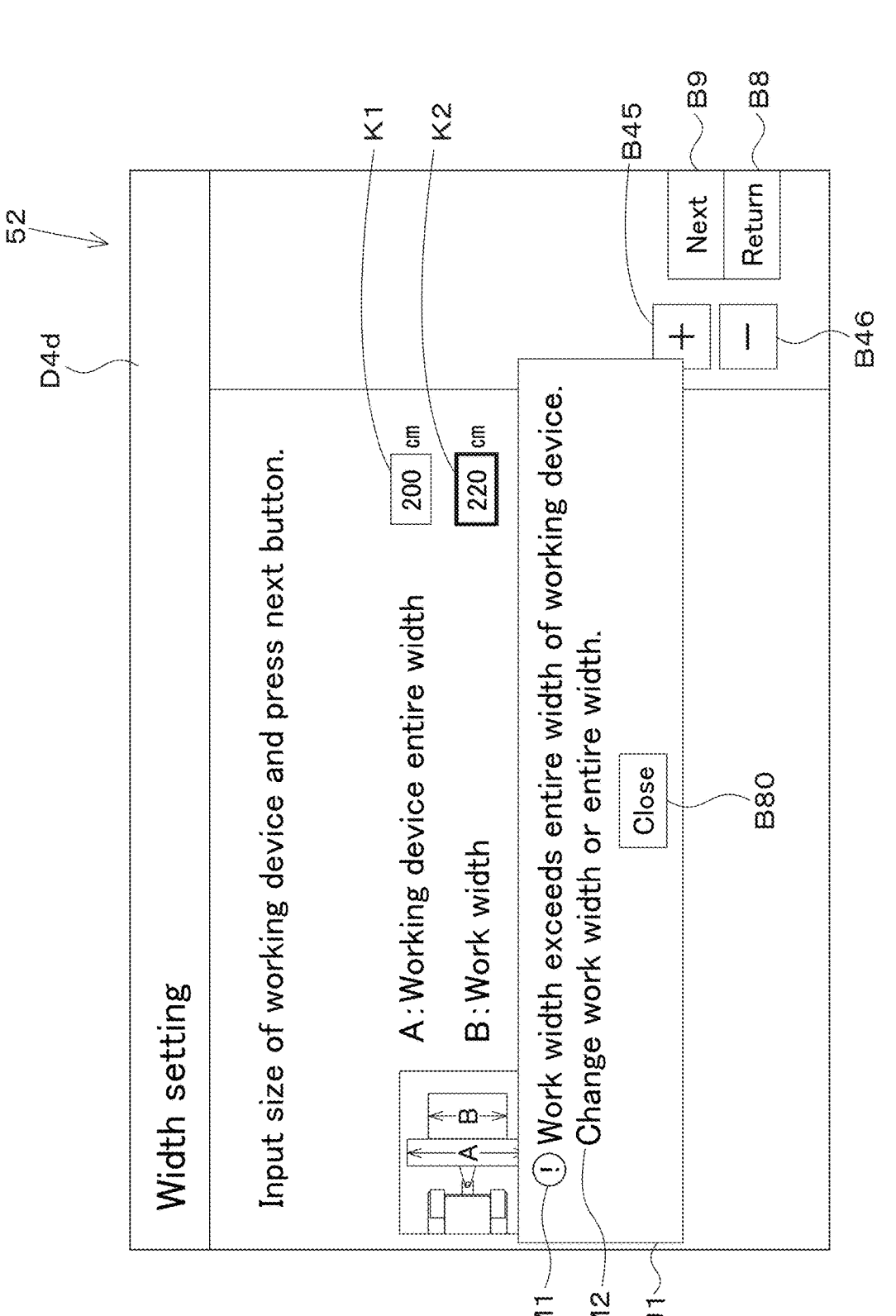
FIG. 7F illustrates an example of a notification displayed on the width setting screen.

When the operator selects the length setting key B38 on the device confirmation screen D4*c*, the controller 51 causes a length setting screen D4*e* illustrated in FIG. 7E to be displayed on the display operator 52. On the length setting screen D4*e*, setting values of an entire length and a work position of the working device 2 can be changed. The entire length is a length from a coupling position where the working device 2 is coupled with the lower link 8*b* (FIGS. 1 and 2) of the raising/lowering device 8 to a rear end of a housing of the working device 2 (a length C on the screen D4*e*). The work position is a length from the coupling position of the working device 2 to a position where ground work starts (a length D on the screen D4*e*). The position where ground work starts is a position of a front end of a work member (a blade, a bar, a nozzle, or the like) of the working device 2 that performs ground work. By selecting an input column K3 for the entire length (C) or an input column K4 for the work position (D) and then moving the cursor K12 leftward or rightward by operating the positive key B45 or the negative key B46, the operator can input a changed value of the entire length (C) or the work position (D) in the input column K3 or the input column K4.

When the operator selects the type setting key B39 on the device confirmation screen D4*c* (FIG. 7C), the controller 51 causes a type setting screen (not illustrated) to be displayed on the display operator 52. On the type setting screen, setting of the type of the working device 2 can be changed. Specifically, a speed stage of a sub-transmission, whether or not there is linkage with the PTO, whether or not the working device 2 is raised or lowered by the raising/lowering device 8, and the like can be changed on the type setting screen.

In a case where the operator selects the next key B9 after inputting a changed value of the dimension information or type of the working device 2 on the length setting screen D4*e* or the type setting screen, the controller 51 causes the device confirmation screen D4*c* reflecting the change contents of the dimension information or the type on the setting screen to be displayed on the display operator 52.

Figure 10:
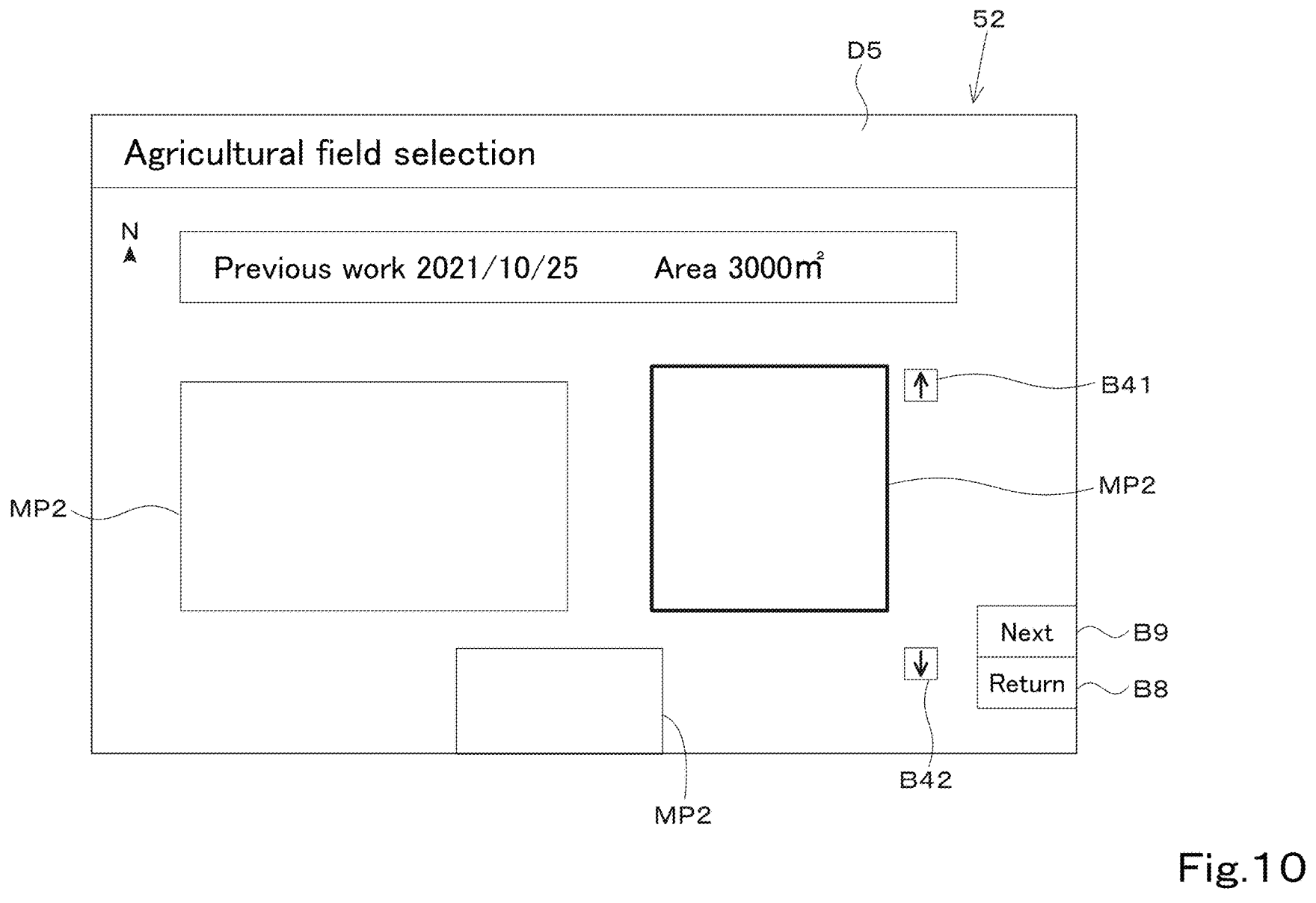

When the operator selects the next key B9 on the device confirmation screen D4*c*, the controller 51 causes setting information (the kind of agricultural work, name, dimension information, and type of the working device 2, and whether or not there is work previously performed by the working device 2) displayed on the device confirmation screen D4*c* to be stored in the internal memory, and causes an agricultural field selection screen D5 illustrated in FIG. 10 to be displayed on the display operator 52. In this process, in a case where the setting information (the kind of agricultural work, name, dimension information, and type of the working device 2, and whether or not there is work previously performed by the working device 2) displayed on the device confirmation screen D4*c* includes information that has been already stored in the internal memory, the information that has been already stored may be overwritten with the setting information displayed on the device confirmation screen D4*c* or other pieces of setting information may be stored in the internal memory without overwriting the information that has been already stored.

On the agricultural field selection screen D5 illustrated in FIG. 10, one or more registered agricultural field maps MP2, an up arrow key B41, a down arrow key B42, a next key B9, and a return key B8 are displayed. In FIG. 10, three agricultural field maps MP2 are displayed. In a case where four or more agricultural field maps MP2 are registered in advance, the controller 51 causes another agricultural field map MP2 to be displayed on the agricultural field selection screen D5 in response to operator's selection of the up arrow key B41 or the down arrow key B42.

When the operator selects any of the agricultural field maps MP2, the controller 51 causes the selected agricultural field map MP2 to be displayed in a display form different from the other agricultural field maps MP2. In FIG. 10, only the selected agricultural field map MP2 is surrounded by the thick-line frame. Furthermore, the controller 51 causes date and time of last agricultural work performed in the selected agricultural field map MP2 and an area of the agricultural field map MP2 to be displayed on the agricultural field selection screen D5. When the operator selects the next key B9 in a state where any of the agricultural field maps MP2 is being selected, the controller 51 causes information on the selected agricultural field map MP2 to be stored in the internal memory, and causes a route creation 1 screen D6 illustrated in FIG. 11 to be displayed on the display operator 52. Note that the information on the agricultural field map MP2 includes identification information, a contour, an area, and date and time of last work of the agricultural field map MP2, identification information, a position, and a contour of an agricultural field corresponding to the agricultural field map MP2.

Figure 11:
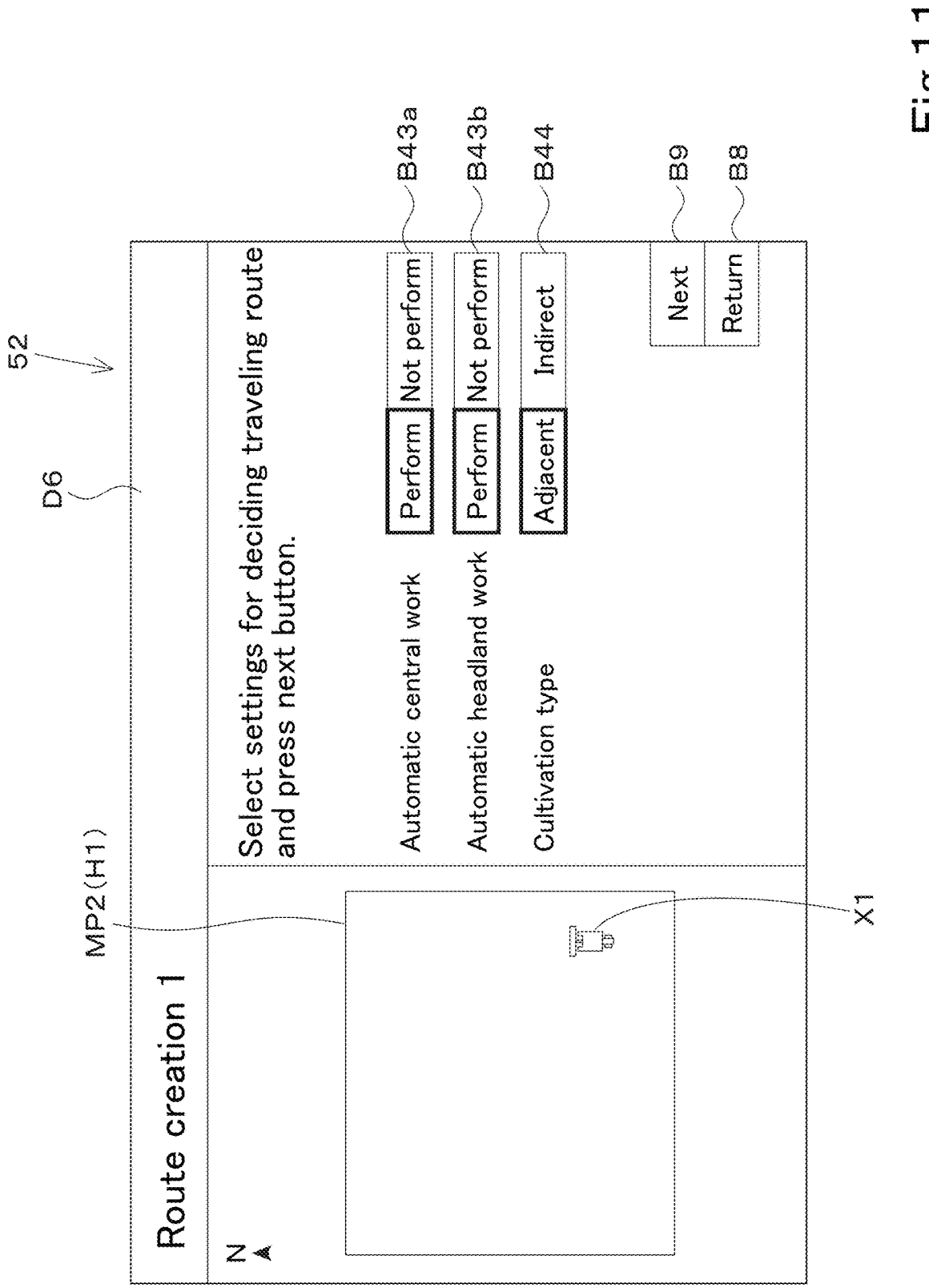
FIG. 11 illustrates an example of a route creation 1 screen.

On the route creation 1 screen D6 illustrated in FIG. 11, the selected agricultural field map MP2 (the contour H1 of the corresponding agricultural field), an agricultural machine mark X1, a message indicative of an input operation procedure, work keys B43a, B43b, and B44, a next key B9, and a return key B8 are displayed. The work keys B43a, B43b, and B44 are keys for making settings for creating a traveling route of the agricultural machine 1. In other words, the work keys B43a, B43b, and B44 are keys for setting work conditions for performing agricultural work on the agricultural field by the agricultural machine 1 (the traveling body 3) and the working device 2.

More specifically, an automatic central work key B43a is a key for selecting whether or not to perform agricultural work by the working device 2 while allowing the traveling body 3 of the agricultural machine 1 to automatically travel in a central area set in the agricultural field map MP2 as described later. An automatic headland work key B43b is a key for selecting whether or not to perform agricultural work by the working device 2 while allowing the traveling body 3 of the agricultural machine 1 to automatically travel in a headland set in the agricultural field map MP2 as described later.

A work type key B44 is a key for selecting a state of work performed by the working device 2. Since a case where the cultivation work has been selected on the work selection screen D3 of FIG. 6 is illustrated as an example in the present example embodiment, the work type key B44 of FIG. 11 is a key for selecting whether a type of the cultivation work is adjacent work or indirect work. In a case where another agricultural work is selected on the work selection screen D3 of FIG. 6, the work type key B44 of FIG. 11 is a key for selecting a state of this agricultural work.

FIG. 11 illustrates a state where performing agricultural work by the working device 2 while allowing the agricultural machine 1 to automatically travel in the central area of the agricultural field has been selected by the automatic central work key B43a. Furthermore, FIG. 11 illustrates a state where performing agricultural work by the working device 2 while allowing the agricultural machine 1 to automatically travel in the headland of the agricultural field has been selected by the automatic headland work key B43b. Furthermore, FIG. 11 illustrates a state where the adjacent work has been selected as the type of the cultivation work by the work type key B44. When the operator selects the next key B9, the controller 51 causes the work conditions (setting contents set by the work keys B43a, B43b, and B44) displayed on the route creation 1 screen D6 to be stored in the internal memory, and causes a route creation 2 screen D7 illustrated in FIG. 12A to be displayed on the display operator 52.

On the route creation 2 screen D7, the selected agricultural field map MP2, the agricultural machine mark X1, a message indicative of an input operation procedure, a plurality of setting items and numerical value input columns thereof, a recommendation key B12, a route creation key B13, a track prediction key B14, a positive key B45, a negative key B46, a next key B9, and a return key B8 are displayed. While the route creation 2 screen D7 is being displayed, the controller 51 may cause the communicator 54 to acquire an actual position of the traveling body 3 detected by the positioning device 40 and cause the agricultural machine mark X1 to be displayed at a position corresponding to the position of the traveling body 3 on the agricultural field map MP2.

The plurality of setting items on the route creation 2 screen D7 are creation conditions for creating a traveling route and work conditions for performing agricultural work on the agricultural field by the agricultural machine 1 and the working device 2. The setting items include a predicted work distance, the number of headlands, the number of automatic driving headlands, a work direction, a headland overlapping margin, and a central portion overlapping margin. A numerical value can be input for these items other than the predicted work distance. The number of headlands is the number of headlands set one or more rounds along the contour H1 (the agricultural field map MP2) of the registered agricultural field inside the contour H1. The number of automatic driving headlands is the number of headlands where agricultural work is performed by the working device 2 while allowing the agricultural machine 1 to travel among the set headlands.

The work direction is a direction in which work is performed by the working device 2 while allowing the traveling body 3 to travel straight back and forth in the central portion inside the headland of the agricultural field. By inputting a predetermined numerical value (e.g., "1" or "4") in the numerical value input column of the work direction, upward, downward, leftward, and rightward directions of the route creation 2 screen D7 corresponding to the numerical value are set. The headland overlapping margin is a margin by which the work width of the working device 2 sticks out to the headland. The central portion overlapping margin is an overlapping margin between work widths in a case where work is performed by the working device 2 while allowing the traveling body 3 to travel straight back and forth in the central portion of the agricultural field.

By selecting a numerical value input column of a setting item and operating the positive key B45 or the negative key B46 on the route creation 2 screen D7, the operator can input a numerical value in the numerical value input column. When the operator selects the recommendation key B12, the controller 51 reads out a recommended value of each setting item according to the agricultural work selected on the work selection screen D3 (FIG. 6) among recommended values stored in advance in the storage 53 and inputs (displays) the recommended value in a corresponding numerical value input column.

When the operator selects the route creation key B13 after inputting a numerical value in each setting item of the route creation 2 screen D7, the controller 51 causes the numerical value of each setting item to be stored in the internal memory. Furthermore, the area setter 51b (FIG. 1) sets a central area (second area) C1 and a headland area (first area) E1 in the agricultural field map MP2, as illustrated in FIG. 12B. Furthermore, the route creator 51c (FIG. 1) creates a traveling route (scheduled traveling route) L1 on the agricultural field map MP2.

Figure 13A:
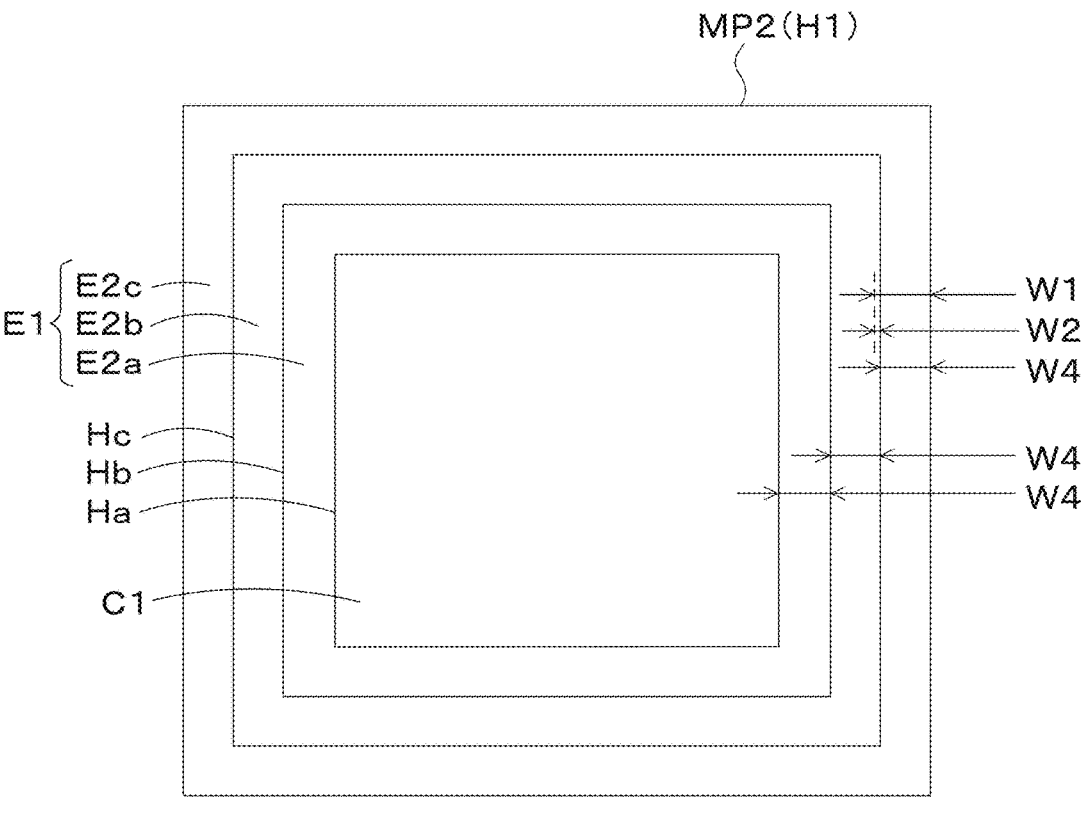
FIG. 13A is a view for explaining a method for setting an area and a traveling route.

FIGS. 13A to 13D are views for explaining a method for setting the areas C1 and E1 and the traveling route L1. When the operator selects the route creation key B13, first, the area setter 51b sets the central area C1 and the headland area E1 on the basis of the contour H1 of the agricultural field, an effective work width of the working device 2, and the number of headlands or the headland overlapping margin input on the route creation 2 screen D7. Specifically, for example, the area setter 51b calculates contours H2c, H2b, and H2a formed by offsetting the contour H1 of the agricultural field inward as many times as the number of headlands by a width W4 obtained by subtracting a headland overlapping margin W2 from a work width W1 of the working device 2, as illustrated in FIG. 13A. Then, the area setter 51b sets, as the central area C1, an area (central portion) surrounded by the innermost contour H2a among the contours Hc, Hb, and Ha. The work width W1 of the working device 2 is the work width (B) approved as being effective by the dimension determiner 51d in step S4 of the dimension restriction processing illustrated in FIG. 8.

In another example, the area setter 51b may calculate contours formed by offsetting the contour H1 of the agricultural field inward as many times as the number of headlands by the effective work width (B) (or the effective entire width (A) of the working device 2) of the working device 2 and set, as a central area, an area (central portion) surrounded by an innermost contour among these contours.

After setting the central area C1 as described above, the area setter 51b sets, as the headland area E1, a frame-shaped area (outer frame portion) outside the central area C1 and inside the contour H1 of the agricultural field. Then, the area setter 51b causes data such as positions of the areas C1 and E1 to be stored in the storage 53.

Figure 13B:
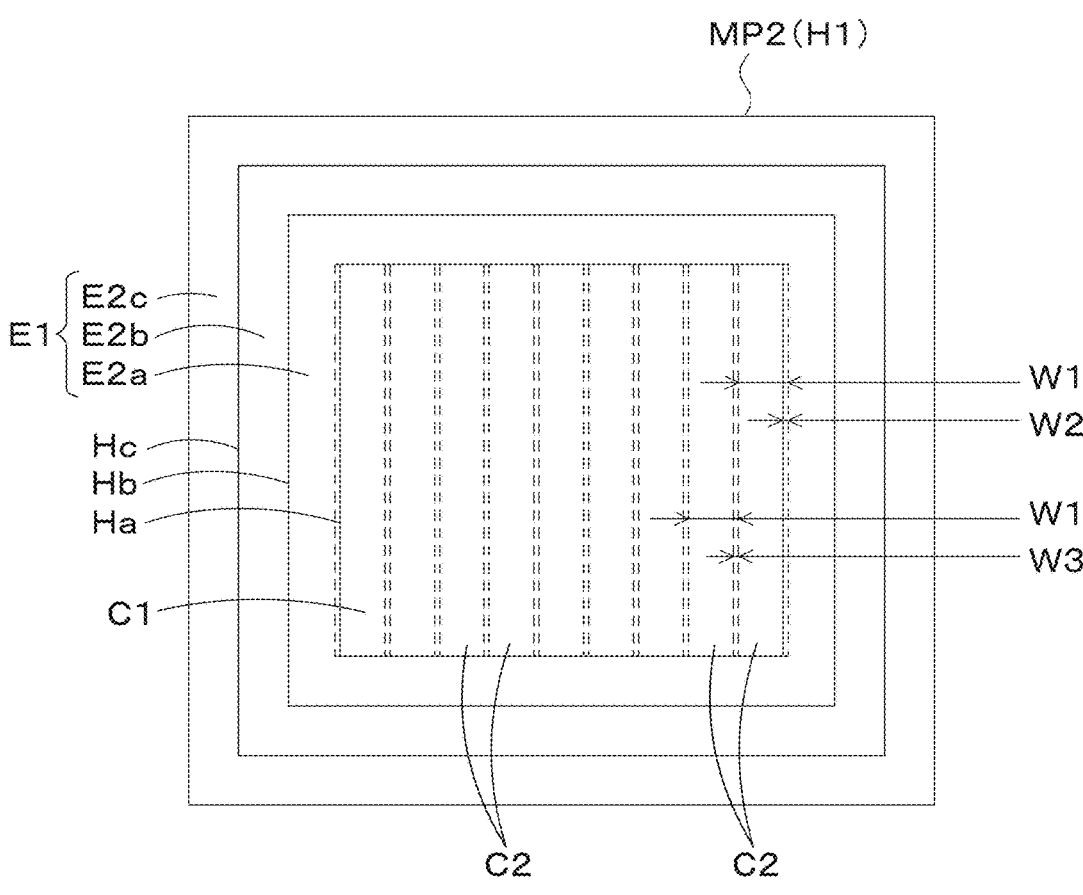
FIG. 13B is a view for explaining a method for setting an area and a traveling route.

The route creator 51c creates the traveling route L1 on the basis of the set areas C1 and E1, the effective work width of the working device 2, the input work direction, the headland overlapping margin, and the central portion overlapping margin. Specifically, first, the route creator 51c creates a plurality of unit work sections C2 within the central area C1 by sequentially dividing the central area C1 by the work width W1 of the working device 2 starting from one end portion (right end portion in FIG. 13B) of the central area C1 parallel to the work direction (the up-down direction in FIG. 13B), as illustrated in FIG. 13B. In this process, as for an initially created unit work section C2, the route creator 51c causes the work width W1 to overlap the headland area E1 by the headland overlapping margin W2. For subsequently created unit work sections C2, the route creator 51c causes the work width W1 to overlap the previously created unit work section C2 by the central portion overlapping margin W3.

Figure 13C:
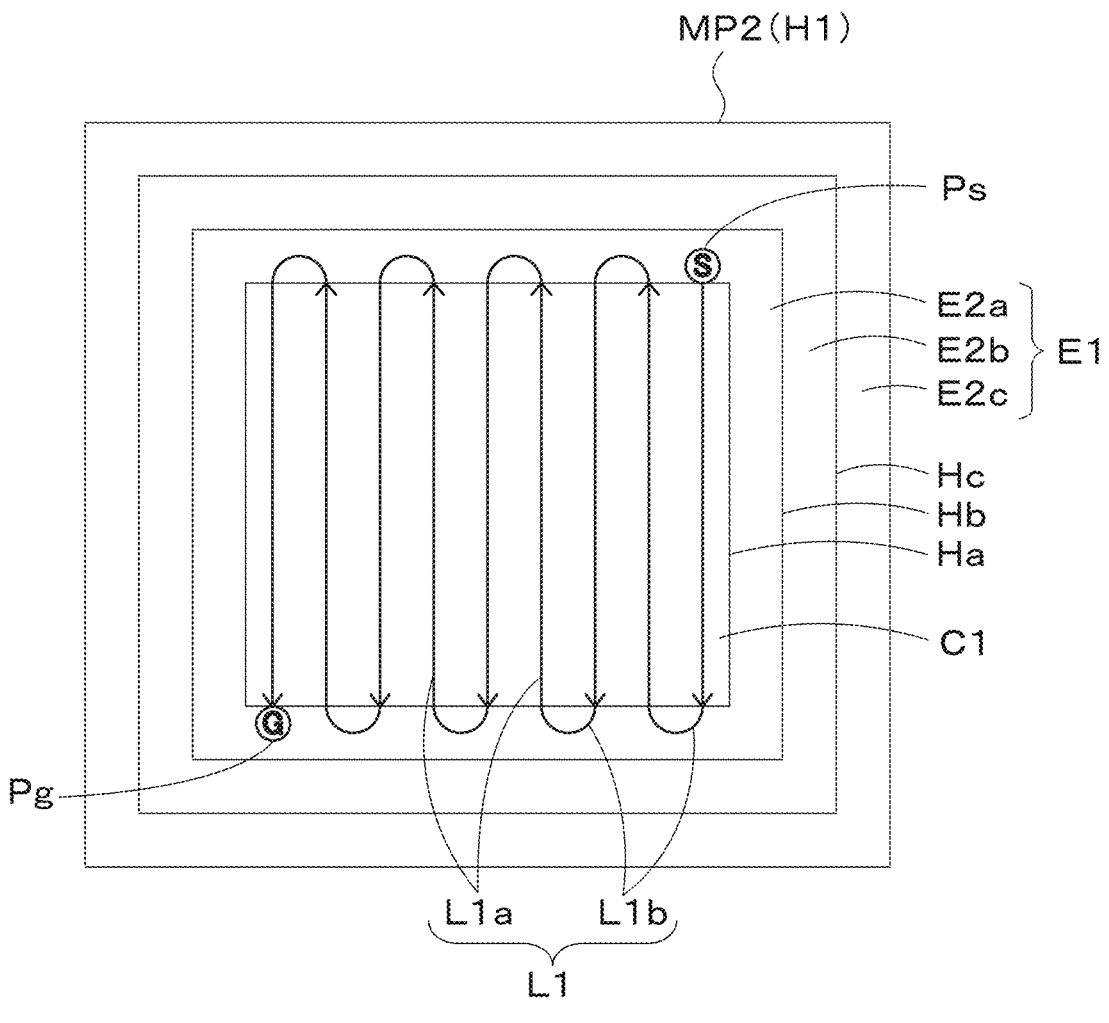
FIG. 13C is a view for explaining a method for setting an area and a traveling route.

Next, the route creator 51c creates, for each unit work section C2, a straight traveling route L1a along which the traveling body 3 travels straight, as illustrated in FIG. 13C.

In this process, the route creator 51c creates, on a central line of the unit work section C2 in a width direction (the left-right direction in FIG. 13C), the linear straight traveling route L1a connecting both end portions of the unit work section C2 in a longitudinal direction. Note that in a case where the straight traveling route L1a created in a unit work section C2 created last (a unit work section C2 in a left end portion of the central area C1 in FIG. 13B) is created outside the central area C1, the route creator 51c may exclude the straight traveling route L1a from the traveling route L1.

Next, the route creator 51c creates, in the headland area E1, a route L1b that connects adjacent straight traveling routes L1a. This route L1b is a turning route along which the traveling body 3 turns to travel from one of the adjacent two straight traveling routes L1a to the other.

Note that although a simple semi-circular turning route L1b is illustrated in FIG. 13C, this shape is merely used for convenience such as easier displaying on the display screen of the display operator 52 and easier viewing of the traveling route L1 on the display screen. Since the traveling body 3 turns while traveling forward or rearward when actually turning toward the other straight traveling route L1a after traveling on the basis of the one straight traveling route L1a, a track of a more complicated shape than the turning route L1b is drawn. The route creator 51c may create the turning route L1b in a shape other than the semi-circular shape. The same applies to a turning route L1r, which will be described later.

While the traveling body 3 is traveling on the basis of the straight traveling route L1a, the controller 60 (FIG. 1) of the agricultural machine 1 causes the raising/lowering device 8 (FIG. 2) to lower the working device 2 so that ground work is performed by the working device 2. While the traveling body 3 is traveling on the basis of the turning route L1b, the controller 60 causes the raising/lowering device 8 to raise the working device 2 so that the ground work using the working device 2 is stopped.

That is, the straight traveling route L1a is a work route along which ground work is performed by the working device 2 while allowing the traveling body 3 of the agricultural machine 1 to automatically travel. The central area C1 where a plurality of straight traveling routes L1a are formed is a work area where ground work is performed by the working device 2 while allowing the traveling body 3 to automatically travel straight back and forth. Note that the work route is not limited to a linear route such as the straight traveling route L1a and may be a curved route. It is only necessary that one or more linear work routes and/or one or more curved work routes be created in the work area.

For example, on the route creation 1 screen D6 of FIG. 11, working in the central area C1 is selected by the automatic central work key B43a, not working in the headland is selected by the automatic headland work key B43b, and the adjacent work is selected by the work type key B44. In this case, the route creator 51c creates the traveling route L1 including the straight traveling route L1a and the turning route L1b, as illustrated in FIG. 13C. Furthermore, among end portions of straight traveling routes L1a on both sides of the central area C1, the route creator 51c sets a start position Ps at an end portion of one straight traveling route L1a that is not connected to the turning route L1b (an upper end portion of a right-end straight traveling route L1a in FIG. 13C) and sets a goal position Pg at an end portion of the other straight traveling route L1a (a lower end portion of a left-end straight traveling route L1a in FIG. 13C).

When creation of the traveling route L1 ends as described above, the controller 51 causes the areas C1 and E1, the traveling route L1, the start position Ps, and the goal position Pg to be displayed on the route creation 2 screen D7 and causes these pieces of information to be stored as route information in the internal memory. Furthermore, the route creator 51c calculates a predicted work distance over which ground work is performed by the working device 2 while the traveling body 3 travels on the basis of all the straight traveling routes L1a. Then, the controller 51 causes the predicted work distance to be displayed on the route creation 2 screen D7.

Figure 13D:
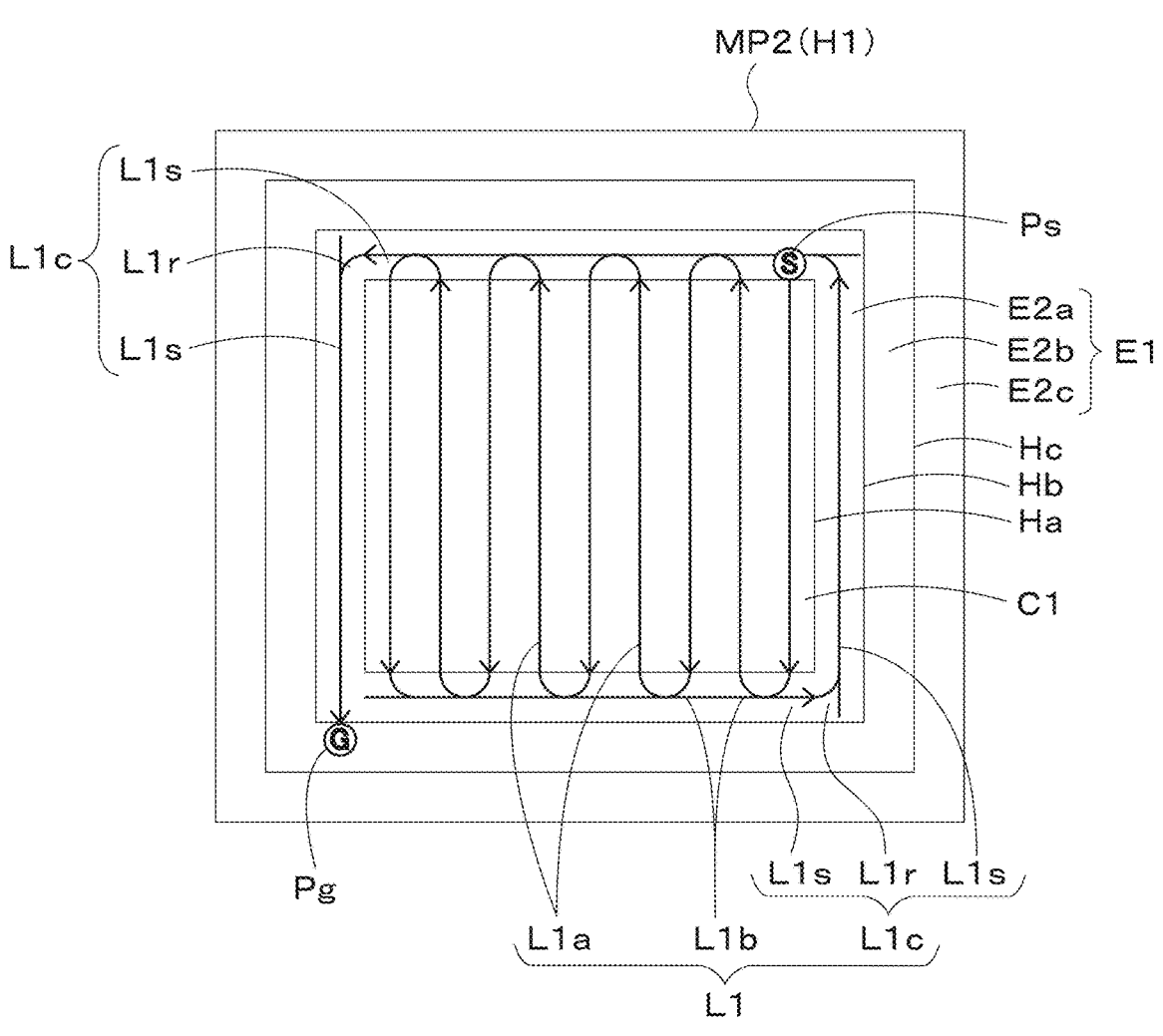
FIG. 13D is a view for explaining a method for setting an area and a traveling route.

On the other hand, on the route creation 1 screen D6 of FIG. 11, working in the central area C1 is selected by the automatic central work key B43a, working in the headland is selected by the automatic headland work key B43b, and the adjacent work is selected by the work type key B44. In this case, the route creator 51c creates, in the headland area E1, a circling route L1c circling outside the central area C1 as illustrated in FIG. 13D in addition to the straight traveling route L1a and the turning route L1b. In this process, for example, the route creator 51c creates the circling route L1c in the headland E2a closest to the central area C1 among the headlands E2a, E2b, and E2c set one or more rounds outside the central area C1 by the area setter 51b.

Furthermore, among both end portions of straight traveling routes L1a at both ends (left and right ends in FIG. 13D) of the central area C1, the route creator 51c sets the start position Ps at an end portion of one straight traveling route L1a that is not connected to the turning route L1b (in FIG. 13D, an upper end portion of a right-end straight traveling route L1a) and connects the circling route L1c to an end portion of the other straight traveling route L1a (in FIG. 13D, a lower end portion of a left-end straight traveling route L1a). Furthermore, the route creator 51c sets the goal position Pg at an end portion of the circling route L1c that is not connected to the straight traveling route L1a.

The circling route L1c is a work route along which ground work is performed by the working device 2 while the traveling body 3 automatically travels. The circling route L1c includes a plurality of straight traveling routes L1s, which are substantially linear, and a plurality of turning routes L1r, which are curved with a predetermined radius of curvature or more. The straight traveling route L1s is created on a central line of the headland E2a in a width direction. One straight traveling route L1s and another straight traveling route L1s that are adjacent in a traveling direction of the circling route (traveling route) L1c are different in extending direction (traveling direction). The turning route L1r is a route that connects the one straight traveling route L1s and the other straight traveling route L1s so that the traveling body 3 turns from the one straight traveling route L1s toward the other straight traveling route L1s.

Note that a gradually curved portion (a curved route, not illustrated) with less than a predetermined radius of curvature may be included in the circling route L1c in addition to the straight traveling route L1s and the turning route L1r depending on a shape of the contour H1 of the agricultural field (for example, in a case where the contour H1 of the agricultural field is distorted). In this case, it is possible that ground work is performed by the working device 2 while the traveling body 3 is automatically traveling on the basis of the straight traveling route L1s or the gradual curved portion of the circling route L1c and ground work is not performed by the working device 2 while the traveling body 3 is automatically traveling on the basis of the turning route L1r.

The headland E2a in which the circling route L1c has been created as described above is a work area where ground work is performed by the working device 2 while the traveling body 3 circles outside the central area C1. In another example, the route creator 51c may also create a circling route in the other headlands E2b and E2c outside the headland E2a. Furthermore, a key for inputting the number of headlands where a circling route is to be created may be prepared on the route creation 2 screen D7.

Furthermore, the route creator 51c may create a circling route that circles plural times in at least one of the plurality of headlands E2a, E2b, and E2c or may create a circling route so that the circling route passes both of one headland and another headland that are adjacent. That is, the route creator 51c may create, in the headland area E1, a circling route that circles around the central area C1 the number of times equal to or larger than the number of headlands.

As described above, the route creator 51c creates the traveling route L1 including the straight traveling route L1a, the turning route L1b, and the circling route L1c and then sets the start position Ps and the goal position Pg of the traveling route L1. Then, as illustrated in FIG. 12B, the controller 51 causes route information such as the areas C1 and E1, the traveling route L1, the start position Ps, and the goal position Pg to be displayed on the route creation 2 screen D7. Furthermore, the route creator 51c calculates a predicted work distance over which ground work is performed by the working device 2 while the traveling body 3 travels on the basis of all of the straight traveling routes L1a and L1s. Then, the controller 51 causes the predicted work distance to be displayed on the route creation 2 screen D7.

After the traveling route L1 and others are displayed on the route creation 2 screen D7, the operator selects the track prediction key B14. As a result, the controller 51 calculates a work portion where ground work is predicted to be performed by the working device 2 while the traveling body 3 automatically travels on the basis of the traveling route L1, that is, a predicted work track of the working device 2. Then, the controller 51 causes the predicted work track to be displayed on the traveling route L1 of the agricultural field map MP2 on the route creation 2 screen D7 (not illustrated).

Figure 14:
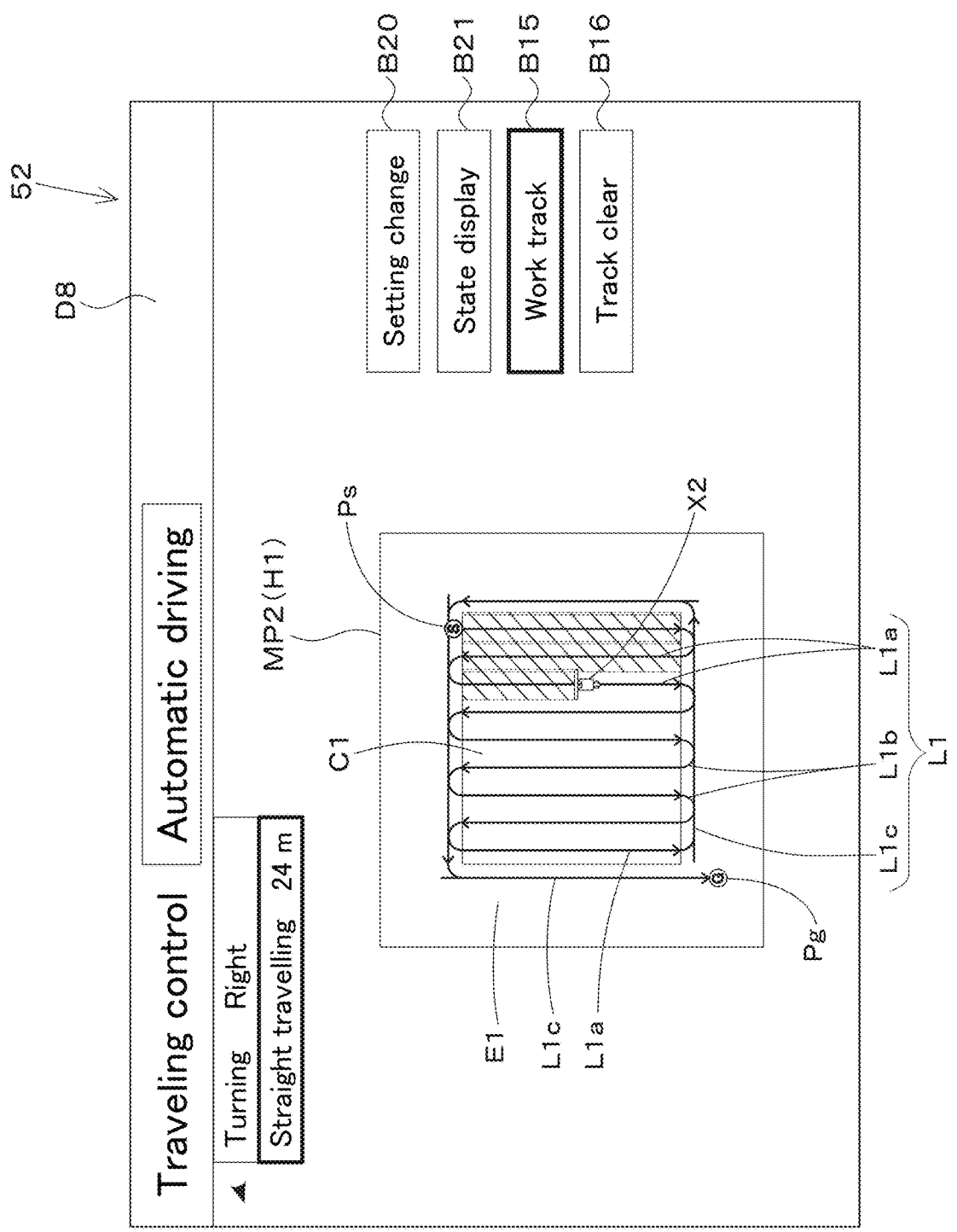
FIG. 14 illustrates an example of a traveling control screen.

When the operator selects the next key B9 after the traveling route L1 and others are displayed on the route creation 2 screen D7, the controller 51 causes a traveling control screen D8 illustrated in FIG. 14 to be displayed on the display operator 52. Furthermore, the controller 51 generates automatic traveling data on the basis of the setting information stored in the internal memory and causes the communicator 54 to transmit (output) the automatic traveling data to the controller 60 of the agricultural machine 1. The automatic traveling data includes route information, the type of the working device 2, and automatic driving work information.

The traveling control screen D8 illustrated in FIG. 14 is a screen on which a traveling state of the agricultural machine 1 and a work state of the working device 2 in the automatic traveling work mode are displayed. Note that in FIG. 14, the traveling state and the work state of the agricultural machine 1 some time after start of the automatic traveling work mode are displayed on the traveling control screen D8. On the traveling control screen D8, the agricultural field map MP2, the traveling route L1, the start position Ps, the goal position Pg, the agricultural machine mark X2, the traveling state of the agricultural machine 1, a setting change key B20, a state display key B21, a work track key B15, and a track clear key B16 are displayed.

The controller 51 causes the communicator 54 to acquire an actual position of the traveling body 3 detected by the positioning device 40 on a predetermined cycle, and causes the agricultural machine mark X2 to be displayed as needed at a position corresponding to the position of the traveling body 3 on the agricultural field map MP2. That is, the agricultural machine mark X2 on the traveling control screen D8 indicates the actual position of the traveling body 3 of the agricultural machine 1.

For example, the operator manually drives the agricultural machine 1 to the start position Ps while viewing the traveling control screen D8 and then performs predetermined operation to shift to the automatic traveling work mode by the mode switch 65 (FIG. 1). As a result, the automatic controller 61 (FIG. 1) shifts to the automatic traveling work mode and causes the working device 2 to perform ground work while allowing the traveling body 3 to automatically travel on the basis of the automatic traveling data received from the agricultural work assistance device 50 and the position of the traveling body 3 detected by the positioning device 40.

Specifically, the automatic controller 61 first reads the route information included in the automatic traveling data and grasps the traveling route L1, the start position Ps, and the goal position Pg. Then, the automatic controller 61 causes the working device 2 to perform ground work while allowing the traveling body 3 to automatically travel from the start position Ps on the basis of the straight traveling route Lal and the turning route L1b of the traveling route L1. In this process, the automatic controller 61 causes the working device 2 to perform ground work while the traveling body 3 is automatically traveling on the basis of the straight traveling route L1a. Furthermore, the automatic controller 61 stops the ground work of the working device 2 once while the traveling body 3 is automatically traveling (turning) on the basis of the turning route L1b, and resumes the ground work of the working device 2 when the traveling body 3 starts to automatically travel on the basis of the adjacent straight traveling route L1a. As a result, the traveling body 3 automatically travels straight back and forth in the central area C1, and ground work is performed on the central area C1 by the working device 2.

Then, the automatic controller 61 causes the working device 2 to perform ground work while allowing the traveling body 3 to automatically travel on the basis of the circling route L1c and the position of the traveling body 3. As a result, the traveling body 3 automatically circles outside the central area C1, and the working device 2 performs ground work on the headland E2a (see, for example, FIG. 13D) that surrounds the central area C1.

FIGS. 15A to 15D are views for explaining automatic steering of the agricultural machine 1. In the automatic traveling work mode, the automatic controller 61 calculates a deviation between the position of the traveling body 3 detected by the positioning device 40 and the traveling route L1 while allowing the traveling body 3 to automatically travel. In a case where the deviation is less than a threshold value (for example, FIG. 15A), the automatic controller 61 maintains a rotation angle of the steering shaft 31 (FIG. 1). In a case where the deviation between the position of the traveling body 3 and the traveling route L1 is equal to or larger than the threshold value and the traveling body 3 is located on the left relative to the traveling route L1 (for example, FIG. 15B), the automatic controller 61 rotates the steering shaft 31 so that the traveling body 3 is steered rightward. In a case where the deviation between the position of the traveling body 3 and the traveling route L1 is equal to or larger than the threshold value and the traveling body 3 is located on the right relative to the traveling route L1 (for example, FIG. 15C), the automatic controller 61 rotates the steering shaft 31 so that the traveling body 3 is steered leftward.

Figure 15A:
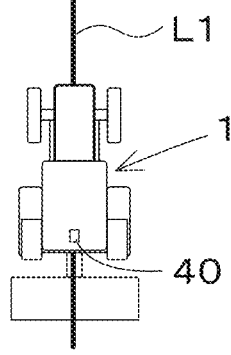
FIG. 15A is a view for explaining automatic driving of an agricultural machine.
Figure 15B:
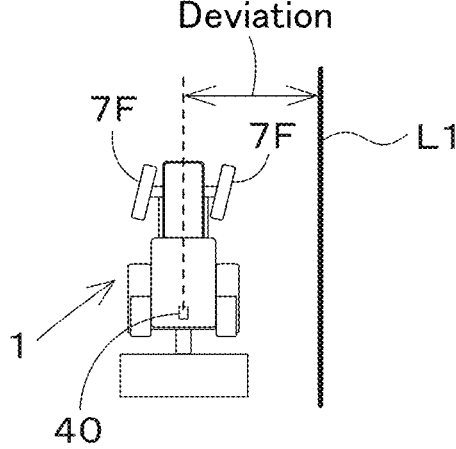
FIG. 15B is a view for explaining automatic driving of the agricultural machine.
Figure 15C:
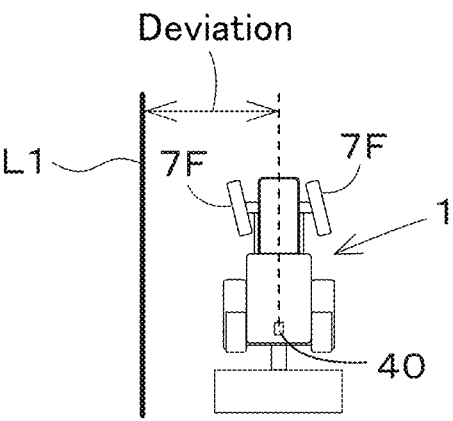
FIG. 15C is a view for explaining automatic driving of the agricultural machine.
Figure 15D:
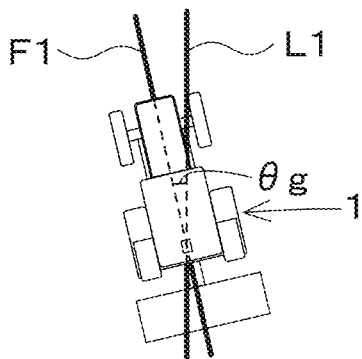
FIG. 15D is a view for explaining automatic driving of the agricultural machine.

Although the steering angle of the steering 29 is changed on the basis of the deviation between the position of the traveling body 3 and the traveling route L1 in the above example, the steering angle of the steering 29 may be changed on the basis of an angle θg of a traveling direction F1 of the traveling body 3 with respect to the traveling route L1 illustrated in FIG. 15D in another example. In this case, for example, the automatic controller 61 calculates the traveling direction F1 of the traveling body 3 from a change of the position of the traveling body 3 and further calculates the angle θg of the traveling direction F1 with respect to the traveling route L1. Then, in a case where the angle θg is equal to or larger than the threshold value, the automatic controller 61 rotates the steering shaft 31 so that the traveling direction F1 of the traveling body 3 matches a direction of the traveling route L1 (that is, θg becomes "0°").

In another example, the automatic controller 61 may calculate a first steering angle on the basis of the deviation between the position of the traveling body 3 and the traveling route L1 and calculate a second steering angle on the basis of the traveling route L1 and the traveling direction F1 of the traveling body 3. Then, the automatic controller 61 may calculate a third steering angle on the basis of the first steering angle and the second steering angle and rotate the steering shaft 31 on the basis of the third steering angle.

Furthermore, the automatic controller 61 calculates an actual vehicle speed of the traveling body 3 on the basis of a change of the position of the traveling body 3 while the traveling body 3 is automatically traveling on the basis of the traveling route L1. The automatic controller 61 controls driving of the transmission 5, the brake 6, and the prime mover 4 so that the actual vehicle speed matches a vehicle speed associated with the straight traveling route L1a, the turning route L1b, or the circling route L1c.

As described above, in the automatic traveling work mode of the agricultural machine 1, the automatic controller 61 automatically steers the traveling body 3 while automatically changing the traveling speed of the traveling body 3 on the basis of the traveling route L1 and the position of the traveling body 3 (the agricultural machine 1). Furthermore, the automatic controller 61 automatically performs and stops the agricultural work (ground work) of the working device 2.

During execution of the automatic traveling work mode of the agricultural machine 1, the boundary-crossing determiner 51e (FIG. 1) of the agricultural work assistance device 50 determines whether or not at least one of the working device 2 and the agricultural machine 1 has crossed a boundary out of the agricultural field on the basis of the position of the agricultural machine 1 detected by the positioning device 40, the agricultural field information, the effective dimension information of the working device 2, and the dimension information of the agricultural machine 1.

Specifically, the boundary-crossing determiner 51e calculates external shape positions (latitude and longitude) of the agricultural machine 1 and the working device 2 from a GPS position (measured position; latitude and longitude) detected by the positioning device 40, a GPS installation position in the agricultural machine 1, and dimensions of the agricultural machine 1 and the working device 2 in a length direction (e.g., an entire length of the agricultural machine 1 and an entire length of the working device 2) and dimensions of the agricultural machine 1 and the working device 2 in a width direction (e.g., an entire width of the agricultural machine 1 and an entire width of the working device 2). Then, the boundary-crossing determiner 51e checks whether the external shape position of the agricultural machine 1 or the working device 2 is outside the contour H1 of the agricultural field or within the contour H1 (within the agricultural field).

In a case where the external shape positions of the agricultural machine 1 and the working device 2 are within the contour H1 of the agricultural field, the boundary-crossing determiner 51e determines that the agricultural machine 1 and the working device 2 have not crossed a boundary out of the agricultural field (no boundary crossing). In this case, the automatic controller 61 continues traveling and steering of the agricultural machine 1 based on the traveling route L1 and agricultural work of the working device 2 (continuation of the automatic traveling work mode).

On the other hand, in a case where the external shape position of the working device 2 or the agricultural machine 1 is outside the contour H1 of the agricultural field, the boundary-crossing determiner 51e determines that the working device 2 or the agricultural machine 1 has crossed a boundary out of the agricultural field (boundary crossing). In this case, the automatic controller 61 stops traveling and steering of the agricultural machine 1 based on the traveling route L1 and agricultural work of the working device 2 (stoppage of the automatic traveling work mode). Since the contour H1 of the agricultural field is set inside a ridge or the like surrounding the actual agricultural field, for example, as illustrated in FIG. 5A, it is possible to avoid collision of the agricultural machine 1 and the working device 2 with the ridge or the like by stopping traveling of the agricultural machine 1 by the automatic controller 61 immediately after the boundary-crossing determiner 51e determines that the working device 2 or the agricultural machine 1 has crossed a boundary out of the agricultural field. The notifier 51g may provide a notification concerning the determination result of the boundary-crossing determiner 51e by the display operator 52 or the alarm 63.

The controller 51 (FIG. 1) of the agricultural work assistance device 50 detects operating states of the agricultural machine 1 and the working device 2 on the basis of detection results of the positioning device 40 and the detector 64 or log data acquired from the controller 60 in the automatic traveling work mode. When the operator selects the state display key B21 on the traveling control screen D8 illustrated in FIG. 14, the controller 51 displays the operating states of the agricultural machine 1 and the working device 2 in a pop-up manner on the traveling control screen D8.

When the operator selects the work track key B15, the controller 51 calculates an actual work track where the working device 2 has performed ground work on the basis of the position of the traveling body 3 detected by the positioning device 40 and the effective work width of the working device 2. Then, the controller 51 causes the actual work track (the hatched portion in FIG. 10) to be displayed on the straight traveling routes L1a and L1s of the agricultural field map MP2. When the operator selects the track clear key B16, the controller 51 hides the work track.

The automatic controller 61 of the agricultural machine 1 causes the working device 2 to perform ground work while allowing the traveling body 3 to automatically travel on the basis of the traveling route L1 and the position of the traveling body 3, and thus the working device 2 arrives at the goal position Pg. At this time, the automatic controller 61 stops the automatic traveling work mode, and stops the traveling body 3 and the working device 2. As a result, the agricultural work of the agricultural machine 1 and the working device 2 based on the traveling route L1 in the automatic traveling work mode is completed.

Upon detection of the completion of the agricultural work, the controller 51 compares the setting information (the kind of agricultural work and the type of the agricultural machine 1 on the screen D4a of FIG. 7A) of the agricultural machine 1 stored in the internal memory and setting information of the corresponding agricultural machine 1 registered in the storage 53. Then, in a case where the setting information of the agricultural machine 1 stored in the internal memory and the setting information of the corresponding agricultural machine 1 registered in the storage 53 do not match, the controller 51 updates (overwrites) the setting information of the corresponding agricultural machine 1 registered in the storage 53 with the setting information of the agricultural machine 1 stored in the internal memory.

Furthermore, the controller 51 compares the setting information (the dimension information and the type of the working device 2 on the screen D4c in FIG. 7C) of the working device 2 stored in the internal memory and setting information of the corresponding working device 2 registered in the storage 53. In a case where the setting information of the working device 2 stored in the internal memory and the setting information of the corresponding working device 2 registered in the storage 53 do not match, the controller 51 updates the setting information of the corresponding working device 2 registered in the storage 53 with the setting information of the working device 2 stored in the internal memory. Furthermore, the controller 51 rewrites previous work (the screen D4b of FIG. 7B, the screen D4c of FIG. 7C) included in the setting information of the working device 2 registered in the storage 53 to "there is work previously performed".

Figure 12A:
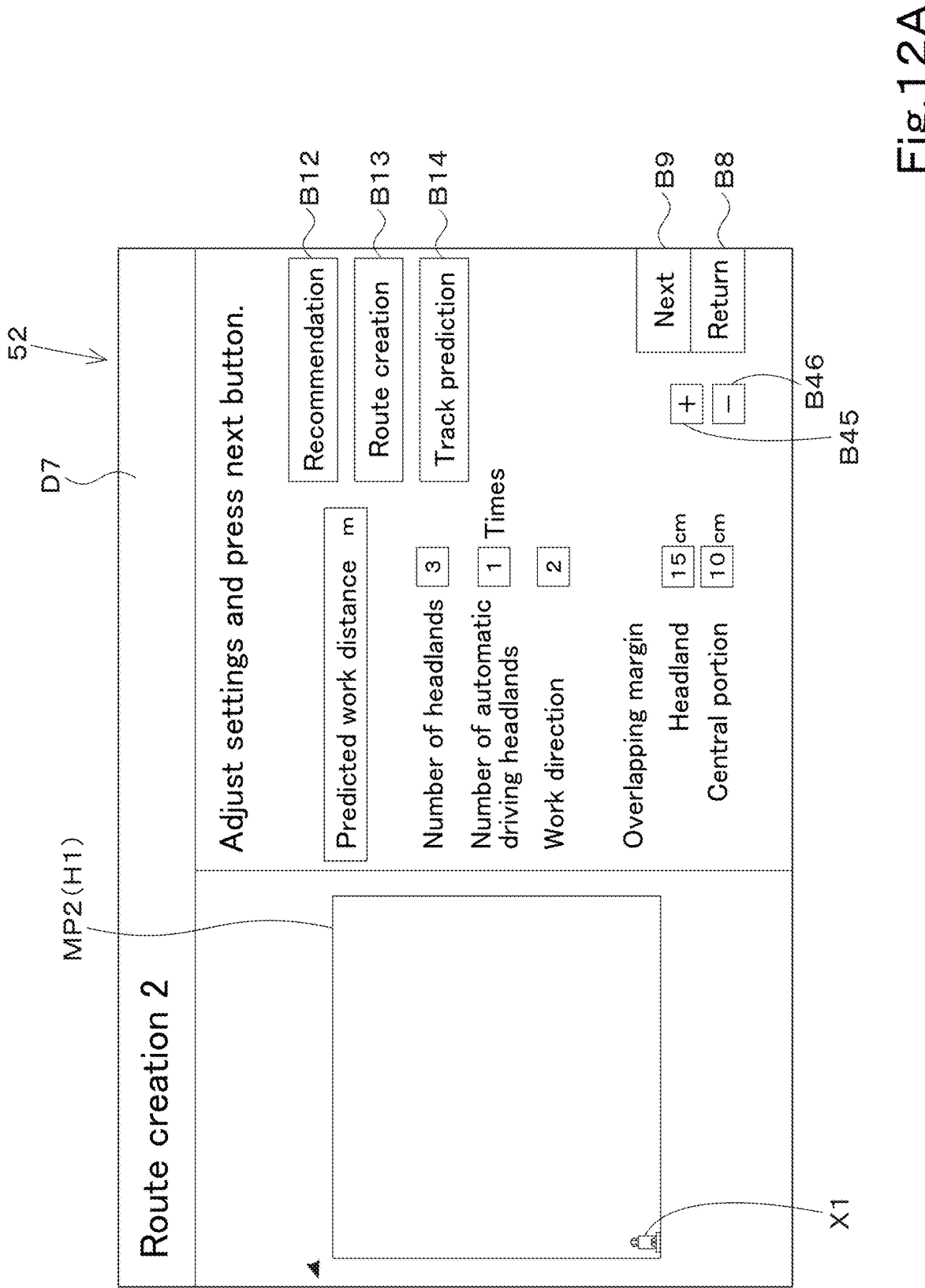
FIG. 12A illustrates an example of a route creation 2 screen.

The controller 51 may record (store), as a work history in a predetermined region of the storage 53, the setting information of the agricultural machine 1, the setting information of the working device 2, the setting information of the agricultural field (information on the agricultural field map MP2 selected on the screen D5 of FIG. 10), the work conditions (the setting information on the screen D6 illustrated in FIG. 11, the screen D7 illustrated, for example, in FIG. 12A, and the screen D5 illustrated in FIG. 10), and the route information (the areas C1 and E1, the traveling route L1, and the positions Ps and Pg on the screen D7 of FIG. 12B and the screen D8 of FIG. 14) stored in the internal memory in association with the identification information of the agricultural machine 1 and the identification information of the working device 2. In this case, date and time of start or completion of the agricultural work of the agricultural machine 1 and the working device 2 based on the traveling route L1 in the automatic traveling work mode may be included in the work history.

Modes executable in the agricultural machine 1 include the automatic steering work mode in addition to the automatic traveling work mode, as described above. In the automatic traveling work mode and the automatic steering work mode, ground work is automatically performed by the working device 2 as appropriate. Work modes executable in the agricultural machine 1 include a manual driving work mode in addition to the automatic traveling work mode and the automatic steering work mode. In the manual driving work mode, the operator of the agricultural machine 1 changes the traveling speed of the traveling body 3 by operating the accelerator or the brake of the operating device 62 and steers the traveling body 3 by operating the steering wheel 30. In the manual driving work mode, execution and stoppage of ground work performed by the working device 2 may be operated by the operator by using the operating device 62 or may be controlled by the automatic controller 61 on the basis of the position of the traveling body 3 and the traveling route L1. In addition to the above modes, for example, an automatic traveling mode in which the traveling body 3 automatically travels and an automatic steering mode in which the traveling body 3 is automatically steered although ground work is not automatically performed by the working device 2 are executable in the agricultural machine 1.

For example, in a case where the operator selects the automatic steering key B2b on the home screen D1 illustrated in FIG. 3, screens similar to the screens D3 to D8, which are displayed in a case where the automatic driving key B2a is selected, are sequentially displayed on the display operator 52. On these screens, the operator can perform various settings for executing the automatic steering work mode in a similar manner to various settings for executing the automatic driving work mode.

The controller 51 causes various kinds of setting information input for execution of the automatic steering work mode to be stored in the internal memory in a similar manner to the various kinds of setting information for executing the automatic driving work mode. The dimension determiner 51d determines whether or not dimension information of the working device 2 input for execution of the automatic steering work mode satisfies a restriction condition according to a kind of agricultural work by performing the dimension restriction processing illustrated in FIG. 8, and determines whether or not to receive the dimension information of the working device 2 in accordance with a result of the determination.

The route creator 51c creates a traveling route in the automatic steering work mode on the basis of the various kinds of setting information such as effective dimension information of the working device 2 stored in the internal memory of the controller 51. Then, the controller 51 causes route information including the traveling route to be displayed on the display operator 52, generates automatic steering data including the route information, and causes the communicator 54 to transmit (output) the automatic steering data to the agricultural machine 1. When the automatic steering data is received by the agricultural machine 1, the automatic controller 61 of the controller 60 shifts to the automatic steering work mode, and causes the working device 2 to perform ground work while automatically steering the traveling body 3 on the basis of the traveling route included in the automatic steering data and the position of the traveling body 3.

Although an example in which whether or not the dimension information (the entire width and the work width) of the working device 2 in the width direction among the pieces of dimension information of the working device 2 input by the display operator 52 satisfies a restriction condition has been illustrated in the above example embodiment, it may be alternatively determined that dimension information of the working device 2 in the length direction satisfies a restriction condition. On the length setting screen D4e illustrated in FIG. 7E, any changed values can be input to the entire length (C) and the work position (D), which are dimension information of the working device 2 in the length direction.

Although a length from the coupling position where the working device 2 is coupled with the lower link 8b (FIGS. 1 and 2) of the raising/lowering device 8 to the work position (D) of the working device 2 is shorter than the entire length (C) in FIG. 7E, the length to the work position (D) of the working device 2 may be longer than the entire length (C) depending on the type of the working device 2. Specifically, for example, the first working device such as the cultivator, the stubble cultivator, or the puddling device performs the first agricultural work such as the cultivation work, the stubble cultivation work, or the puddling in a situation where the length to the work position (D) is equal to or less than the entire length (C). On the other hand, the second working device such as the spreader performs the second agricultural work such as the spreading work in a situation where the length to the work position (D) is equal to or less than the entire length (C) and a situation where the length to the work position (D) exceeds the entire length (C) (the length to the work position (D) is larger than the entire length (C)).

FIG. 16 illustrates a restriction condition table T2 in another example. Information indicative of contents of the restriction condition table T2 is stored in advance in a predetermined storage region of the storage 53. In the restriction condition table T2, a restriction condition concerning the entire length (C) and the work position (D) of the working device 2 is associated with each kind of agricultural work. Specifically, in the restriction condition table T2, a restriction condition that the length to the work position (D) is equal to or less than the entire length (C) (D≤C) is associated with the cultivation work, the puddling work, and the stubble cultivation work. On the other hand, a restriction condition concerning the length to the work position (D) and the entire length (C) is not associated with the spreading work. That is, a restriction condition concerning the length to the work position (D) and the entire length (C) is not set for the spreading work.

When the operator selects the next key B9 on the length setting screen D4e (FIG. 7E), the dimension information (the changed values of the entire length (C) and the work position (D)) of the working device 2 in the length direction that is displayed on the length setting screen D4e is stored in the internal memory of the controller 51 and the dimension information is thus input, and the dimension determiner 1d performs the dimension restriction processing illustrated in FIG. 8. In this case, the dimension determiner 1d checks input of the kind of agricultural work and the dimension information of the working device 2 in the length direction (S1 in FIG. 8) and then extracts (reads out) a restriction condition according to the kind of agricultural work from the restriction condition table T2 stored in the storage 53 (S2).

For example, in a case where any of the cultivation work, the puddling work, and the stubble cultivation work is input as the kind of agricultural work, the dimension determiner 1d extracts the restriction condition that the length to the work position (D) is equal to or less than the entire length (C) (D≤C) by referring to the restriction condition table T2 (S2 in FIG. 8). In a case where the spreading work is input as the kind of agricultural work, the dimension determiner 1d confirms that there is no restriction condition concerning the length to the work position (D) and the entire length (C) by referring to the restriction condition table T2 (S2).

In another example, in the restriction condition table T2, a restriction condition that the length to the work position (D) is equal to or less than the entire length (C) (D≤C) or the length to the work position (D) is larger than the entire length (C) (D>C) may be associated with the spreading work. In this case, in a case where the spreading work is input as the kind of agricultural work, the dimension determiner 1d extracts the restriction condition that the length to the work position (D) is equal to or less than the entire length (C) (D≤C) or the length to the work position (D) is larger than the entire length (C) (D>C) (S2 in FIG. 8).

Figure 17:
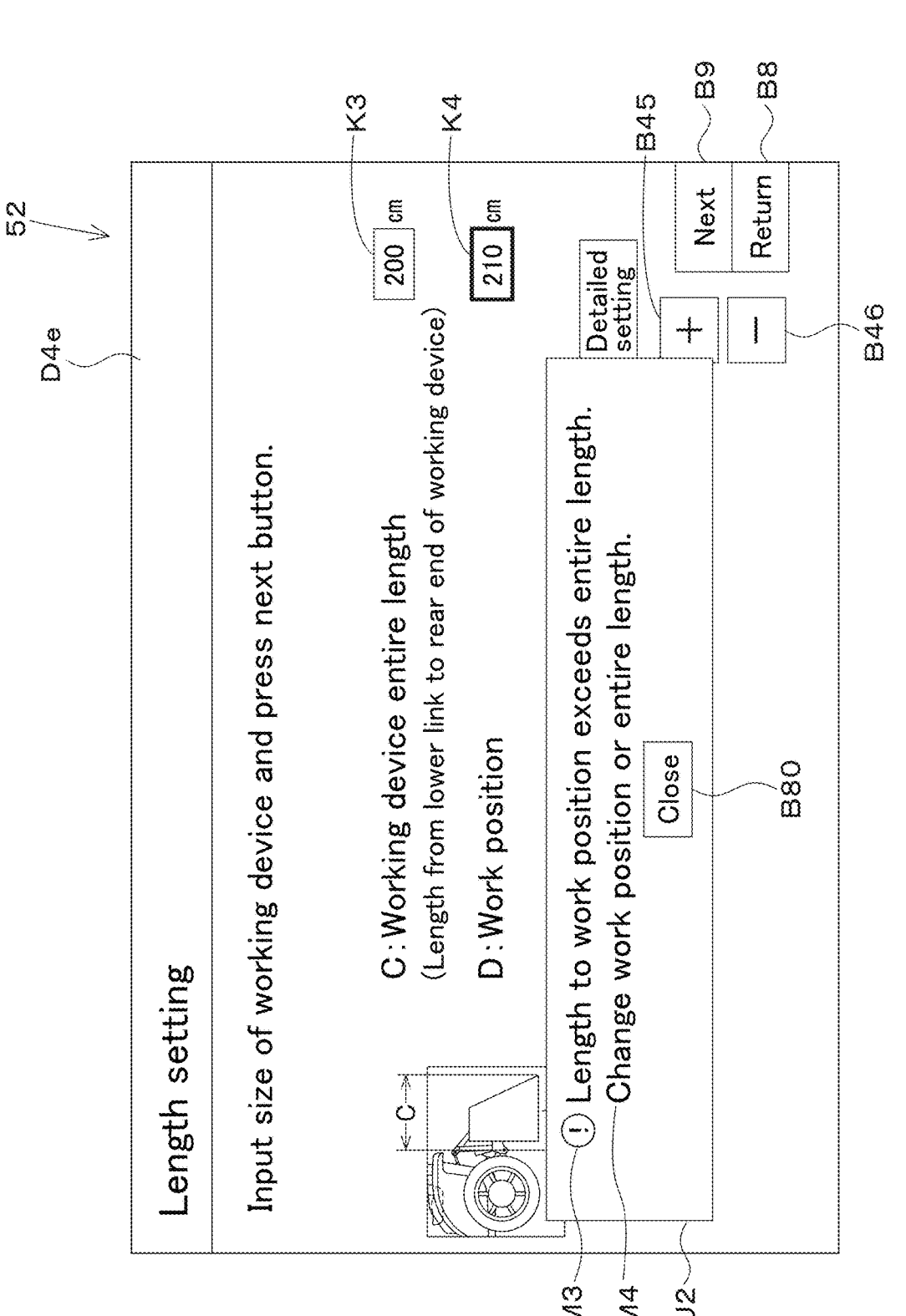
FIG. 17 illustrates an example of a notification displayed on the length setting screen.

Next, the dimension determiner 1*d* determines whether or not the input dimension information (the changed values of the entire length (C) and the work position (D)) of the working device 2 satisfies the restriction condition. For example, in a case where the kind of agricultural work is any of the cultivation work, the puddling work, and the stubble cultivation work, the dimension determiner 1*d* determines that the dimension information of the working device 2 does not satisfy the restriction condition (D≤C) (S3: NO) in a case where the input length to the work position (D) is larger than the entire length (C), refuses to receive the dimension information, and makes the dimension information ineffective (S5). Then, the dimension determiner 1*d* provides an error notification indicative of the determination result by using the notifier 51*g* (S6). In this case, for example, as illustrated in FIG. 17, the notifier 51*g* displays an error notification U2 including a message M3 indicating that the work position of the working device 2 exceeds the entire length and a message M4 prompting change of the work position or the entire length in a pop-up manner on the length setting screen D4*e*.

On the other hand, in a case where the kind of agricultural work is any of the cultivation work, the puddling work, and the stubble cultivation work, the dimension determiner 1*d* determines that the dimension information of the working device 2 satisfies the restriction condition (D≤C) (S3: YES in FIG. 8) in a case where the input length to the work position (D) is equal to or less than the entire length (C), and receives the dimension information and makes the dimension information effective (S4). In a case where the kind of agricultural work is the spreading work, the dimension determiner 1*d* determines that the dimension information of the working device 2 satisfies the restriction condition (S3: YES) both in a case where the input length to the work position (D) is equal to or less than the entire length (C) and in a case where the length to the work position (D) is larger than the entire length (C), and receives the dimension information and makes the dimension information effective (S4). When the dimension restriction processing thus ends, the controller 51 causes the device confirmation screen D4*c* reflecting the effective dimension information of the working device 2 in the length direction to be displayed again on the display operator 52.

Figure 18:
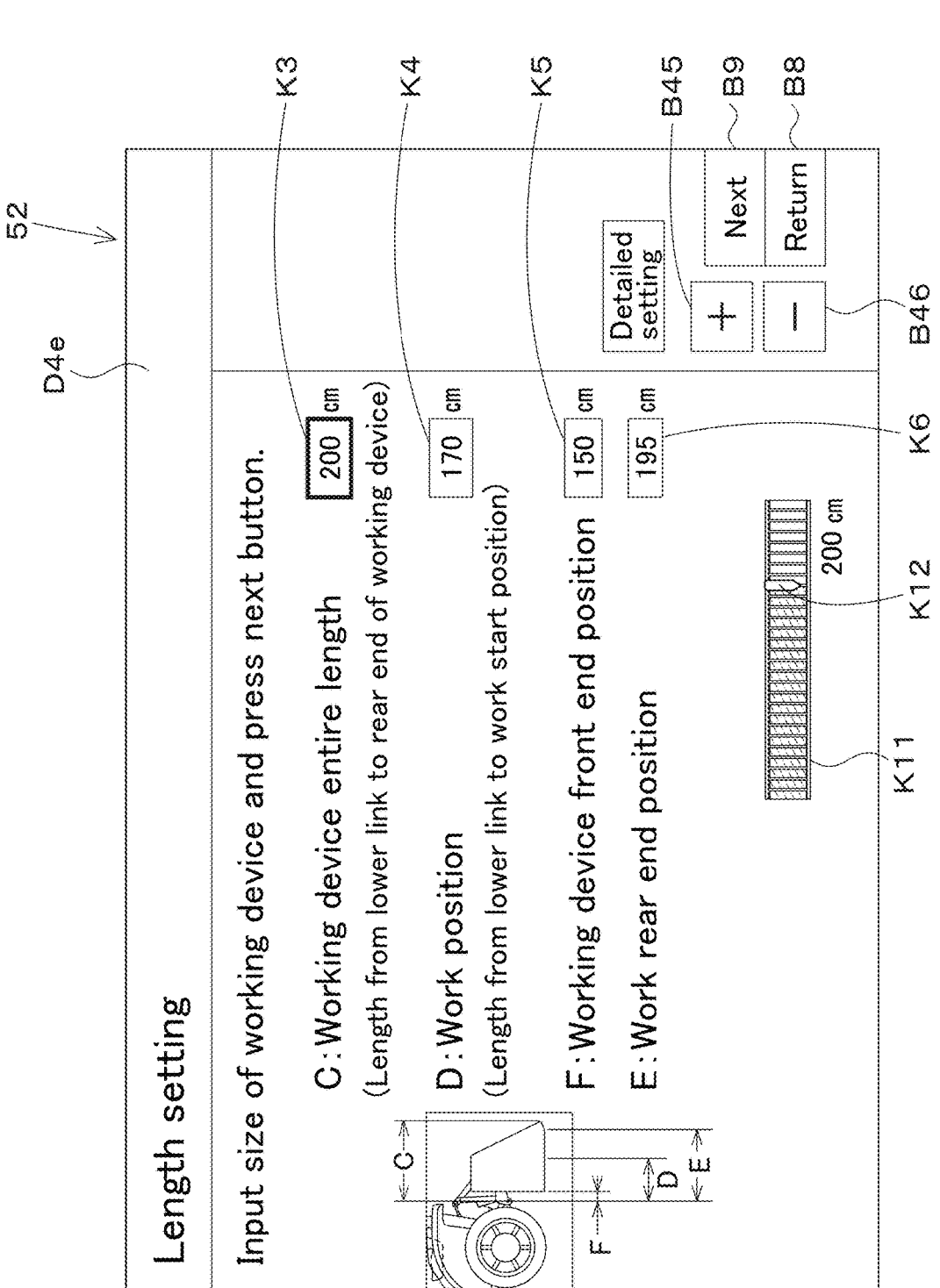
FIG. 18 illustrates another example of the length setting screen.

Input of dimension information of the working device 2 in the length direction other than the entire length (C) and the work position (D) may be enabled, and whether or not the dimension information is appropriate may be determined on the basis of a restriction condition. FIG. 18 illustrates a length setting screen D4*g* in another example. For example, in a case where the operator selects the length setting key B38 on the device confirmation screen D4*c* illustrated in FIG. 7C, the controller 51 causes the length setting screen D4*g* illustrated in FIG. 18 to be displayed on the display operator 52 instead of the length setting screen D4*e* illustrated in FIG. 7E. On the length setting screen D4*g*, setting values of a working device front end position and a work rear end position can be changed in addition to the entire length and the work position of the working device 2.

The working device front end position is a length from the coupling position where the working device 2 is coupled with the lower link 8*b* (FIGS. 1 and 2) of the raising/lowering device 8 to a front end of the housing of the working device 2 (a length F on the screen D4*g*). The work rear end position is a length from the coupling position of the working device 2 to a rear end of the work member (a blade, a bar, a nozzle, or the like) of the working device 2 that performs ground work (a length E on the screen D4*g*). By selecting an input column K5 for the working device front end position or an input column K6 for the work rear end position and then moving the cursor K12 leftward or rightward by operating the positive key B45 or the negative key B46, the operator can input a changed value of the working device front end position (F) or the work rear end position (E) in the input column K5 or the input column K6.

Although the length from the coupling position of the working device 2 to the working device front end position (F) of the working device 2 is shorter than the length to the work position (D) in FIG. 18, the length to the working device front end position (F) may be equal to or larger than the length to the work position (D) depending on the type of the working device 2. Although the length to the work rear end position (E) of the working device 2 is shorter than the entire length (C) in FIG. 18, the length to the work rear end position (E) may be equal to or larger than the entire length (C) depending on the type of the working device 2.

Specifically, for example, the first working device such as the cultivator, the stubble cultivator, or the puddling device performs the first agricultural work such as the cultivation work, the stubble cultivation work, or the puddling in a situation where the length from the coupling position of the working device 2 to the working device front end position (F) is less than the length to the work position (D) and the length to the work rear end position (E) is less than the entire length (C). On the other hand, for example, the second working device such as the spreader performs the second agricultural work such as the spreading work irrespective of the length to the working device front end position (F) relative to the length to the work position (D) and performs second agricultural work irrespective of the length to the work rear end position (E) relative to the entire length (C).

FIG. 19 illustrates a restriction condition table T3 in another example. Information indicative of contents of the restriction condition table T3 is stored in advance in a predetermined storage region of the storage 53. In the restriction condition table T3, a restriction condition concerning the entire length (C), the work position (D), the working device front end position (F), and the work rear end position (E) of the working device 2, which are dimension information of the working device 2 in the length direction, is associated with each kind of agricultural work.

Specifically, in the restriction condition table T3, a restriction condition that the length to the working device front end position (F) is less than the entire length (C) (F<C), a restriction condition that the length to the work rear end position (E) is less than the entire length (C) (E<C), a restriction condition that the length to the working device front end position (F) is less than the length to the work position (D) (F<D), a restriction condition that the length to the work rear end position (E) is larger than the length to the work position (D) (E>D), and a restriction condition that the length to the working device front end position (F) is less than the length to the work rear end position (E) (F<E) are associated with the cultivation work, the puddling work, and the stubble cultivation work.

On the other hand, a restriction condition that the length to the working device front end position (F) is less than the entire length (C) (F<C), a restriction condition that the length to the work rear end position (E) is larger than the length to the work position (D) (E>D), and a restriction condition that the length to the working device front end position (F) is less than the length to the work rear end position (E) (F<E) are associated with the spreading work.

That is, the restriction condition that the length to the work rear end position (E) is less than the entire length (C) (E<C) and the restriction condition that the length to the working device front end position (F) is less than the length to the work position (D) (F<D) are not associated with the spreading work.

When the operator selects the next key B9 on the length setting screen D4g of FIG. 18, the dimension information (the changed values of the entire length (C), the work position (D), the working device front end position (F), and the work rear end position (E)) of the working device 2 in the length direction that is displayed on the length setting screen D4g is stored in the internal memory of the controller 51 and the dimension information is thus input, and the dimension determiner 1d performs the dimension restriction processing illustrated in FIG. 8. In this case, the dimension determiner 1d checks input of the kind of agricultural work and the dimension information of the working device 2 in the length direction (S1 in FIG. 8) and then extracts a restriction condition according to the kind of agricultural work from the restriction condition table T3 stored in the storage 53 (S2).

Next, the dimension determiner 1d determines whether or not the input dimension information (the changed values of the entire length (C), the work position (D), the working device front end position (F), and the work rear end position (E)) of the working device 2 in the length direction satisfies the restriction condition. In a case where the dimension determiner 1d determines that the dimension information of the working device 2 in the length direction does not satisfy the restriction condition (S3: NO), the dimension determiner 1d refuses to receive the dimension information, makes dimension information ineffective (S5), and provides an error notification indicative of the determination result by using the notifier 51g (S6). In this case, the notifier 51g displays, for example, an error notification including a message indicative of contents of the restriction condition that is not satisfied and the dimension information in the length direction and a message prompting change of the dimension information in the length direction in a pop-up manner on the length setting screen D4g.

On the other hand, in a case where the dimension determiner 1d determines that the dimension information of the working device 2 in the length direction satisfies the restriction condition (S3: YES), the dimension determiner 1d receives the dimension information and makes the dimension information effective (S4) and ends the dimension restriction processing. Then, the controller 51 causes the device confirmation screen D4c reflecting the effective dimension information of the working device 2 in the length direction to be displayed again on the display operator 52. Note that length dimension information (the entire length (C), the work position (D), the work front end position (F), and the work rear end position (E)) of the working device 2 on the length setting screen D4g (FIG. 18) that is displayed on the display operator 52 when the length setting key B38 is initially operated on the device confirmation screen D4c (FIG. 7C) is dimension information of the working device 2 registered in advance in the storage 53 and is set to a value that satisfies the restriction condition. The same applies to the length setting screen D4e of FIG. 7E.

Although the work position (D) is a length from the coupling position of the working device 2 to start of ground work, that is, a work start position, a work end position indicative of a length from the coupling position of the working device 2 to end of ground work may be permitted to be input additionally as dimension information of the working device 2, and it may be determined whether or not the work start position and the work end position are appropriate on the basis of a restriction condition.

Figure 20A:
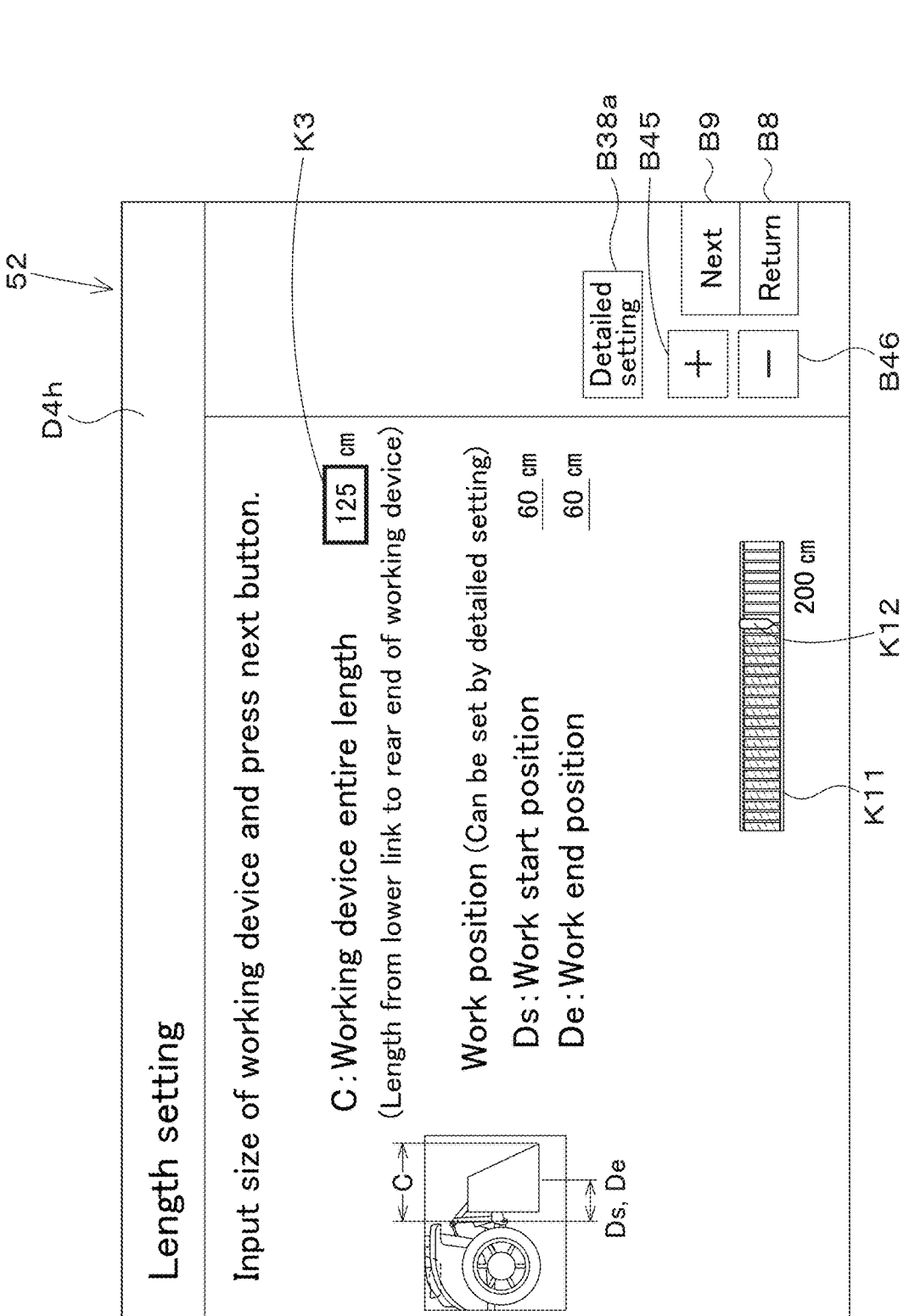
FIG. 20A illustrates another example of the length setting screen.

FIG. 20A illustrates a length setting screen D4h in another example. For example, in a case where the operator selects the length setting key B38 on the device confirmation screen D4c illustrated in FIG. 7C, the controller 51 causes the length setting screen D4h illustrated in FIG. 20A to be displayed on the display operator 52 instead of the length setting screen D4e illustrated in FIG. 7E. On the length setting screen D4h, a setting value of the entire length of the working device 2 can be changed. Furthermore, on the length setting screen D4h, the work start position and the work end position are displayed as work positions of the working device 2. In a case where the operator selects a detail setting key B38a on the length setting screen D4h, the controller 51 causes a length detail setting screen D4i illustrated in FIG. 20B to be displayed on the display operator 52. On the length detail setting screen D4i, setting values of the work start position and the work end position included in the work position can be changed.

Figure 20B:
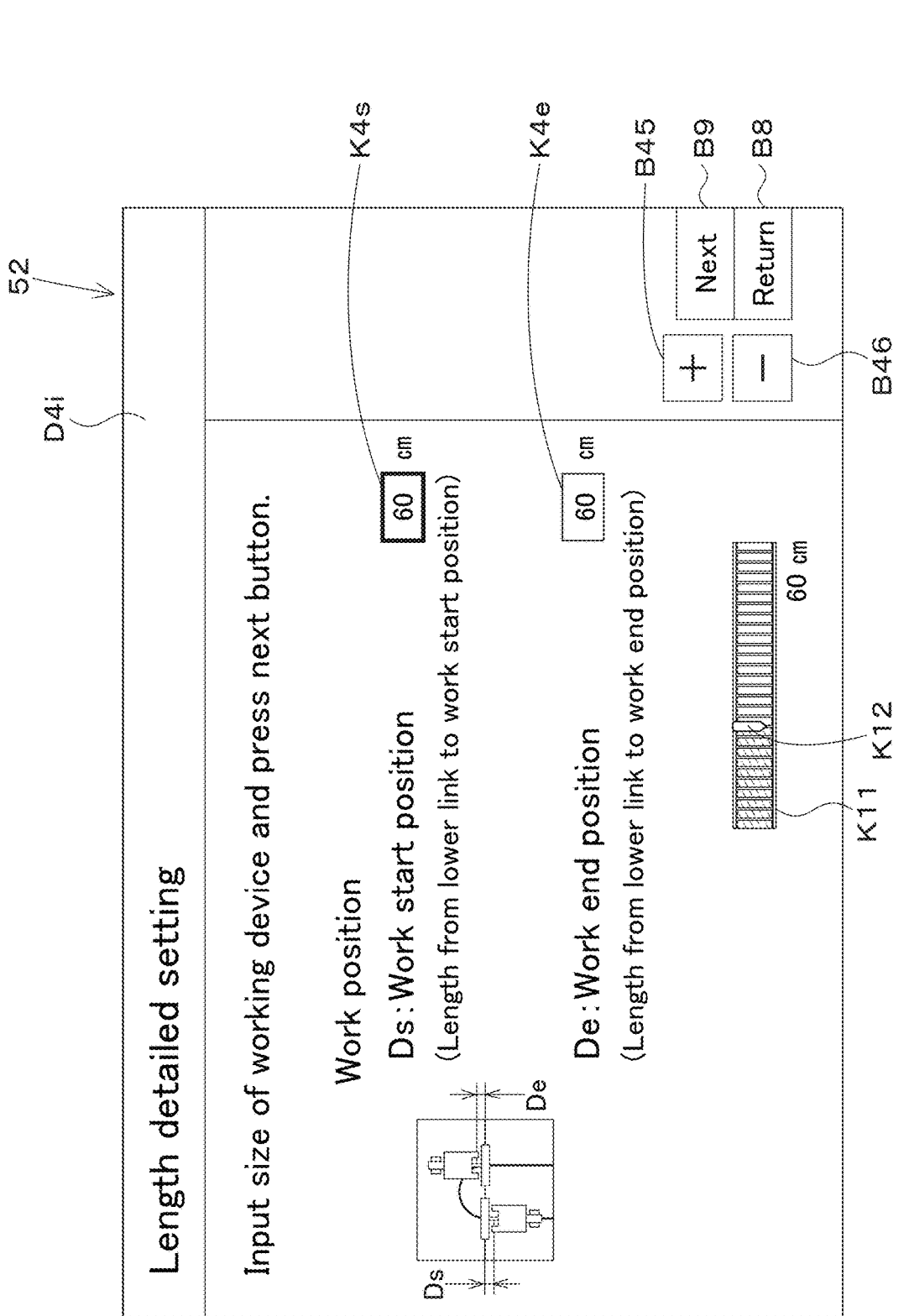
FIG. 20B illustrates an example of a length detail setting screen.

The work start position is a length (Ds) from the coupling position of the working device 2 to a position of start of ground work, as illustrated on the length detail setting screen D4i of FIG. 20B. That is, ground work is started by the working device 2 when the work start position (Ds) of the working device 2 reaches start points of the work routes L1a and L1s. The work end position is a length (De) from the coupling position of the working device 2 to a position of end of the ground work. That is, ground work using the working device 2 ends when the work end position (De) of the working device 2 reaches end points of the work routes L1a and L1s.

By selecting an input column K4s for the work start position (Ds) or an input column K4e for the work end position (De) and then moving the cursor K12 leftward or rightward by operating the positive key B45 or the negative key B46, the operator can input a changed value of the work start position (Ds) or the work end position (De) in the input column K4s or the input column K4e. Although the work start position (Ds) and the work end position (De) of the working device 2 are the same value (same position) in FIGS. 20A and 20B, the work start position (Ds) and the work end position (De) may be different. Although the work start position (Ds) and the work end position (De) are smaller than the entire length (C) in FIGS. 20A and 20B, the work start position (Ds) and the work end position (De) may be larger than the entire length (C) depending on the type of the working device 2.

Specifically, for example, the first working device such as the cultivator performs the first agricultural work such as the cultivation work in a situation where the work start position (Ds) is equal to or less than the work end position (De) and the work start position (Ds) and the work end position (De) are equal to or less than the entire length (C). On the other hand, for example, the second working device such as the spreader performs the second agricultural work such as the spreading work in a situation where the work start position (Ds) is less than the work end position (De) or a situation where the work start position (Ds) and the work end position (De) are less than the entire length (C).

FIG. 21 illustrates a restriction condition table T4 in another example. Information indicative of contents of the restriction condition table T4 is stored in advance in a predetermined storage region of the storage 53. In the restriction condition table T4, a restriction condition concerning the entire length (C) of the working device 2 and the work start position (Ds) and the work end position (F) included in the work position, which are dimension information of the working device 2 in the length direction, is associated with each kind of agricultural work.

Specifically, in the restriction condition table T4, a restriction condition that the work start position (Ds) is equal to or less than the work end position (De) (Ds≤De) and a restriction condition that the work start position (Ds) and the work end position (De) are equal to or less than the entire length (C) (Ds≤C, De≤C) are associated with the cultivation work, the puddling work, and the stubble cultivation work. On the other hand, a restriction condition concerning dimension information of the work start position (Ds), the work end position (De), and the entire length (C) is not associated with the spreading work.

When the operator selects the next key B9 on the length detail setting screen D4*i* of FIG. 20B, setting values of the work start position (Ds) and the work end position (De) that are displayed on the length detail setting screen D4*i* are displayed on the length setting screen D4*h* of FIG. 20A. When the operator selects the next key B9 on the length setting screen D4*h*, the dimension information (the changed values of the entire length (C), the work start position (Ds), and the work end position (De)) of the working device 2 in the length direction that is displayed on the length setting screen D4*h* is stored in the internal memory of the controller 51 and the dimension information is thus input, and the dimension determiner 1*d* performs the dimension restriction processing illustrated in FIG. 8. In this case, the dimension determiner 1*d* checks input of the kind of agricultural work and the dimension information of the working device 2 in the length direction (S1 in FIG. 8) and then extracts a restriction condition according to the kind of agricultural work from the restriction condition table T4 stored in the storage 53 (S2).

Next, the dimension determiner 1*d* determines whether or not the input dimension information (the changed values of the entire length (C), the work start position (Ds), and the work end position (De)) of the working device 2 in the length direction satisfies the restriction condition. In a case where the dimension determiner 1*d* determines that the dimension information of the working device 2 in the length direction does not satisfy the restriction condition (S3: NO), the dimension determiner 1*d* refuses to receive the dimension information and makes the dimension information ineffective (S5), and provides an error notification indicative of the determination result by using the notifier 51*g* (S6). In this case, the notifier 51*g* displays, for example, an error notification including a message indicative of contents of the restriction condition that is not satisfied and the dimension information in the length direction and a message prompting change of the dimension information in the length direction in a pop-up manner on the length setting screen D4*h* (not illustrated).

On the other hand, in a case where the dimension determiner 1*d* determines that the dimension information (the changed values of the entire length (C), the work start position (Ds), and the work end position (De)) of the working device 2 in the length direction satisfies the restriction condition (S3: YES), the dimension determiner 1*d* receives the dimension information and makes the dimension information effective (S4), and ends the dimension restriction processing. Then, the controller 51 causes the device confirmation screen D4*c* reflecting the effective dimension information of the working device 2 in the length direction to be displayed again on the display operator 52. Note that length dimension information (the entire length (C), the work start position (Ds), and the work end position (De)) of the working device 2 on the length setting screen D4*h* (FIG. 20A) that is displayed on the display operator 52 when the length setting key B38 is initially operated on the device confirmation screen D4*c* (FIG. 7C) is dimension information of the working device 2 registered in advance in the storage 53 and is set to a value that satisfies a restriction condition.

Whether or not the dimension information of the working device 2 in the width direction satisfies a restriction condition and whether or not the dimension information of the working device 2 in the length direction satisfies a restriction condition may be determined by the dimension determiner 51*d*, for example, in accordance with the procedure of the dimension restriction processing illustrated in FIG. 8 when the operator selects the next key B9 on the device confirmation screen D4*c* (FIG. 7C).

The kinds of agricultural work and the kinds of the working device 2 are examples, and are not limited to the above kinds. In addition to the above devices, for example, a transplanter, a harvester, and the like may be included in the first working device to perform the first agricultural work, and a seeding device, a water sprinkler, and the like may be included in the second working device to perform the second agricultural work. Restriction conditions concerning dimension information (A to F) transplanting work, harvesting work, or the like may be identical to the restriction conditions of the cultivation work and may be included in the restriction condition tables T1 to T4. Furthermore, restriction conditions concerning dimension information (A to F) of the seeding device, the water sprinkler, and the like may be identical to the restriction conditions of the spreading work and may be included in the restriction condition tables T1 to T4.

In addition to the dimension information of the working device 2 in the width direction and the length direction, dimension information in a height direction such as a height of the working device 2 and a raised position (a height in a non-working state) and a lowered position (a height in a working state) at which the working device 2 is positioned by the raising/lowering device 8 may be permitted to be input by the display operator 52, and it may be determined by the dimension determiner 51*d* whether or not the dimension information in the height direction satisfies a predetermined restriction condition. As for the second working device such as the spreader, no restriction condition of dimension information may be prepared, and determination as to whether or not a restriction condition is satisfied may be omitted.

The dimension information of the working device 2 may be used not only for creation of the traveling route L1 by the area setter 51*b* and the route creator 51*c* and boundary-crossing determination by the boundary-crossing determiner 51*e*, but also for other processing such as registration of the contour H1 of the agricultural field by the agricultural field register 51*a*. Furthermore, the dimension information of the working device 2 used in these units is not limited to the work width, and may be the entire width, the entire length, the work position (the work start position and the work end position), the working device front end position, the work end position, or another dimension. For example, in order to prevent the working device 2 and the agricultural machine 1 from crossing a boundary out of the agricultural field and prevent an unfinished region from remaining, it is effective to use a dimension of the working device 2 in the length direction when the circling route L1*c* and the turning routes L1*b* and L1*r* are created. The kinds of the working device 2 and the kinds of agricultural work are not limited to the above examples, and may be other kinds.

Although the kind of agricultural work is input on the work selection screen D3 (FIG. 6) in the above example embodiment, for example, the controller 51 or the dimension determiner 51d may determine, on the basis of device-specific information or the like of the working device 2, the kind of agricultural work that can be performed by the working device 2 that is input on the device selection screen D4b (FIG. 7B).

Although the boundary-crossing determiner 51e determines whether or not the agricultural machine 1 or the working device 2 has crossed a boundary out of an agricultural field during execution of the automatic traveling work mode or the automatic steering work mode in the above example embodiment, the boundary-crossing determiner 51e may determine whether or not the agricultural machine 1 or the working device 2 has crossed a boundary out of an agricultural field to determine whether or not the traveling route L1 is appropriate, for example, immediately after the route creator 51c creates the traveling route L1.

Although an example in which the agricultural field register 51a, the area setter 51b, the route creator 51c, the dimension determiner 51d, the boundary-crossing determiner 51e, and the notifier 51g are configured or programmed to be provided in the controller 51 of the agricultural work assistance device 50 in the above example embodiment, for example, at least one of the units 51a, 51b, 51c, 51d, 51e, and 51g may be configured or programmed to be provided in the controller 60 of the agricultural machine 1 or may be configured or programmed to be provided as a device separate from the controller 60. The storage 53 may be provided in the controller 60 included in the agricultural machine 1 instead of the agricultural work assistance device 50 or may be provided in an electronic device such as a PC provided in the agricultural machine 1 or on a cloud.

In addition to the display operator 52, an input may be provided by a communication circuit or an input interface for input of registration information (which may include setting information) such as the agricultural field map MP2 (agricultural field), the agricultural machine 1, the working device 2, and the work condition from a server or a storage medium in which the registration information and the like are stored. In addition to the display operator 52 and the communicator 54 provided in the agricultural work assistance device 50, an input, a display, or an output may be provided by a communication circuit, an input interface, a display, a touch pad, a key, or an output interface mounted in the agricultural machine 1. The dimension determiner 51d may determine whether or not dimension information of the working device 2 input by the operator or from an external device by using such another input satisfies a restriction condition.

The agricultural work assistance device 50 is not limited to a mobile tablet terminal device and may be, for example, a smartphone or a terminal device fixed to the agricultural machine 1. Alternatively, for example, the agricultural work assistance device may be an electronic device such as a PC that is not mounted in the agricultural machine 1 such as a server on a cloud. Instead of the agricultural work assistance device, an application program that can be acquired from a cloud and installed, for example, by an operator's electronic device may be included in the agricultural work assistance system. In this case, the agricultural field register 51a, the area setter 51b, the route creator 51c, the dimension determiner 51d, the boundary-crossing determiner 51e, and the notifier 51g may be realized by the application program, and a notification provided by a notifier may be displayed on a display included in an electronic device in which the application program has been installed or on a display connected to the electronic device. Alternatively, the notification provided by the notifier may be output as sound from a speaker of the agricultural machine or the electronic device.

The agricultural work assistance system 100, the agricultural machine 1, and the agricultural work assistance device 50 of the present example embodiment described above have the following configurations and produce the following effects.

The agricultural work assistance system 100 according to the present example embodiment includes the input (the display operator) 52 to input dimension information of the working device 2 coupled to the agricultural machine 1 and a work condition for performing agricultural work on an agricultural field by the agricultural machine 1 and the working device 2, the controller 51 configured or programmed to include the route creator 51c to create the traveling route L1 of the agricultural machine 1 on the map (agricultural field map) MP2 indicative of the agricultural field on the basis of the dimension information and the work condition, and the dimension determiner 51d to determine whether or not the dimension information of the working device 2 input by the input 52 satisfies a predetermined restriction condition according to a kind of agricultural work performed by the working device 2 and refuse to receive the dimension information in a case where it is determined that the dimension information does not satisfy the restriction condition, and the output 52, 54 (the display operator 52, the communicator 54) to output the traveling route L1.

The agricultural machine 1 according to the present example embodiment is an agricultural machine that performs agricultural work while being assisted by the agricultural work assistance system 100 and includes the traveling body 3 that is capable of traveling, the coupler 8g, 8h that is capable of coupling the working device 2 to the traveling body 3, the input 52 to input dimension information of the working device 2 coupled to the traveling body 3 and a work condition for performing agricultural work on an agricultural field by the agricultural machine 1 and the working device 2, the controller 51 configured or programmed to include the route creator 51c to create the traveling route L1 of the traveling body 3 on the map MP2 indicative of the agricultural field on the basis of the dimension information of the working device 2 and the work condition, and the dimension determiner 51d to determine whether or not the dimension information of the working device 2 input by the input 52 satisfies a predetermined restriction condition according to a kind of agricultural work performed by the working device 2 and refuse to receive the dimension information in a case where it is determined that the dimension information does not satisfy the restriction condition, and the output 52, 54 to output the traveling route L1.

The agricultural work assistance device 50 according to the present example embodiment is an agricultural work assistance device included in the agricultural work assistance system 100 and includes the input 52, the controller 51 configured or programmed to include the route creator 51c and the dimension determiner 51d, and the output 52, 54.

According to the above configuration, even in a case where an actual dimension of the working device 2 changes, for example, due to replacement, adjustment, or maintenance of the working device 2, dimension information of the working device 2 can be input again by the input 52, and an appropriate traveling route L1 based on the dimension information can be created and output. Furthermore, in a case where the dimension information does not satisfy a restriction condition since the dimension information of the working device 2 input by the input 52 is inappropriate, the dimension information is not received, and therefore it is possible to prevent an inappropriate traveling route L1 from being created on the basis of the dimension information and prevent such an inappropriate traveling route L1 from being output. Furthermore, it is possible to prevent other processing performed by using the dimension information of the working device 2 from being performed on the basis of inappropriate dimension information. It is therefore possible to improve convenience and obtain an appropriate traveling route L1 by coping with a change in dimension of the working device 2. As a result, the agricultural machine 1 can stably travel on the basis of the appropriate traveling route L1. Furthermore, it is possible to prevent occurrence of a risk such as occurrence of a situation where the agricultural machine 1 travels on the basis of an inappropriate traveling route L1 and the agricultural machine 1 or the working device 2 collides with a ridge or the like around the agricultural field.

In the present example embodiment, the dimension determiner 51$d$ is configured or programmed to prevent the creation of the traveling route L1 based on the dimension information by the route creator 51$c$ and the output of the traveling route L1 by the output 52, 54 by refusing to receive the dimension information of the working device 2 input by the input 52. It is therefore possible to improve convenience and obtain an appropriate traveling route L1 by coping with a change in dimension of the working device 2.

In the present example embodiment, in a case where the dimension determiner 51$d$ determines that the dimension information of the working device 2 satisfies the restriction condition, the route creator 51$c$ is configured or programmed to create the traveling route L1 on the basis of the dimension information, and the output 52, 54 outputs the traveling route L1 created by the route creator 51$c$. This allows the agricultural machine 1 to stably travel on the basis of the appropriate traveling route L1.

In the agricultural work assistance system 100 according to the present example embodiment, the controller 51 is configured or programmed to include the notifier 51$g$ to, in a case where the dimension determiner 51$d$ determines that the dimension information of the working device 2 does not satisfy the restriction condition, provide a notification about a result of the determination. This makes it possible to recognize a reason why the dimension information of the working device 2 input by the input 52 is inappropriate, thereby further improving convenience.

In the present example embodiment, in a case where the dimension determiner 51$d$ determines that the dimension information of the working device 2 does not satisfy the restriction condition, the notifier 51$g$ is configured or programmed to provide a notification prompting change of the dimension information. This prompts inputting appropriate dimension information of the working device 2 again by the input 52, thereby further improving convenience.

In the present example embodiment, the dimension determiner 51$d$ is configured or programmed to extract the restriction condition according to the kind of agricultural work input by the input 52 from the storage 53 in which a predetermined restriction condition is stored according to a kind of the agricultural work. This makes it possible to set a restriction condition according to a kind of agricultural work performed by the agricultural machine 1 and the working device 2.

In the present example embodiment, the agricultural work assistance system 100 further includes the position detector (the positioning device) 40 to detect a position of the agricultural machine 1, and the controller 51 is configured or programmed to include the boundary-crossing determiner 51$e$ to determine whether or not the working device 2 or the agricultural machine 1 has crossed a boundary out of the agricultural field on the basis of a position of the agricultural machine 1, the map MP2, the dimension information of the working device 2, and dimension information of the agricultural machine 1, in which the dimension determiner 51$d$ prevents the determination as to the boundary crossing based on the dimension information from being performed by the boundary-crossing determiner 51$e$ by refusing to receive the dimension information of the working device 2 input by the input 52. This can prevent the boundary-crossing determiner 51$e$ from erroneously determining whether or not the working device 2 or the agricultural machine 1 has crossed a boundary out of an agricultural field by using inappropriate dimension information of the working device 2 that does not satisfy the restriction condition. As a result, it is possible to prevent occurrence of a risk such as occurrence of a situation where the working device 2 or the agricultural machine 1 collides with a ridge or the like around the agricultural field due to erroneous determination of the boundary-crossing determiner 51$e$.

In the agricultural work assistance system 100 according to the present example embodiment, the controller 51 is configured or programmed to read out dimension information corresponding to identification information of the working device 2 input by the input 52 from the storage 53 in which the dimension information of the working device 2 and the identification information are stored in association with each other, in which in a case where a changed value of the dimension information of the working device 2 is input by the input 52 after the controller 51 reads out the dimension information of the working device 2, the dimension determiner 51$d$ determines whether or not the changed value satisfies the restriction condition. This makes it possible to update dimension information of the working device 2 stored (registered) in advance in the storage 53 with a changed value of the dimension information input by the input 52, thereby further improving convenience. Furthermore, since it is determined whether or not the changed value of the dimension information of the working device 2 satisfies the restriction condition, it is possible to discriminates an appropriate changed value that satisfies the restriction condition and an inappropriate changed value that does not satisfy the restriction condition.

In the present example embodiment, the agricultural work assistance system 100 further includes the automatic controller 61 configured or programmed to drive the working device 2 to perform agricultural work on the agricultural field while automatically performing traveling or steering of the agricultural machine 1 on the basis of the traveling route L1 output by the output 54 and a position of the agricultural machine 1 detected by the position detector 40, in which the output 52, 54 includes the display 52 to display the traveling route L1 or the communicator 54 to transmit the traveling route L1 to the automatic controller 61. This makes it possible to display, on the display 52, an appropriate traveling route L1 created on the basis of appropriate dimension information of the working device 2 that satisfies the restriction condition so that a user such as an operator can view the appropriate traveling route L1, thereby further improving convenience. Furthermore, the automatic controller 61 can be configured or programmed to cause the working device 2 to stably perform agricultural work on an agricultural field while automatically performing traveling or steering of the agricultural machine 1 on the basis of the appropriate traveling route L1, thereby further improving convenience.

In the present example embodiment, the dimension information of the working device 2 includes an entire width, which is a length of an external shape of the working device 2 in a left-right direction perpendicular to a traveling direction and a height direction of the agricultural machine 1, and a work width, which is a width where ground work is performed by the working device 2, the kind of agricultural work includes first agricultural work (the cultivation work, the puddling work, the stubble cultivation work, or the like) performed in contact with an object present on the agricultural field and second agricultural work (the spreading work or the like) performed apart from an object present on the agricultural field; the working device 2 includes a first working device (the cultivator, the puddling device, the stubble cultivator, or the like) that performs the first agricultural work and a second working device (the spreader or the like) that performs the second agricultural work, and the dimension determiner 51*d* is configured or programmed to use, as the restriction condition, a restriction condition that the work width is equal to or less than the entire width in a case where the first agricultural work is performed by the first working device and not use the restriction condition that the work width is equal to or less than the entire width in a case where the second agricultural work is performed by the second working device.

With this configuration, in a case where the input work width of the first working device is equal to or less than the entire width, the traveling route L1 is appropriately created on the basis of the work width, and the first agricultural work can be stably performed by the first working device on the basis of the traveling route L1. Furthermore, in a case where the input work width of the first working device is larger than the entire width, the traveling route L1 is not created on the basis of the work width, and the first agricultural work is not performed by the first working device, and therefore it is possible to prevent the first working device and the agricultural machine 1 from colliding with a ridge or the like around the agricultural field. Furthermore, both in a case where the input work width of the second working device is equal to or less than the entire width and in a case where the input work width of the second working device is less than the entire width, the traveling route L1 is appropriately created on the basis of the work width, and the second agricultural work can be stably performed by the second working device on the basis of the traveling route L1.

In the present example embodiment, in a case where the work width of the first working device input by the operator by using the input 52 exceeds the entire width (is larger than the entire width), the dimension determiner 51*d* is configured or programmed to determine that the dimension information of the first working device does not satisfy the restriction condition and refuse to receive the dimension information of the first working device input by the input 52, and the notifier 51*g* is configured or programmed to provide a notification indicating that the work width exceeds the entire width and prompting change of the work width or the entire width.

With the above configuration, in a case where the work width of the first working device input by the operator by using the input 52 exceeds the entire width, the inappropriate work width and entire width are not received, and therefore it is possible to prevent an inappropriate traveling route L1 from being created on the basis of the work width and to prevent the inappropriate traveling route L1 from being output. That is, it is possible to cope with operator's erroneous input of dimension information of the working device 2. Furthermore, in a case where the work width of the first working device input by the operator by using the input 52 is equal to or less than the entire width, an appropriate traveling route L1 can be created on the basis of the work width, and the appropriate traveling route L1 can be output.

In the present example embodiment, the dimension information of the working device 2 includes an entire length, which is a length of an external shape of the working device 2 from a coupling position of the working device 2 in a front-rear direction parallel to a traveling direction of the agricultural machine 1, and a length to a work position of the working device 2, and the work position includes a work start position at which the working device 2 starts ground work from the coupling position and a work end position at which the working device 2 ends the ground work from the coupling position; and the dimension determiner 51*d* is configured or programmed to use, as the restriction condition, a restriction condition that the length to the work position is equal to or less than the entire length or a restriction condition that a length to the work start position is equal to or less than a length to the work end position in a case where the first agricultural work (the cultivation work, the puddling work, the stubble cultivation work, or the like) is performed by the first working device (the cultivator, the puddling device, the stubble cultivator, or the like), and not use the restriction condition that the length to the work position is equal to or less than the entire length and the restriction condition that the length to the work start position is equal to or less than the length to the work end position in a case where the second agricultural work (the spreading work or the like) is performed by the second working device (the spreader or the like).

With this configuration, in a case where the input length to the work position of the first working device is equal to or less than the entire length or in a case where the length to the work start position included in the work position is equal to or less than the length to the work end position, it is possible to appropriately perform processing such as creation of the traveling route L1 and determination as to whether or not the agricultural machine 1 and the working device 2 have crossed a boundary out of the agricultural field on the basis of the dimension information. In a case where the input length to the work position of the first working device exceeds the entire length and/or in a case where the length to the work start position exceeds the length to the work end position, it is possible to prevent processing such as creation of the traveling route L1 and determination as to whether or not the agricultural machine 1 and the working device 2 have crossed a boundary out of the agricultural field from being inappropriately performed on the basis of the length to the work position or the entire length. Furthermore, it is possible to appropriately perform processing such as creation of the traveling route L1 and determination as to whether or not the agricultural machine 1 and the working device 2 have crossed a boundary out of the agricultural field irrespective of the input length to the work position of the second working device relative to the entire length or irrespective of the length to the work start position relative to the length to the work end position.

In the present example embodiment, in a case where the length to the work position that is the dimension information of the first working device input by the operator by using the input 52 exceeds the entire length (is larger than the entire length) or in a case where the length to the work start position exceeds the length to the work end position, the dimension determiner 51*d* is configured or programmed to determine that the dimension information of the first working device does not satisfy the restriction condition and refuse to receive the dimension information of the first working device input by the input 52, and the notifier 51*g* is configured or programmed to provide a notification indicating a result of the determination of the dimension determiner 51*d* and prompting change of the dimension information that does not satisfy the restriction condition.

With this configuration, in a case where the length to the work position of the first working device input by the operator by using the input 52 exceeds the entire length and/or in a case where the length to the work start position exceeds the length to the work end position, the dimension information is not received, and therefore it is possible to prevent processing such as creation of the traveling route L1 and determination as to whether or not the agricultural machine 1 and the working device 2 have crossed a boundary out of the agricultural field from being inappropriately performed on the basis of the dimension information. That is, it is possible to cope with operator's erroneous input of dimension information of the working device 2. Furthermore, in a case where the length to the work position of the first working device input by the operator by using the input 52 is equal to or less than the entire length or in a case where the length to the work start position is equal to or less than the length to the work end position, it is possible to appropriately perform processing such as creation of an appropriate traveling route L1 and determination as to whether or not the agricultural machine 1 and the working device 2 have crossed a boundary out of the agricultural field on the basis of the length to the work position or the entire length.

In the present example embodiment, the first working device includes the cultivator, the puddling device, the stubble cultivator, and the second working device includes the scattering device. With this configuration, in a case where dimension information of the cultivator, the puddling device, or the stubble cultivator input by the input 52 satisfies a corresponding restriction condition, it is possible to create an appropriate traveling route L1 on the basis of the dimension information and to appropriately and stably perform cultivation work, puddling work, or stubble cultivation work by the cultivator, the puddling device, or the stubble cultivator on the basis of the appropriate traveling route L1. In a case where dimension information of the cultivator, the puddling device, or the stubble cultivator input by the input 52 does not satisfy a corresponding restriction condition, an inappropriate traveling route L1 is not created on the basis of the dimension information, and it is possible to prevent cultivation work, puddling work, or stubble cultivation work from being performed on the basis of the inappropriate traveling route L1. Furthermore, also in a case where dimension information of the spreader is input by the input 52, it is possible to appropriately and stably perform spreading work on the basis of an appropriate traveling route L1 in a case where the dimension information satisfies a corresponding restriction condition, and it is possible to prevent the spreading work from being performed on the basis of an inappropriate traveling route L1 in a case where the dimension information does not satisfy a corresponding restriction condition.

Furthermore, in the present example embodiment, the agricultural machine 1 includes the position detector 40 that detects a position of the traveling body 3, and the automatic controller 61 configured or programmed to drive the working device 2 to perform agricultural work on the agricultural field while automatically performing traveling or steering of the traveling body 3 on the basis of the traveling route L1 and the position of the traveling body 3, and the output 54 is operable to output the traveling route L1 created by the route creator 51*c* to the automatic controller 61 in a case where the dimension determiner 51*d* determines that the dimension information of the working device 2 satisfies a restriction condition. This allows the automatic controller 61 to stably perform agricultural work on the agricultural field by the working device 2 while automatically performing traveling and steering of the agricultural machine 1 on the basis of an appropriate traveling route L1, thereby further improving convenience.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural work assistance system comprising:
a controller including a processor and a memory;
a touch panel connected to the controller; and
a positioning system connected to the controller to detect a position of an agricultural machine; wherein
the controller is configured or programmed to:
cause the memory to store dimension information input by an operator via the touch panel, indicating an entire width, a work width, an entire length, and a work end position at which a working device ends the ground work from a coupling position of the working device coupled to the agricultural machine and a work condition for performing agricultural work on an agricultural field by the agricultural machine and the working device;
create a traveling route of the agricultural machine on a map indicative of the agricultural field on a basis of the dimension information of the working device and the work condition;
determine whether or not the working device or the agricultural machine has crossed a boundary out of the agricultural field on a basis of the position of the agricultural machine, the map, the dimension information of the working device, and dimension information of the agricultural machine;
stop traveling of the agricultural machine based on the traveling route when it is determined that the working device or the agricultural machine has crossed the boundary out of the agricultural field;
determine that the dimension information of the working device input by the operator via the touch panel does not satisfy a predetermined restriction condition when the entire width is less than the work width or when the entire length is less than a length to the work end position, with the agricultural work performed by the working device including either one of a cultivation work, a puddling work, or a stubble cultivation work; and
delete the dimension information of the working device from the memory to prevent creation of the traveling route of the agricultural machine and determination of whether or not the working device or the agricultural machine has crossed the boundary out of the agricultural field in a case where it is determined that the dimension information does not satisfy the restriction condition.

2. The agricultural work assistance system according to claim 1, wherein the controller is configured or programmed to prevent the creation of the traveling route based on the dimension information input by the operator via the touch panel and the determination of whether or not the working device or the agricultural machine has crossed the boundary out of the agricultural field by deleting the dimension information of the working device from the memory.

3. The agricultural work assistance system according to claim 1, wherein the controller is configured or programmed to, in a case where the controller determines that the dimension information of the working device satisfies the restriction condition, create the traveling route on a basis of the dimension information, and output the traveling route via the touch panel.

4. The agricultural work assistance system according to claim 1, wherein the controller is configured or programmed to, in a case where the controller determines that the dimension information of the working device does not satisfy the restriction condition, provide a notification about a result of the determination via the touch panel.

5. The agricultural work assistance system according to claim 4, wherein in a case where the controller determines that the dimension information of the working device does not satisfy the restriction condition, the controller is configured or programmed to provide the operator with a notification prompting change of the dimension information via the touch panel.

6. An agricultural machine comprising:

a traveling body that is capable of traveling;

a coupler that is capable of coupling a working device to the traveling body;

a controller including a processor and a memory;

a touch panel connected to the controller; and a positioning system connected to the controller to detect a position of traveling body; wherein the controller is configured or programmed to:

cause the memory to store dimension information input by an operator via the touch panel, indicating an entire width, a work width, an entire length, and a work end position at which the working device ends the ground work from a coupling position of the working device coupled to the traveling body and a work condition for performing agricultural work on an agricultural field by the agricultural machine and the working device;

create a traveling route of the traveling body on a map indicative of the agricultural field on a basis of the dimension information of the working device and the work condition;

determine whether or not the working device or the agricultural machine has crossed a boundary out of the agricultural field on a basis of the position of the agricultural machine, the map, the dimension information of the working device, and dimension information of the agricultural machine;

stop traveling of the agricultural machine based on the traveling route when it is determined that the working device or the agricultural machine has crossed the boundary out of the agricultural field;

determine that the dimension information of the working device input by the operator via the touch panel does not satisfy a predetermined restriction condition when the entire width is less than the work width or when the entire length is less than a length to the work end position, with the agricultural work performed by the working device including either one of a cultivation work, a puddling work, or a stubble cultivation work; and delete the dimension information of the working device from the memory to prevent creation of the traveling route of the agricultural machine and determination of whether or not the working device or the agricultural machine has crossed the boundary out of the agricultural field in a case where it is determined that the dimension information does not satisfy the restriction condition.

7. An agricultural work assistance device comprising:

a controller including a processor and a memory;

a touch panel connected to the controller; and a positioning system connected to the controller to detect a position of an agricultural machine; wherein the controller is configured or programmed to:

cause the memory to store dimension information input by an operator via the touch panel, indicating an entire width, a work width, an entire length, and a work end position at which a working device ends the ground work from a coupling position of the working device coupled to the agricultural machine and a work condition for performing agricultural work on an agricultural field by the agricultural machine and the working device;

create a traveling route of the agricultural machine on a map indicative of the agricultural field on a basis of the dimension information of the working device and the work condition;

determine whether or not the working device or the agricultural machine has crossed a boundary out of the agricultural field on a basis of the position of the agricultural machine, the map, the dimension information of the working device, and dimension information of the agricultural machine;

stop traveling of the agricultural machine based on the traveling route when it is determined that the working device or the agricultural machine has crossed the boundary out of the agricultural field;

determine that the dimension information of the working device input by the operator via the touch panel does not satisfy a predetermined restriction condition when the entire width is less than the work width or when the entire length is less than a length to the work end position, with the agricultural work performed by the working device including either one of a cultivation work, a puddling work, or a stubble cultivation work; and delete the dimension information of the working device from the memory to prevent creation of the traveling route of the agricultural machine and determination of whether or not the working device or the agricultural machine has crossed the boundary out of the agricultural field in a case where it is determined that the dimension information does not satisfy the restriction condition.

* * * * *